(12) United States Patent
O'Malley et al.

(10) Patent No.: US 9,047,619 B2
(45) Date of Patent: Jun. 2, 2015

(54) SYSTEM AND METHOD FOR PROVIDING MESSAGES

(76) Inventors: Matthew Carl O'Malley, Lake Balboa, CA (US); David Shor, Redondo Beach, CA (US); Stephen Meade, Los Angeles, CA (US)

( * ) Notice: Subject to any disclaimer, the term of this patent is extended or adjusted under 35 U.S.C. 154(b) by 601 days.

(21) Appl. No.: 13/127,993

(22) PCT Filed: Nov. 5, 2009

(86) PCT No.: PCT/US2009/063459
§ 371 (c)(1),
(2), (4) Date: May 6, 2011

(87) PCT Pub. No.: WO2010/054129
PCT Pub. Date: May 14, 2010

(65) Prior Publication Data
US 2011/0213657 A1 Sep. 1, 2011

Related U.S. Application Data

(60) Provisional application No. 61/198,520, filed on Nov. 6, 2008.

(51) Int. Cl.
*H04L 12/58* (2006.01)
*H04M 3/42* (2006.01)
(Continued)

(52) U.S. Cl.
CPC ....... *G06Q 30/0251* (2013.01); *H04M 3/42017* (2013.01); *H04M 3/4878* (2013.01)

(58) Field of Classification Search
CPC ............ H04W 4/12; H04W 4/14; H04W 4/16
USPC .......... 455/412.1, 412.2, 414.1, 414.2, 414.3, 455/414.4, 417, 466; 705/14.4, 14.41, 705/14.42, 14.43, 14.44, 14.46, 14.49, 14.5, 705/14.52, 14.53, 14.55, 14.64, 14.66, 705/14.67, 14.68

See application file for complete search history.

(56) References Cited

U.S. PATENT DOCUMENTS 4,807,279 A 2/1989 McClure et al.
5,321,740 A 6/1994 Gregorek et al.
(Continued)

FOREIGN PATENT DOCUMENTS

| EP | 2353133 | 8/2011 |
|---|---|---|
| WO | WO 2006/001681 | 1/2006 |
| WO | WO 2010/054129 | 5/2010 |

OTHER PUBLICATIONS

International Search Report, PCT/US2009/063459 (WO 2010/054129 above), Mar. 25, 2010, PCT/ISA/210, Alexandria, VA, USA.

*Primary Examiner* — Christopher M Brandt

(57) ABSTRACT

A system and method for providing a message to a recipient is provided. The system includes a network communication system for providing a message to a recipient using a communication device. The network communication system includes a communication system operatively connected to at least one communication device. The network communication system further includes an exchange platform, the exchange platform having a signal media server operatively connected to at least one message server, the exchange platform receiving a communication from a potential recipient through the communication device, the communication system determining if the potential recipient is flagged in a recipient database, the message server determining the message, the message server retrieving at least one message, wherein the signal media server forwards the message to the recipient via the communication device.

76 Claims, 48 Drawing Sheets

(51) Int. Cl.
*H04W 4/00* (2009.01)
*G06Q 30/02* (2012.01)
*H04M 3/487* (2006.01)

(56) References Cited

U.S. PATENT DOCUMENTS

| | | | |
|---|---|---|---|
| 5,448,625 | A | 9/1995 | Lederman |
| 5,642,407 | A | 6/1997 | He |
| 5,793,972 | A | 8/1998 | Shane |
| 6,052,438 | A | 4/2000 | Wu et al. |
| 6,253,069 | B1 | 6/2001 | Mankovitz |
| 6,385,308 | B1 | 5/2002 | Cohen |
| 6,442,244 | B1 | 8/2002 | Fellingham et al. |
| 6,603,844 | B1 | 8/2003 | Chavez, Jr. et al. |
| 6,614,896 | B1 | 9/2003 | Rao |
| 6,856,673 | B1* | 2/2005 | Banks et al. ............. 379/114.13 |
| 6,889,054 | B2 | 5/2005 | Himmel et al. |
| 6,947,531 | B1 | 9/2005 | Lewis |
| 7,006,608 | B2 | 2/2006 | Seelig et al. |
| 7,136,470 | B1 | 11/2006 | Taylor et al. |
| 7,171,200 | B2 | 1/2007 | No et al. |
| 7,184,529 | B1 | 2/2007 | Taylor et al. |
| 7,184,532 | B2 | 2/2007 | Creamer et al. |
| 7,187,761 | B2 | 3/2007 | Bookstaff |
| 7,227,929 | B2 | 6/2007 | Seelig et al. |
| 7,376,223 | B2 | 5/2008 | Taylor et al. |
| 7,400,882 | B2 | 7/2008 | Hahm et al. |
| 7,440,563 | B2 | 10/2008 | Baiz Matuk |
| 7,489,768 | B1 | 2/2009 | Strietzel |
| 7,493,125 | B2 | 2/2009 | Nagesh et al. |
| 7,512,421 | B2 | 3/2009 | Kim et al. |
| 7,515,898 | B2 | 4/2009 | Chin et al. |
| 7,613,287 | B1 | 11/2009 | Stifelman et al. |
| 7,620,160 | B2 | 11/2009 | Tidwell et al. |
| 7,706,518 | B2 | 4/2010 | Moody et al. |
| 8,086,488 | B2 | 12/2011 | Liu |
| 8,135,613 | B2 | 3/2012 | Ho et al. |
| 8,214,469 | B2 | 7/2012 | Alperin et al. |
| 8,375,100 | B1 | 2/2013 | Rivera |
| 8,560,323 | B2 | 10/2013 | Madhavapeddi et al. |
| 2001/0048737 | A1* | 12/2001 | Goldberg et al. ........ 379/114.13 |
| 2001/0051517 | A1* | 12/2001 | Strietzel ........................ 455/414 |
| 2002/0051521 | A1 | 5/2002 | Patrick |
| 2002/0069109 | A1* | 6/2002 | Wendkos ........................ 705/14 |
| 2002/0198944 | A1 | 12/2002 | Moss |
| 2003/0050837 | A1 | 3/2003 | Kim |
| 2003/0063721 | A1* | 4/2003 | Hirose ........................ 379/93.12 |
| 2004/0073482 | A1 | 4/2004 | Wiggins |
| 2004/0081304 | A1 | 4/2004 | Lee |
| 2004/0114732 | A1 | 6/2004 | Choe et al. |
| 2004/0203956 | A1 | 10/2004 | Tsampalis |
| 2005/0105706 | A1 | 5/2005 | Kokkinen |
| 2006/0074748 | A1 | 4/2006 | Kline et al. |
| 2006/0095331 | A1 | 5/2006 | O'Malley et al. |
| 2006/0109969 | A1 | 5/2006 | Oh |
| 2006/0210033 | A1 | 9/2006 | Grech et al. |
| 2006/0217135 | A1* | 9/2006 | Moore et al. .................. 455/466 |
| 2006/0242006 | A1 | 10/2006 | Hogan |
| 2006/0291634 | A1 | 12/2006 | Yeh |
| 2007/0005431 | A1 | 1/2007 | Arauz |
| 2007/0047523 | A1 | 3/2007 | Jiang |
| 2007/0116244 | A1 | 5/2007 | Choi |
| 2007/0121846 | A1 | 5/2007 | Altberg et al. |
| 2007/0162296 | A1 | 7/2007 | Altberg et al. |
| 2007/0214040 | A1 | 9/2007 | Patel et al. |
| 2007/0217584 | A1* | 9/2007 | Bi et al. .................... 379/142.15 |
| 2007/0271139 | A1 | 11/2007 | Fiorini |
| 2007/0291931 | A1 | 12/2007 | DeMent |
| 2007/0293198 | A1* | 12/2007 | Sanmugasuntharam et al. ........................... 455/414.1 |
| 2008/0008295 | A1 | 1/2008 | Sivakumar |
| 2008/0049912 | A1 | 2/2008 | Carter et al. |
| 2008/0063168 | A1 | 3/2008 | Haley et al. |
| 2008/0075236 | A1 | 3/2008 | Raju et al. |
| 2008/0076414 | A1 | 3/2008 | Kharebov et al. |
| 2008/0091516 | A1* | 4/2008 | Giunta ............................ 705/10 |
| 2008/0152097 | A1* | 6/2008 | Kent ............................ 379/93.01 |
| 2008/0162400 | A1 | 7/2008 | O'Malley |
| 2008/0177616 | A1 | 7/2008 | Nemirofsky |
| 2008/0194260 | A1* | 8/2008 | Altberg et al. ............. 455/435.1 |
| 2008/0273681 | A1 | 11/2008 | Song et al. |
| 2008/0300969 | A1 | 12/2008 | Zhang et al. |
| 2008/0318559 | A1* | 12/2008 | Porco ........................ 455/414.2 |
| 2009/0028301 | A1 | 1/2009 | Ma et al. |
| 2009/0154664 | A1 | 6/2009 | Davies |
| 2009/0157485 | A1 | 6/2009 | Thakker |
| 2009/0182616 | A1* | 7/2009 | Ho et al. .......................... 705/10 |
| 2009/0214008 | A1 | 8/2009 | Mani |
| 2009/0227237 | A1 | 9/2009 | Huang |
| 2009/0232285 | A1 | 9/2009 | Mani |
| 2009/0265220 | A1 | 10/2009 | Bayraktar et al. |
| 2009/0275312 | A1 | 11/2009 | Singhal |
| 2009/0276303 | A1 | 11/2009 | Singhal |
| 2009/0292909 | A1* | 11/2009 | Feder et al. ....................... 713/1 |
| 2009/0325545 | A1* | 12/2009 | Hawkins .................... 455/414.1 |
| 2010/0080371 | A1* | 4/2010 | Gupta et al. .............. 379/114.13 |

* cited by examiner

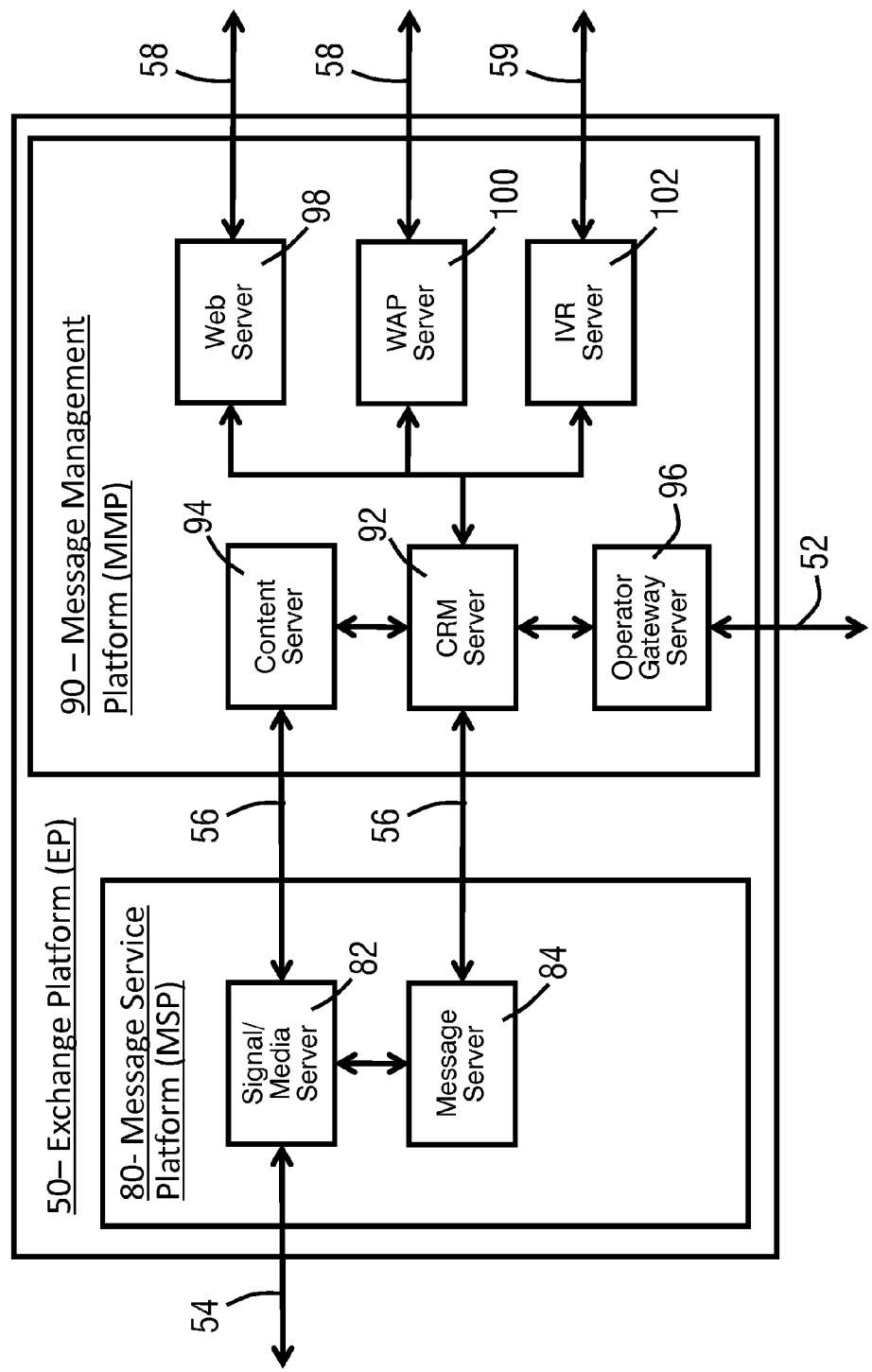

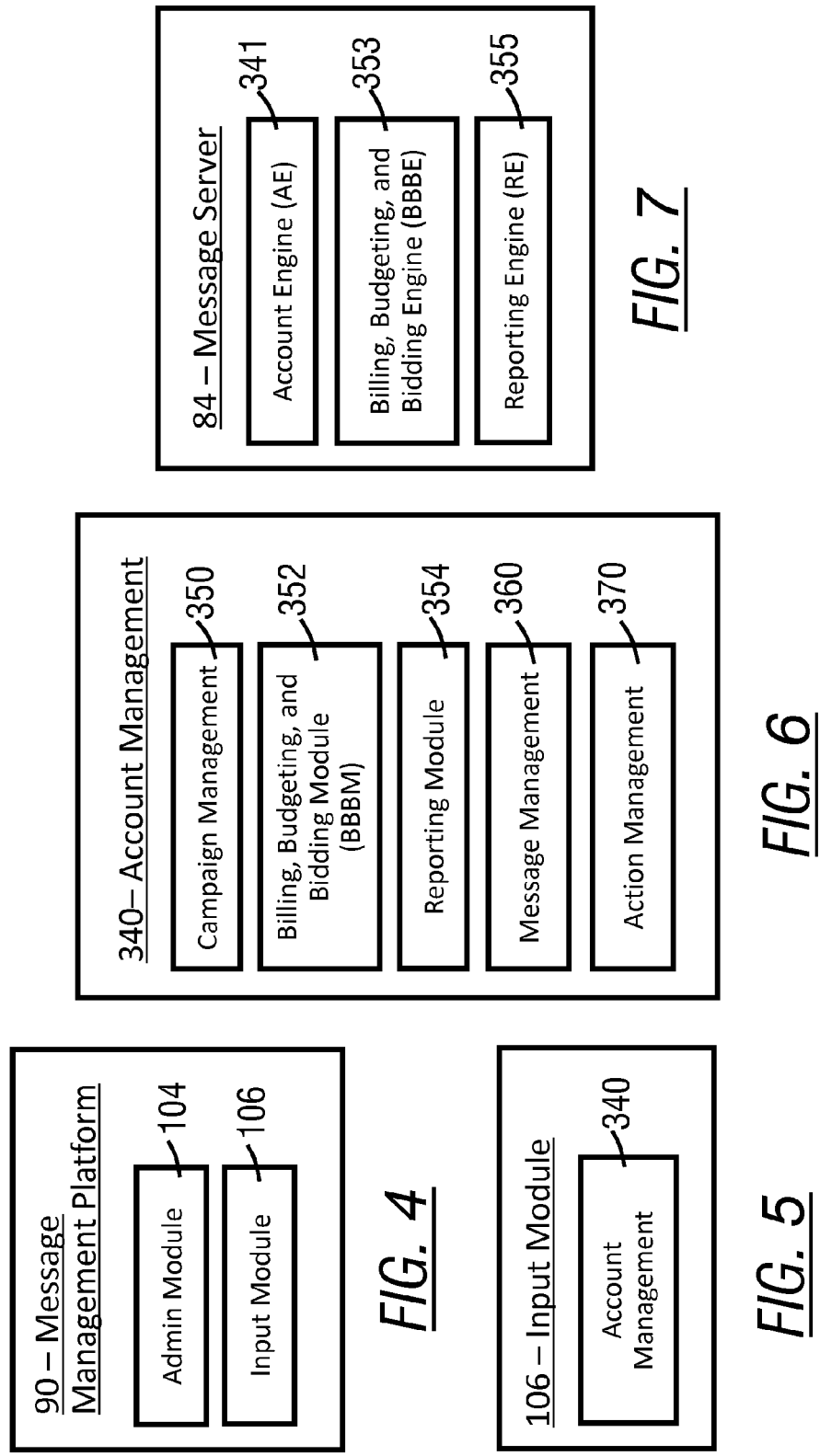

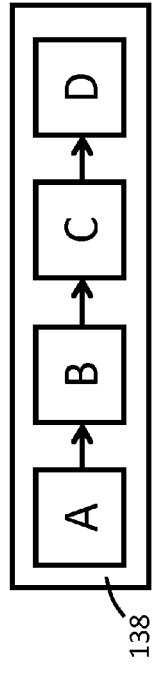
FIG. 14A
FIG. 14B
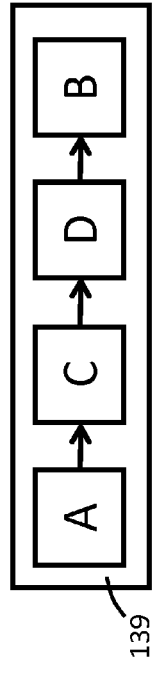
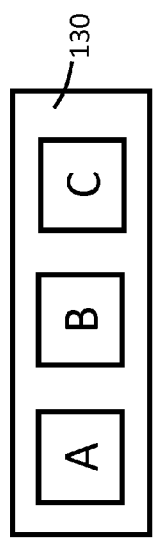
FIG. 16A
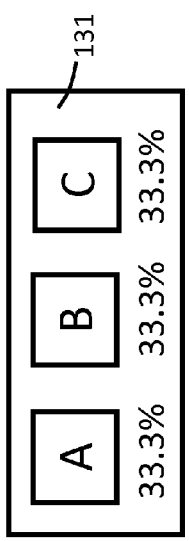
FIG. 16B
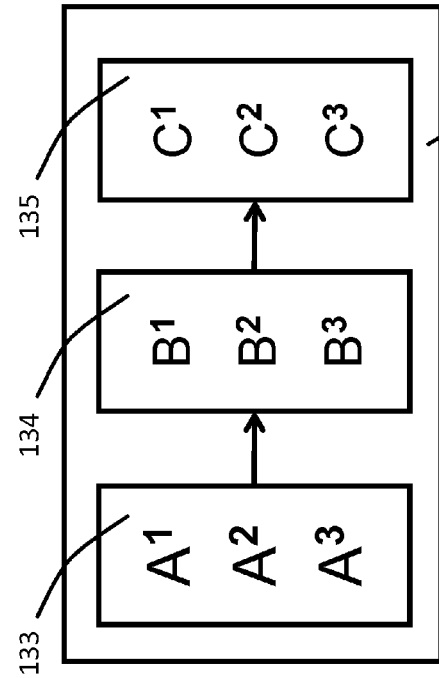
FIG. 17
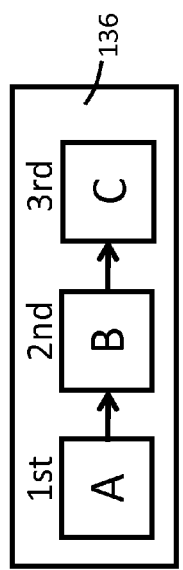
FIG. 15A
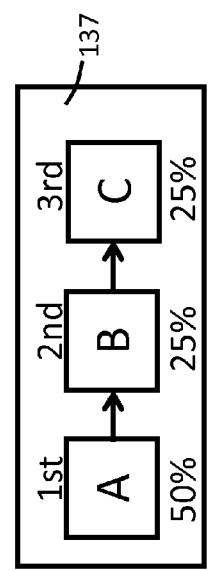
FIG. 15B

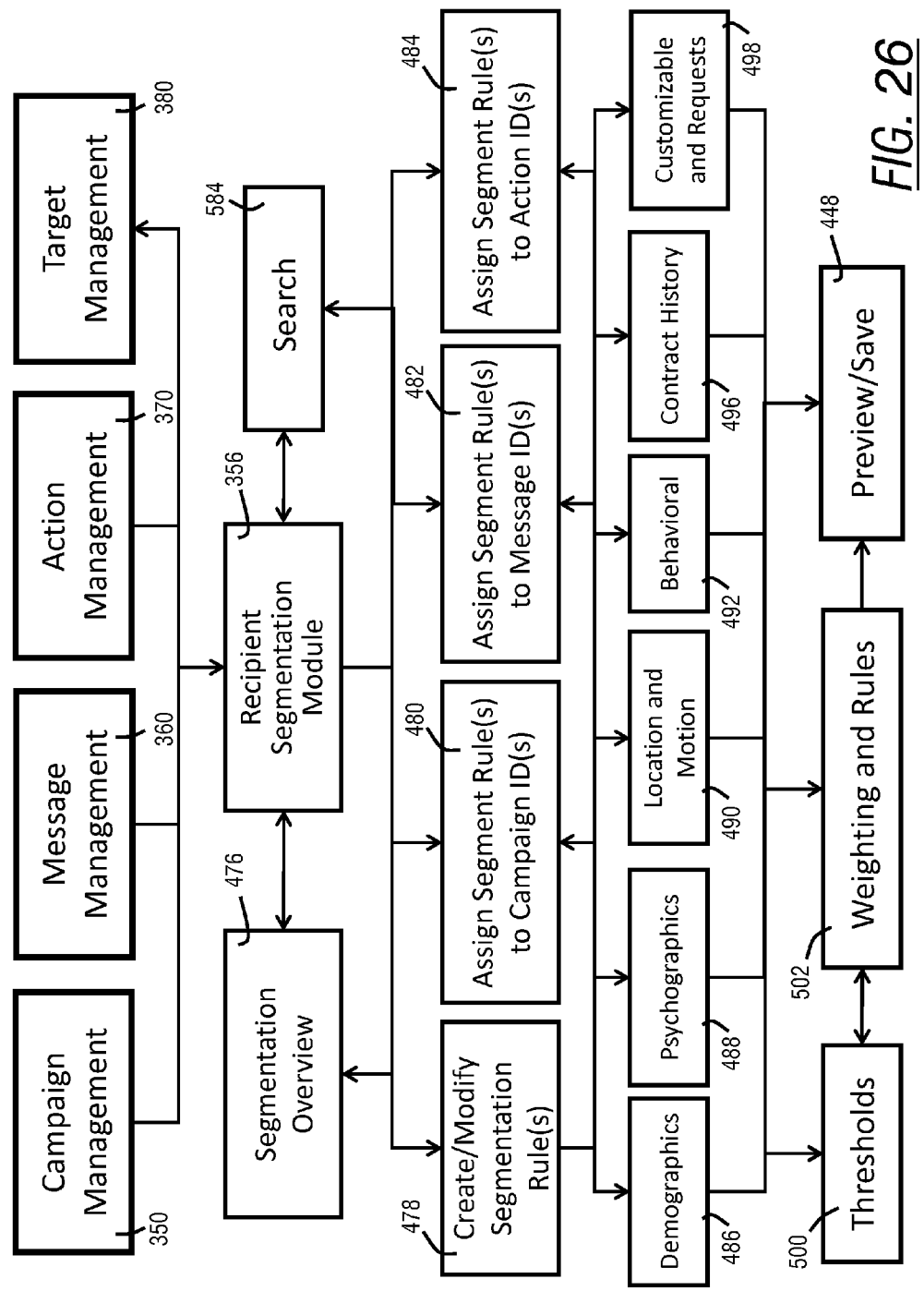

FIG. 33

Manage Data Fields - Exchange Platform  1000

Home > Settings > Manage Data Fields

→ Data Field Library  1001

Select filter to manage data fields library

Active: All   Allow in Calculation: All   Created By: All   → 1002

Field Type: All

Filter List

Add New Field ← 1004

| Active? | Allow in Calculation | ▼ Field Name | ▼ Field Type | ▼ Description | ▼ Created By | Edit/Delete |
|---|---|---|---|---|---|---|
| ✓ |  | Recipient's First Name | Recipient Demographics | To show the first name of the Recipient | Marc Foster | Edit / Delete |
| ✓ |  | Recipient's Last Name | Recipient Demographics | To show the last name of the Recipient | Marc Foster | Edit / Delete |
| ✓ |  | Recipient's Address | Recipient Demographics | To show the address of the Recipient | Patrick Blanc | Edit / Delete |
|  | ✓ | Daily Calls | Contract History Data | Average number of daily calls made by the Recipient | Mary Lee | Edit / Delete |
|  | ✓ | Average Minutes Per Call | Contract History Data | To calculate average minutes per call by each Recipient | Marc Foster | Edit / Delete |

Calculated Fields Library

FIG. 34

Manage Data Fields – Exchange Platform

*Home > Settings > Manage Data Fields*

- Data Field Library
- Calculated Fields Library ← 1006

Select filter to manage calculated fields library

Active: [All ▼] ← 1008   Members with Visibility:  [All ▼]

[Filter List]    [Add New Calculated Field] ← 1010

| Active? | Visible? | ▼ Calculated Field Name | ▼ Field Type | ▼ Calculation | ▼ Description | Edit/Delete |
|---|---|---|---|---|---|---|
| ✓ |  | Average Calls Per Day | Recipient Demographics | Total Calls *divide by (/)* Total Days | To calculate average call per day with detail like per area | [Edit] ← 1011 [Delete] ← 1012 |
|  |  | Average Minutes Per Call | Recipient Demographics | Total Minutes *divide by (/)* Total Calls | To calculate average minutes per call by each Recipient | [Edit] [Delete] |
| ✓ |  | Average SMS Messages Per Day | Recipient Demographics | Total SMS Messages *divide (/)* Total Days | To calculate average SMS per day by Recipient | [Edit] [Delete] |
|  |  | Average Minutes Per Call | Recipient Contract | Total Minutes *divide (/)* Total Calls | To calculate average minutes per call by each Recipient | [Edit] [Delete] |
| ✓ |  | Average Minutes Per Call | Recipient Contract | Total Minutes *divide (/)* Total Calls | To calculate average minutes per call by each Recipient | [Edit] [Delete] |

SYSTEM AND METHOD FOR PROVIDING MESSAGES

CROSS-REFERENCE TO RELATED APPLICATIONS

This application claims the benefit of the following U.S. Provisional Patent Application incorporated herein by reference in its entirety: App. No. 61/198,520 filed on Nov. 6, 2008 and entitled "SYSTEM AND METHOD FOR PROVIDING ADVERTISEMENTS."

BACKGROUND

1) Field of the Invention

The invention relates to the field of mobile communications and more particularly to improved methods and systems for information delivery associated with a telecommunications network.

2) Discussion of the Related Art

Because of an increasing popularity of communication devices, such as mobile phones, a growing need exists for providing messaging services, such as advertising messaging services, to users of such communication devices. Existing technologies allow a phone switch to play messages during a phone call. The phone switch can play a recorded message, such as an advertising message, in place of a ring-back tone.

Common architecture for providing custom ring-back tone includes a Mobile Switching Center (MSC), a Home Location Register (HLR), and a ring-back tone generator (RBTG). In this architecture, software in a network MSC, in conjunction with the Home Location Register (HLR), identifies which received calls have been placed by or to corresponding subscribers of the ring-back service. The MSC sets up a voice path to the RBTG for conveying a ring-back tone to the recipient while also placing an outbound call connection to alert the called party. A RBTG is also conveyed in situations where the recipient has received a busy signal after connecting to the called party, indicating that the called party is busy.

The RBTG then plays the selected audio message back to the recipient through the voice path while the called party phone is alerted of the incoming call connection request. After detecting that the called party answers the phone, the MSC breaks a link to the RBTG and bridges the recipient phone to the called party phone via a voice communication channel so that the recipient and the called party can talk with each other without the custom ring-back tone being played.

Current methods and systems are ineffective when it comes to communicating customer service messages to mobile subscribers. While methods deliver advertisements to the recipient based cursory or preliminary information, such methods fall flat when those who want to deliver advertisements want to definitively target their advertisements or communicate effectively to a subscriber. Further, such third parties are at a loss when it comes to feedback from any delivery undertaken to such a subscriber.

BRIEF DESCRIPTION OF THE FIGURES

FIG. 3 of the accompanying drawings provides an Exchange Platform.

FIG. 4 of the accompanying drawings provides a Message Management Platform.

FIG. 5 of the accompanying drawings provides an Input Module.

FIG. 6 of the accompanying drawings provides an Account Management module.

FIG. 7 of the accompanying drawings provides a block diagram for some of the components included within a Message Server.

FIG. 14A of the accompanying drawings depicts an example of a Sequencing Rule Module.

FIG. 14B of the accompanying drawings depicts another embodiment of the Sequencing Rule Module.

FIG. 15A of the accompanying drawings depicts another embodiment of the Sequencing Rule Module.

FIG. 15B of the accompanying drawings depicts another embodiment of the Sequencing Rule Module.

FIG. 16A of the accompanying drawings depicts another embodiment of the Sequencing Rule Module.

FIG. 16B of the accompanying drawings depicts another embodiment of the Sequencing Rule Module.

FIG. 17 of the accompanying drawings depicts another embodiment of the Sequencing Rule Module.

FIG. 26 of the accompanying drawings depicts a flowchart of a process by which the Accounts use the Message Management Platform's UI to create and/or manage the Campaign of Messages and Actions with Targeting and Segmentation Rules.

FIG. 33 of the accompanying drawings depicts a screen shot by which the Accounts use the Message Management Platform's UI can review and/or create a Data Field Mapping Module.

FIG. 34 of the accompanying drawings depicts a screen shot by which the Accounts use the Message Management Platform's UI review and/or create a Calculated Data Fields in the Data Field Mapping Module.

FIG. 35 of the accompanying drawings further depicts a screen shot by which the Accounts use the Message Management Platform's UI can create the Calculated Data Field in the Data Field Mapping Module.

FIG. 37 of the accompanying drawings depicts a screen shot by which the Accounts use the Message Management Platform's UI to create the new Segmentation Rule including multiple conditions.

FIG. 43 of the accompanying drawings depicts a screen shot by which the Accounts use the Message Management Platform's UI to review the required daily workflow tasks to support various Opt-in Program content productions.

FIG. 46 of the accompanying drawings depicts a screen shot by which the Accounts use the Message Management Platform's UI to review or create a date or date on which an Opt-in Message can be played, and specifically illustrates two ways that the date or dates can be specified.

FIG. 49 of the accompanying drawings depicts a screen shot by which the Accounts use the Message Management Platform's UI to review, approve or reject Opt-in Messages, and specifically illustrates one Opt-in Message that is pending approval.

FIG. 50 of the accompanying drawings depicts a screen shot by which the Accounts use the Message Management Platform's UI to reject an Opt-in Message, and specifically illustrates a window which pops up to allow the Account to provide the reason for rejection.

DETAILED DESCRIPTION OF THE INVENTION

Figure 1:
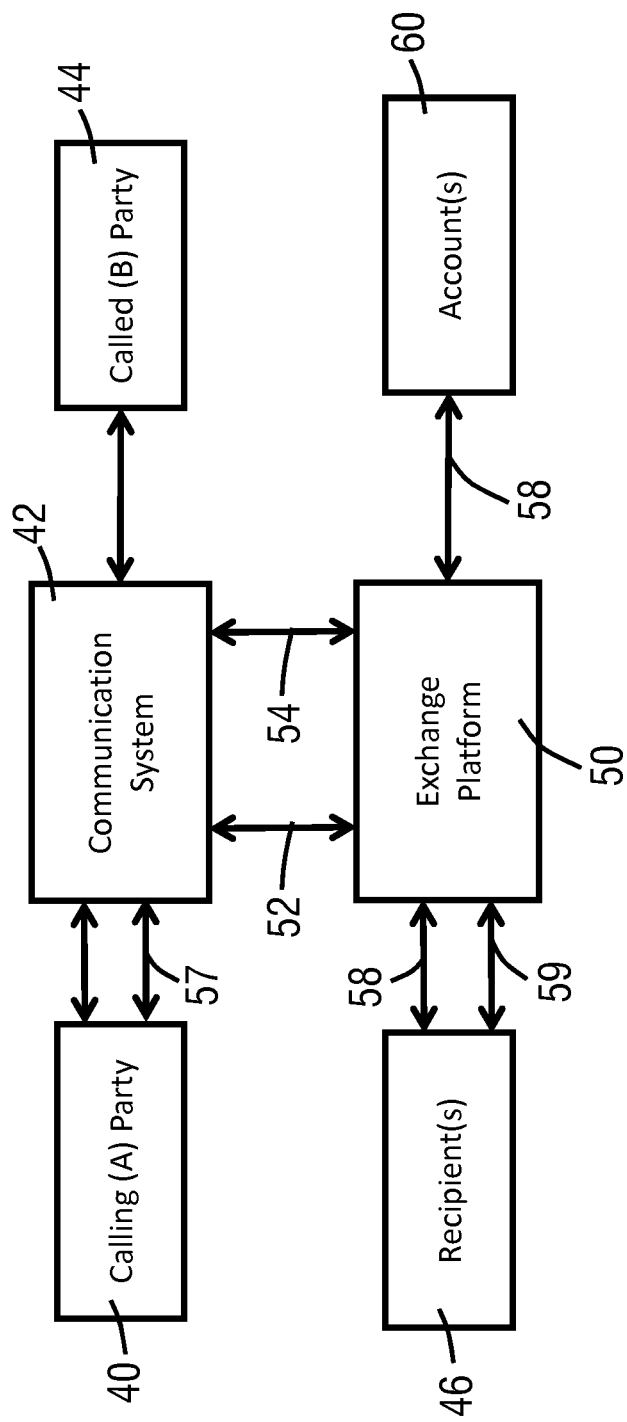
FIG. 1 of the accompanying drawings provides a Network Communication System.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in another embodiment," and similar language throughout this specification may, but do not necessarily, all refer to the same embodiment.

As used herein, the term "Message" can be all types of information, but is not limited to marketing including advertising or those messages that can be used for life cycle management and customer relationship management. The messaging could also include information that is not related to the purpose of selling goods and/or services.

The message is directed to an end-user or wireless/mobile subscriber (hereinafter "Recipient") 46 using a communication device, which includes, but is not limited to the communication device used for placing calls and playing back "Messages". For example, the communication device can be a phone, such as a cell phone, mobile phone, smart phone, landlines, PDA phone, or the like. The communication device can also be a Voice over Internet Protocol (VoIP) device. For example, the communication device can be a computing device, such as a desktop computer, laptop computer, tablet computer, or PDA, with software enabling the computing device to make VoIP calls over the Internet, or the communication device could simply be a device that plays audio and accepts commands, such as voice commands (more later).

The timing of providing Messages to the communication device, a Message(s) could be provided prior to, during or after the ring back tone, ringing tone or busy signal. Further, the playback of the Message could be interleaved with a busy signal, or the ringing of the Recipient's 46 telephone. For example, the busy signal and the Message could both be provided to the unsuccessful caller at the same time. Alternatively, one or more Messages could be provided to the caller in between rings of the Recipient's 46 telephone or between the tones of the busy signal (i.e., the Messages may be "interleaved" with the rings or the busy signal). Similarly, one or more Messages could be provided to the caller prior to the first ring of the called party's telephone, after a predetermined number of rings, and/or after a predetermined time period from the first ring. The Message could also be provided after the caller request to delay the call. In the case of an audio speaker the playback of the Message could be triggered once a particular Recipient 46 walks by a location that detects the Recipient's 46 presence.

As used herein, the term "modules," and as employed herein, are considered computer-executable program stored on a computer-readable storage medium. These modules provide information to a flagged Recipient 46 and carrying one or more sequences of instructions, wherein execution of the one or more sequences of instructions by one or more processors embodied therein causes the one or more processors to perform a method for providing information to the Recipient 46 using the communication device. A party is connected to the EP 50 and can potentially receive information from the EP 50 using the communication device connected to the NCS 38, and is hereinafter together referred to as the Recipient 46

Further, the term "modules" is used in an embodiment of the present invention. Modules can be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Further, storage medium can include, but is not limited to, one or more of the following: any type of physical media including floppy disks, optical discs, DVDs, CD-ROMs, microdrives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information which can be used by one or more processors to perform any of the features presented herein.

A module of executable code can be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 1 illustrates a Network Communication System 38. The Network Communication System 38 is comprised of a Communication System 42 (hereinafter "CS"), a Calling (A) Party 40, a Called (B) Party 44, and an Exchange Platform 50. The Calling (A) Party 40, using any type of communication device, such as that described above herein, that can connect to the CS 42, such as a landline telephone, mobile cellular phone, computer, a Voice over Internet Protocol (VoIP) phone, and/or similar, can place a telephone call for example to the Called (B) Party 44, through the CS 42.

The Exchange Platform (hereinafter "EP") 50 connects to the CS 42 from, in one embodiment, outside the network via any communication Connection 54, typically a SS7 network with a Voice Trunk Connection (hereinafter "SS7/VTC") and via a Transmission Control Protocol/Internet Protocol Connection (hereinafter "TCP/IP") connection 52 explained more in FIG. 2, but all connections inside NCS 38 can be any time of appropriate network connection.

The EP 50 can also be located within the CS 42 environment. The Connection 54, typically the SS7/VTC, but can also be through alternatives such as an IP Multimedia Subsystem (hereinafter "IMS") or other Long Term Evolution (hereinafter "LTE") communication protocols connecting callers (which are expected to supplant currently installed SS7 infrastructures). The EP 50 is also operatively connected to an Account 60 via a Connection 58 that can be any type network connection that allows for data communication, typically a TCP/IP connection.

The EP 50 is also operatively connected to the Recipient 46 via any type communication line that allows for voice communication, generally referred to as a Voice Trunk Connection (hereinafter "VTC") 59. The Connection 58 illustrated between the EP 50 and the Recipients 46 allows support for all communications types, including those required for transferring such items as text, images, video, data, VoIP, etc.

Figure 2:
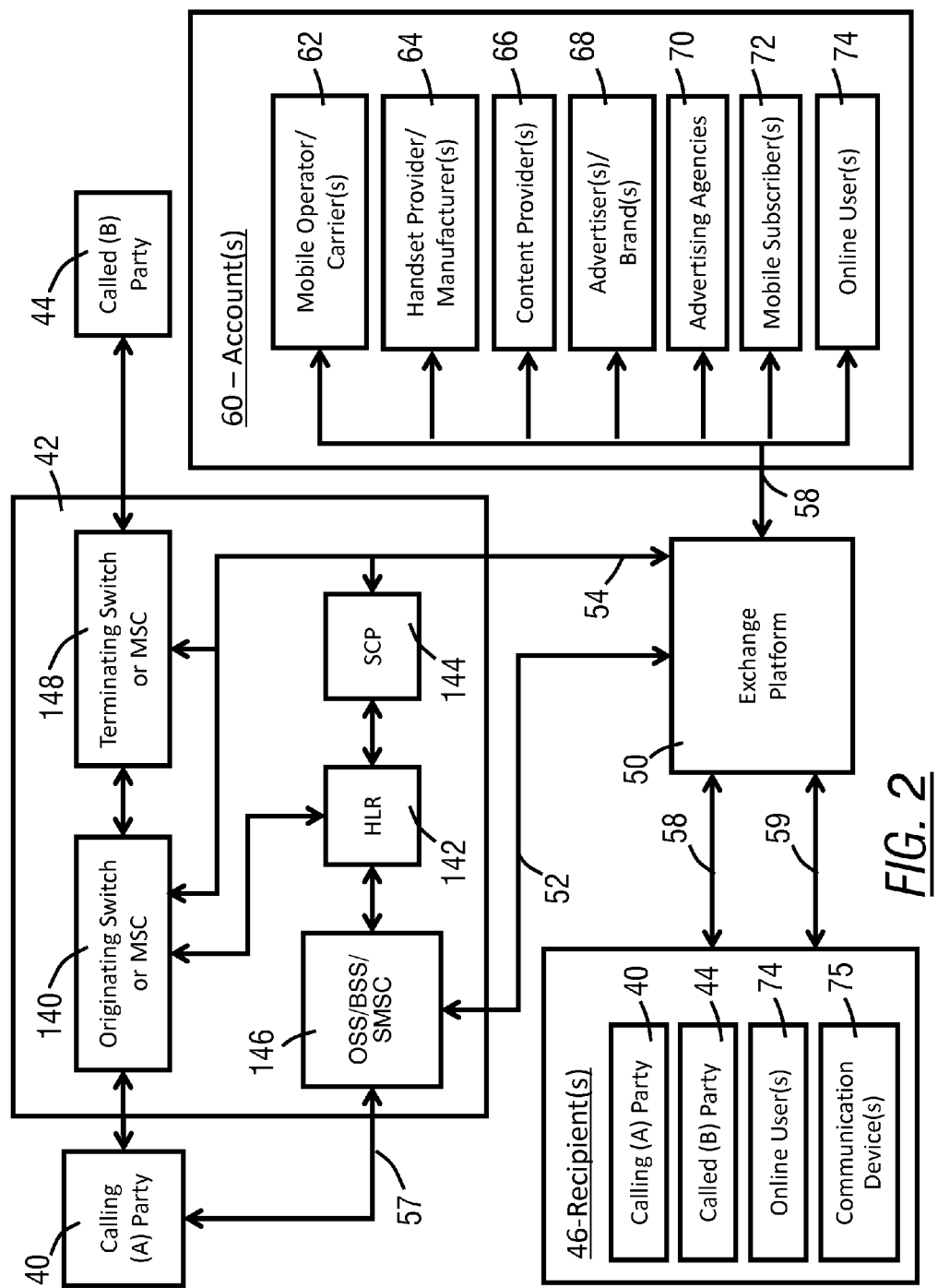
FIG. 2 of the accompanying drawings provides the Network Communication System in detail.

FIG. 2 illustrates the CS 42, the Recipient(s) 46 and the Account(s) 60 in detail. Using cellular communication as an example, the Calling (A) Party 40 uses a mobile telephone as the communication device and connects to the Called (B) Party 44 through the CS 42.

The CS 42 is comprised of at least one Originating Switch or Mobile Switching Center (hereinafter "MSC") 140, at least one Home Location Register (hereinafter "HLR") 142, at least one Service Control Point (hereinafter "SCP") 144, at least one OSS/BSS/SMSC 146 and at least one Terminating Switch or MSC 148, also referred to as a Terminating MSC or T-MSC. Under certain conditions, to be explained in detail later, the communication is then routed and interconnected to the EP 50.

The NCS 38 includes Accounts 60 that are connected with the EP 50. The EP 50 allows Accounts 60 to interact with the EP 50 via the Connection 58, but could be any type of appropriate communication connection. The Accounts 60 are third parties who create, utilize, target, deliver, and monitor information for communicating, marketing, advertising and/or selling to Recipients 46. Recipients 46, in an embodiment, are the Calling (A) Party 40, the Called (B) Party 44, an Online User(s) 74, and/or the Communication Device 75. In another embodiment Recipients 46 can also be Accounts 60.

When any Calling (A) Party 40, Called (B) Party 44, Online User(s) 74 and/or Communication Device 75 is first routed to the EP 50 from the CS 42 they are referred to as a Flagged Recipient 46, as in they have been identified and flagged by the CS 42 and party to potential receive the Message from the EP 50. It is then up to the instructions stored in the EP 50 determine if the Message is sent, and what Message is sent.

Communication Devices 75 used by Recipient's 46 can be a transceiver that allows communication from itself and the EP 50. Further, the Recipient 46 would not have to be physically being carrying the Communication Devices 75. For example, a person could be identified while in an environment where that identification then triggers the EP 50 to send that specific person (now flagged) a particular Message to the Communication Devices 75 in the environment. For example, the Communication Devices 75 could simply have a speaker that can play the appropriate audio Message relative to any data known about the flagged person in the EP 50 when passing say, a motion detector, such as those known in the art.

This person who has been flagged to receive the Message from the EP 50 could respond to the audio Message played using the same Communication Devices 75 with the speaker attached, and/or the Communication Devices 75 could be broken into separate components where the person flagged could respond by such methods as a voice command/prompt, pressing a designated button in the environment/area connected to the Communication Devices 75, by making a designated motion, and/or by some other method that can communicate a specific Action request back by the Recipient 46 back to the EP 50.

The Accounts 60 can also be considered marketers and advertisers, which can also be the Mobile Operator/Carrier(s) 62 themselves. The data Accounts 60 input can include their total budget for messaging and advertising, a particular bid for a particular Campaign, and/or specific to segmentations, such as specific time, locations, and/or Recipient 46 segments. The Accounts 60 input can also be content for audio Messages to a group of cellular subscriber/Recipients 46, such as whose contract is ending soon, available minutes have been consumed, and/or eligible for a new phone offer. The input can also be the particular Account's 60 choices for targeting Message delivery with rules and instructions (more later). The Accounts 60 can be categorized into user types, such as Mobile Operator/Carrier(s) 62, Handset Provider/Manufacturer(s) 64, Content Provider(s) 66, Advertiser(s) and Brand(s) 68, Advertising Agencies 70, Mobile Subscriber(s) 72, and Online User(s) 74.

The mobile network operator who is in control of the CS 42, and/or some other component within the CS 42 can typically communicate with the EP 50, from within the CS 42 environment. For example, a mobile network operator such as Verizon® could communicate to the EP 50 from within the CS 42 environment and likely through an operator firewall (not shown), but along both the Connection 54 and via a TCP/IP 52 connection and/or any appropriate network connection.

Verizon® in this example could also connect from outside the CS 42 as an Account 60 or more precisely as a Mobile Operator/Carrier(s) 62. Whereas a particular mobile network operator who did not control the particular CS 42 in this example, such as Sprint®, may instead be allowed by the CS 42 owner, Verizon® in this example, to participate on the EP 50 through any network connection, here depicted as the Internet Connection 58 as the Mobile Operator/Carrier(s) 62 Account. In addition, Sprint® could have its own rules and permissions for Accounts 60 it allows access to the EP 50 connected to its (Sprint's®) own CS 42 separate from the Verizon's® rules and permissions for its (Verizon's®) CS 42 and connected EP 50.

The same basic functionality applies for Handset Provider/Manufacturer(s) 64 that are Accounts 60 such as Nokia®, Research-In-Motion®, Apple®, Microsoft®, etc. where the information, advertisements, and/or communications they provide could be in general, and/or tailored to a particular mobile operator (e.g. Verizon®, AT&T®, T-Mobile®, Rogers®, Orange®, etc.), and/or to a particular mobile subscriber who is using their brand, and/or a specific handset type (mobile communication device) used by any Calling (A) Party 40 and/or any Called (B) Party 44 that is connected to the CS 42 and/or the EP 50.

Content Provider(s) 66 are Accounts 60 such as ESPN®, TMZ®, The Weather Channel®, etc. where the content they provide to the EP 50 can be in any form retrievable by the Recipient 46, such as audio Messages, SMS/MMS, text, images, video, etc. This content can be made available for free, a fee, in exchange for service, in exchange for another event and/or Action, such as participating in a poll, and/or some combination of these. This content in some cases can be made available to Recipients 46 in delineations referred to as Channels. Collections of channels are referred to as Programs in the invention and more on this later in FIGS. 28 and 44.

Advertiser(s) and Brand(s) 68 are Accounts 60 such as Coke®, McDonalds®, Nike®, Best Buy®, Starbucks®, etc. where the information, advertisements, and/or communications they provide to the EP 50 can be directly associated with a particular brand and/or a particular product and where such items are owned and controlled by the participating advertiser or brand. For example, the brand Coke® could pay to run audio Messages that promote a new line of soft-drinks owned by Coke®. A retail brand such as Best Buy® could advertise a sale at their participating stores.

Advertising Agencies 70 can also be Accounts 60 including Interpublic®, WPP Group®, Omnicom®, the Publicis Groupe®, Havas, Dentsu®, etc. where the information, advertisements, and/or communications they provide to the EP 50 are for a client of theirs.

Mobile Subscriber(s) 72 are Accounts 60 where the information, advertisements, and/or communications they provide to the EP 50 are as a mobile subscriber of a particular CS 42 owner, such as Verizon®, AT&T®, T-mobile®, Sprint®, Rogers®, Orange®, etc. that has allowed the Mobile Subscriber 72 access to the EP 50 with an Account 60. In this embodiment, Mobile Subscriber(s) 72 are allowed to setup standard, or personalized Messages, advertisements, etc.

Online User(s) 74 can also be Accounts 60 where the information, advertisements, and/or communications they provide to the EP 50 are as a random consumer or business who would typically connect via the World Wide Web. For example, a member of a social network, such as Facebook® could interact with the EP 50 by creating a particular Message and/or Campaign for others to interact with, e.g. hear, read, view, buy, sell, etc.

FIG. 3 illustrates the Exchange Platform 50 in detail. The EP 50 receives, analyzes, selects, aggregates, and delivers data throughout the NCS 38. The EP 50 includes user login capabilities, billing management, the ability to specify and load Message content and rules electronically. The EP 50 minimizes the effort of the Accounts 60 in how they select or want their advertisement distributed. The EP 50 may be accessed through a standard web interfaces via the Connection 58 into the Web Server 98, but can be any type of communication connection, and also provides a unique Application Programming Interface (hereinafter "API") solution for Accounts 60 who wish to build direct access to their messaging and advertising inventory.

The EP 50 further allows third parties or Accounts 60 to create, manage, distribute, measure, report and adjust their messaging or advertising for a client. The EP 50 allows the Accounts 60 to setup specific Campaigns with Messages and/or advertising, along with specific follow-up actions that can be taken by the Recipients 46, setup with rules and instructions for each particular Message and/or Campaign. In addition, the EP 50 allows accounts other organization capabilities and reporting functionality, including revenue reports with various ways to view data, such as summary totals by Recipient 46 segmentations (e.g. Demographics, Psychographics, Location, Motion, Contact History, Behavioral, etc.); timing, and usage tracking; Action metric or conversion metric; and advertiser optimization goal type, explained in detail later.

The EP 50 is comprised of a Message Service Platform (hereinafter "MSP") 80 and a Message Management Platform (hereinafter "MMP") 90. The MSP 80 and MMP 90 can communicate with each other through a standard Network Connection 56, typically a TCP/IP and a File Transfer Protocol (hereinafter "FTP") connection, but can be any type connection that supports data. The MSP 80 and MMP 90 include a series of servers and modules, explained later in detail, which communicate and are otherwise operatively connected within the EP 50.

The MMP 90 is comprised of a Content Server 94, a Customer Relationship Management (hereinafter "CRM") Server 92, an Operator Gateway Server 96, a Web Server 98, a WAP Server 100, and an IVR Server 102. The Web Server 98 allows Accounts 60 to connect with the EP 50 via the Connection 58 or via any network connection.

When Accounts 60 interact with the MMP 90 using a web interface accessible on the Web Server 98, the information needed for the logic and the association of items, such as what content belongs to which Account 60 and/or Campaign is stored and maintained on the CRM Server 92 and the associated Message content, such as audio clips or Messages, sometimes referred to as Message Clips, are stored and maintained on the Content Server 94. The logic stored to identify a specific Message Clip is referred to as a Message ID.

The content associated to a particular Account 60 and/or Campaign and addressable via the logic in the CRM Server 92 for WAP (Wireless Access Protocol) pages is stored and maintained on the WAP Server 100, which can be used interactively by the Recipients 46 via the Connection 58 or any network connection. The content associated to a particular Account 60 and/or Campaign and addressable via the logic in the CRM Server 92 for IVR (Interactive Voice Response) information is stored and maintained on the IVR Server 102, which can be used interactively by the Recipients 46 via the VTC 59 connection or any network connection.

All the content needed to support the near real-time playback of Messages is copied and pushed from the MMP's 90 Content Server 94 to the MSP's 80 Signal/Media Server 82 and tracked by the CRM Server 92. All the logic needed to support the near real-time instructions of an Account's 60 Campaign are pushed as a copy of the master file from the MMP's 90 CRM Server 92 to the MSP's 80 Message Server 84. This push of needed content, Campaign logic, and settings can either be set up to happen in preset time intervals (e.g. every hour), when updates are made, by rules determined by an Account 60, based on timing rules, based on billing/budgeting/bidding rules (explained more later), and/or some combination of these push methods.

The CS 42 (in the previous FIG. 2) can communicate with the MSP 80 via the Connection 54 and into a Signal/Media Server 82 or via any network communication connection appropriate. When the CS 42 routes a call to the Signal/Media Server 82, as stated the Signal/Media Server 82 is meant to contain all the content needed for near real-time playback of Messages; any instructions for when to play a Message for a particular Campaign, such as the Timing Rules and Sequencing Rules (explained in detail later) for a particular Recipient 46 and/or Campaign; any instructions for whether the particular Campaign has Predetermined Recipients 46, referred to as Predetermined Recipients 46; or if instead the particular Campaign will employ a Message Selection Engine 369 (hereinafter "MSE"), described in detail later, which can employ multiple rules and engines to determine which Message or group of Messages gets played and in what order (Sequencing Rules), included in the Message Selection Rule Module 368 (hereinafter "MSRM"), described in detail later in FIGS. 12 and 13 respectively; any instructions for whether to incorporate an Optimization Selection Module 358 (hereinafter "OSM") which is based on previous performance data, described in detail later in FIG. 21; and any instructions for follow-up Actions to a particular Message, such as a Dual Tone Multi-Frequency (hereinafter "DTMF") signal from a button typically pressed by the Calling (A) Party 40 for requesting a SMS/MMS, a tiny URL, Web page, WAP page, Offer, coupons, External Communications (e.g. Email, Outbound Calls, Direct Mail, etc.), etc. The call flow itself will be explained in more detailed later in FIGS. 18, 19, 20, 21, 22, and 51; and in an alternative embodiment in FIGS. 52, 53, 54, 55, and 56.

EP 50 also communicates with the OSS/BSS/SMSC 146 (in the previous FIG. 2) via an Operator Gateway Server 96 through the TCP/IP 52 connection or any appropriate network connection. The OSS/BSS/SMSC 146 represents the Mobile Operator's typical Legacy systems such as the Operations Support System (OSS); the Business Support System (BSS), the system typically to manage business operations such as provisioning, billing, sales management, customer-service management and customer database; the Short Message Service Center (SMSC), the system typically supports Short Message Service (hereinafter "SMS") and/or Multimedia Messaging Service (hereinafter "MMS") Message storage, point-to-point, mobile originated and terminated short message service.

The Recipient 46 can respond to a Campaign Message in a number of manners, including the pressing any number or key combinations on their communication device (or handset) that have been pre-designated by an Account 60 as a means to notify the EP 50 for a specific request for any additional information to a Message played, referred as an Action. If there is a series of potential sequential Actions to a particular Message, the first Action is referred to as the Initial Action for this invention. Each Action following a previous Action is called a Subsequent Action whether initiated by the Recipient 46 or the EP 50. An "Action Response" is a subset of Actions and refers to a specific Action that is sent back to the Recipient 46 in "response" to particular Action taken by the Recipient 46, as is depicted later in FIGS. 22 and 56.

For example, the Calling (A) Party 40 and Called (B) Party 44 can communicate these Actions using SMS, when SMS is designated as an Action by an Account 60. SMS is a mechanism of delivery of short messages over mobile networks. In addition to SMS, Smart Messaging (from Nokia), EMS (Enhanced Messaging System) and MMS have emerged. MMS adds images, text, audio clips and ultimately, video clips to SMS.

For example, if an Account 60 had a Campaign that included an audio Message that suggested the Recipient 46 press any key on their communication device, known in the telecommunications industry as a DTMF command, to receive additional information in the form of a SMS or MMS, the Account 60 can utilize the Message Management Platform's 90 UI to setup this Action to a particular Message in advance. The Mobile Operator/Carrier 62 API's are typically connected via the TCP/IP 52 between the OSS/BSS/SMSC 146 and the Operator Gateway Server 96, but they can use any network connections appropriate. The data contents and instructions are typically stored on the CRM Server 92.

For example, employing the Connection 54, or any network connection appropriate such as the SS7/VTC, in one embodiment a Recipient 46 presses the DTMF Action described (and pre-assigned by the Account 60) in response to an audio Message instruction heard, Message seen, and/or per a previous Action explained, as long as there is still an open Connection 54 or similar network connection there remains a one-to-one relationship for identifying the specific Recipient 46 and the request, or Action, comes through the CS 42 to the EP 50 or via some other network connection. The EP 50 knows which particular incoming Action request or set of instructions, came from which particular Recipient 46, because of the one-to-one relationship between the audio Message played via the audio Message's Message ID, and the corresponding Action ID and instructions. The Message Server 84 sends the Action request to the CRM Server 92 where the associated content and instructions are stored and are in turned passed to the Operator Gateway Server 96 and back to the OSS/BSS/SMSC 146 via the TCP/IP 52 connection.

In this embodiment, the Mobile Operator/Carrier 62 in control of the CS 42 with the corresponding OSS/BSS/SMSC 146 can then push the SMS/MMS Action Response back to the appropriate Calling (A) Party via Path 57 or any network connection appropriate. From the beginning of the connection between the Recipient 46 and the EP 50, the Message Server 84 creates and stores a unique session ID for that particular Recipient 46 and any subsequent communications. Should this particular Recipient 46 later perform an Action such as request information based on instructions delivered in an earlier audio Message, SMS/MMS, or some other Action, those Actions will contain the original unique session ID to track that particular Recipient 46 and the corresponding Actions.

Types of Actions which can be performed by a Recipient 46 can also include Clicks (on URLs embedded in the SMS/MMS message), Conversions (transactions traced through the unique session ID back to subscribers who heard or saw a particular Message), Page Views on WAP or Web sites (traced through the unique session ID back to subscribers who heard or saw a particular Message).

The WAP Server 100, for example, can deliver WAP content and interact directly with Recipients 46 via Connection 58 or any network connection appropriate for communications with the EP 50. When a particular Recipient 46 requests a WAP page, that Action request comes with the original session ID mapped through Tiny URL (explained more below) for that WAP page. Both WAP pages and Web Pages also can be related with this particular Recipient's 46 initial session ID by mapping through Tiny URL for the pages for tracking the collective effectiveness/success of a multi-step Campaign. Besides sending SMS/MMS responses through the Mobile Operator/Carrier 62 who controls the CS 42 and correlating OSS/BSS/SMSC 146, in another embodiment, the EP 50 could also host or subscribe to its own independent SMS/MMS server or service and such capabilities (not shown), similar to the WAP Server 100.

FIG. 4 illustrates the Message Management Platform 90. The MMP 90 includes modules, such as an Admin Module 104 and an Input Module 106. The Admin Module 104 is for managing the Exchange Platform's 50 overall Account 60 privileges, access, and for overall system management. The Input Module 106 allows third parties to create a login for their Account 60, and/or login to manage their existing Account 60. The Input Module 106 generally provides a means for information to be delivered into the NCS 38 by Accounts 60.

FIG. 5 illustrates the Input Module 106, which includes an Account Management 340 module. This Account Management 340 module allows the Accounts 60 to create and manage Campaigns using a Campaign Management 350 module depicted in FIG. 6.

FIG. 6 illustrates the Account Management 340 module which includes the Campaign Management 350 module, a Billing, Budgeting, and Bidding Module (hereinafter "BBBM") 352, a Reporting Module 354, a Message Management 360 module, and an Action Management 370 module. The Message Management 360 module represents all the creation and management of all the information, logic and instructions associated with the Messages and/or a series of Messages that are sent to the Recipients 46. The initial Message sent to the Recipient 46 is typically an audio clip, but could be any form of content, such as text, an image, video, etc. The Action Management 370 module represents all the creation and management of all the information, logic, and instructions associated with any follow-up to an initial Message and/or a follow-up to an earlier Action.

For example, a third party could log into the MMP 90 using the Input Module 106 to access their existing Account 60. The Account 60 could create a distinct Campaign using the Campaign Management 350 module and could assign an audio Message and instructions as to how, when and where to play the Message using the Message Management 360 module. In the Action Management 370 module the Account 60 could input what SMS message the Recipient 46 should receive should the Recipient 46 use the DTMF/Action as a response. All the EP 50's usage is tracked by the Reporting Engine 355 and sometimes referred to as Usage Tracking.

FIG. 7 illustrates the Message Server 84. The Message Server 84 includes an Account Engine (hereinafter "AE") 341, a Billing, Budgeting, and Bidding Engine (hereinafter "BBBE") 353, and a Reporting Engine (hereinafter "RE") 355.

The AE 341 depicted includes at least one rule generated in the Account Management 370, FIG. 6, typically related to setting up permission and roles for accessing data, content, Recipients 46, and Message Inventory. The Account's 60 Administrator with the broadest privileges will be referred to as a "Super Administrator". Each Account 60 can assign who is the Super Administrator who is then in charge of assigning all the Accounts 60 other privileges. The AE 341 works in concert with the BBBE 353 and is also explained in more detail ahead, including FIGS. 19, 24, 27, and 29. The BBBE 353 depicted includes at least one rule generated in the BBBM 352, FIG. 6.

The BBBM 352 allows the Accounts 60 to manage their own Account's 60 accounting, as well as the billing to other Accounts 60 (62-74). As a condition for allowing an Account 60 access to certain other Account's 60 data, Campaigns, and/or content such as audio Messages—the Super Administrator for the entire EP 50, the Super Administer of a particular Account 60, and/or a specific Account 60 general Administrator with the appropriate privileges (explained later under "Members/Roles", FIG. 23) can require and/or set financial consideration and/or budget constraints to other Accounts 60.

For example, the Super Administrator may setup specific financial consideration with specific thresholds in dollar amounts, times, and/or tolerance settings for other Accounts 60 to interact with their data. In addition, there could be specific thresholds in contents, roles, times, etc. related to Campaigns and/or with specifically set flat fees for a given period of time, a given quantity of inventory, a fixed amount per Message play, a fixed amount per Action taken, variable amounts based on rules (explained later), impression-based for Messages, Actions, and/or some combination (e.g., cost per thousand impression, or CPM), cost-per-click (CPC), cost-per-action (CPA), and/or other segmentation rule-based pricing approach (Segmentation Rules, Recipient Segmentation, and Segmentation Group Rules explained in more detail later). In an embodiment, the Account budget for allowing other Accounts access can be resolved before forwarding any Messages to any Recipients 46. The Exchange Platform 50 can manage any and all fees, including real-time and near real-time auction bids for inventory or specifically targeted segments, invoicing and collections.

Figure 8:
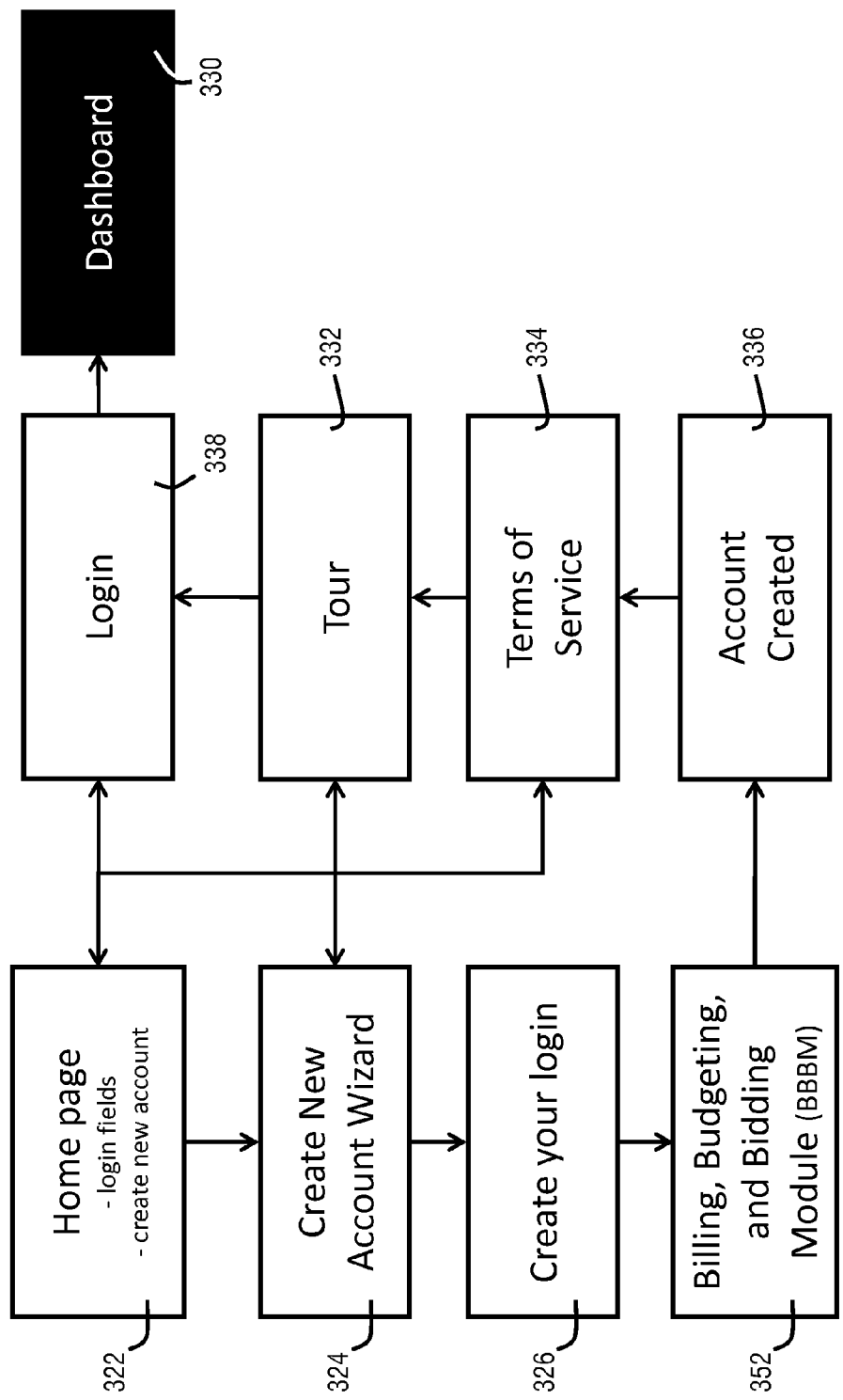
FIG. 8 of the accompanying drawings depicts a flowchart of a process by which the Account Management module uses the Message Management Platform to create an account.

FIG. 8 illustrates a flowchart of the process by which the Accounts 60 use the MMP 90 to create an Account. A Home Page 322, a Tour 332, and a Terms of Service 334 section are accessible without having an existing Account 60. The Home Page 322 and Tour 332 section contain a login field for the existing Accounts 60 or the ability to create a new Account 60 using a Create New Account Wizard 324 function followed by a Create Your Login 326 function, and the BBBM 352 to next get to an Account Created 336 function. The Account 60 can now access a Dashboard 330 menu.

Figure 9:
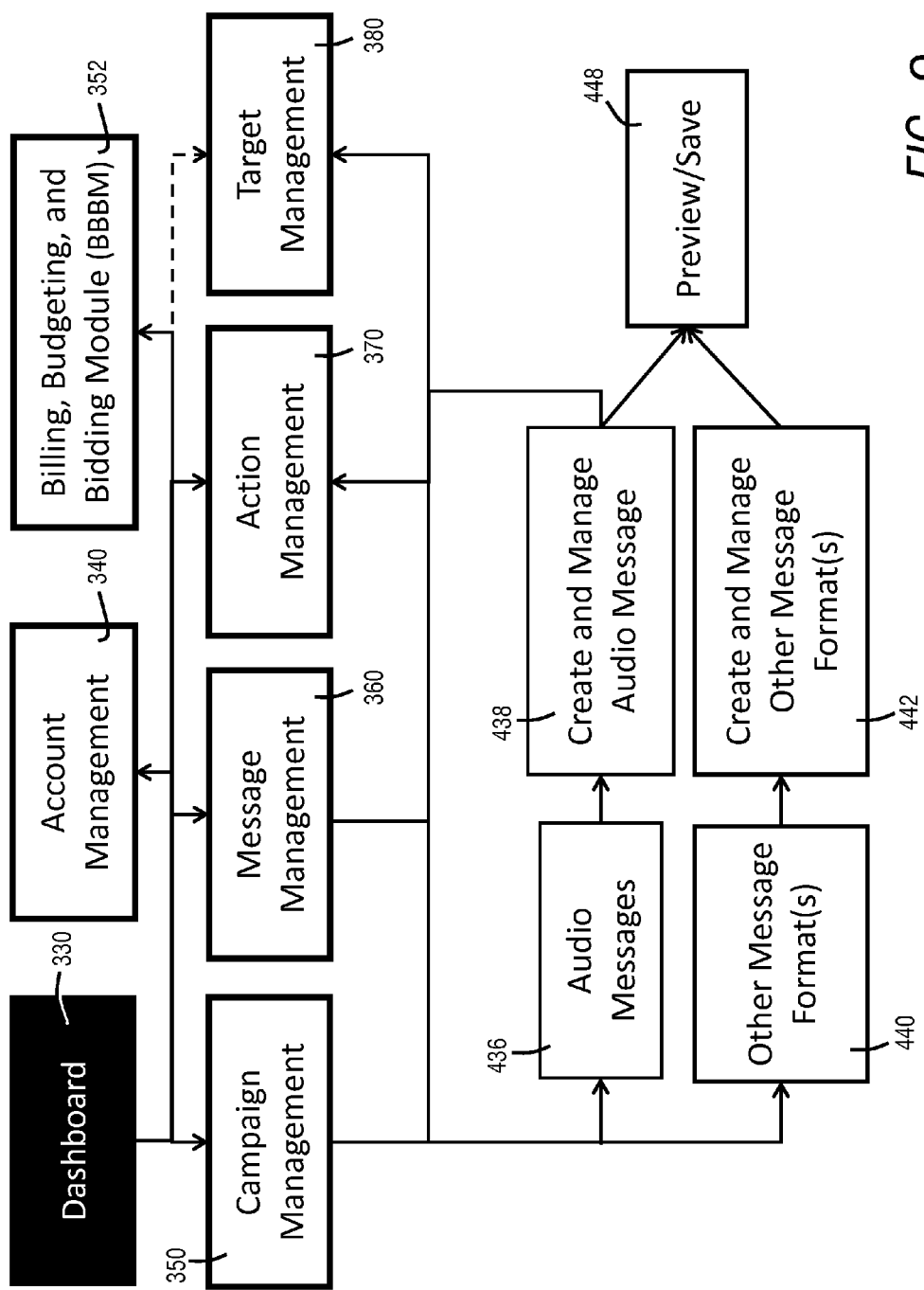
FIG. 9 of the accompanying drawings depicts a flowchart of a process of using the Account Management module to create and/or use the Campaign Management module.

FIG. 9 illustrates a flowchart of the process by which the Accounts 60 can create and/or manage Campaigns, Messages, Actions, Billing, Budgeting, Bidding, Account Settings and Targeting. From the Dashboard 330 in the previous FIG. 8, the Account 60 can enter and use an Account Management 340 module, the BBBM 352, a Campaign Management 350 module, a Message Management 360 module, and/or an Action Management 370 module. Each module and/or section can be setup and utilized independently.

For example, the Account 60 can go directly to the Message Management 360 module and create or edit Messages without first attaching these Messages to a specific Campaign, which can be done later. If a specific Campaign has been specified already by the Account 60, the Message Management 360 module allows the Account 60 to determine if the Campaign will use audio by utilizing an Audio Message 436 option and/or using another format by utilizing an Other Message Format(s) 440 option, for such formats as an image or video which can be created and managed utilizing a Create and Manage Other Message Format(s) 442 function before utilizing the Preview/Save 448 function.

A Target Management 380 module allows the Accounts 60 to link specific Campaign components such as Messages and Actions to a particular segmentation element, category and/or group of elements. These segmentation elements can also have rules associated with them independent of a particular Campaign or linked specifically for a particular Campaign. Segmentation elements can be relative to a Recipient 46, such as Geography, Demographics, Psychographics, Behavioral, Motion, Velocity, Direction, Altitude, Mode of Transit, Contextual, Mood, etc.; can be relative to time, such as the time of day, day of week, etc.; can be relative a budget, such as a monetary constraint per Message played to a Recipient 46, per Action taken by a Recipient 46, per result of an Action such as a Click, Conversion or Page View, etc.; and/or some combination of these elements and incorporating rules, such as Boolean operator rules (and, or, not, etc.), weighting, prioritizing, sequencing, etc. and will be explained in more detail later.

The option to use the Target Management 380 module becomes available to the Account's 60 Dashboard 330 after the Account 60 has been setup. A potential Campaign can be created and saved, such as with a particular Message or a particular Action, and can be tied to a specific Campaign, but targeting rules can also be built and managed independent of a specific Campaign. For example, targeting rules could be created for a group of Recipients 46 with specific characteristics, such as Males in Los Angeles, over 40. This targeting rule can be saved, reused, and/or applied later to other elements such as a specific Campaign as and when needed. Components such as Messages and Actions, segmentation elements, categories, groups, and/or groups with rules can be made available for use to others within the same Account 60, and/or to other Accounts 60, and these Account users are referred to as Members in this invention (more later).

Figure 10:
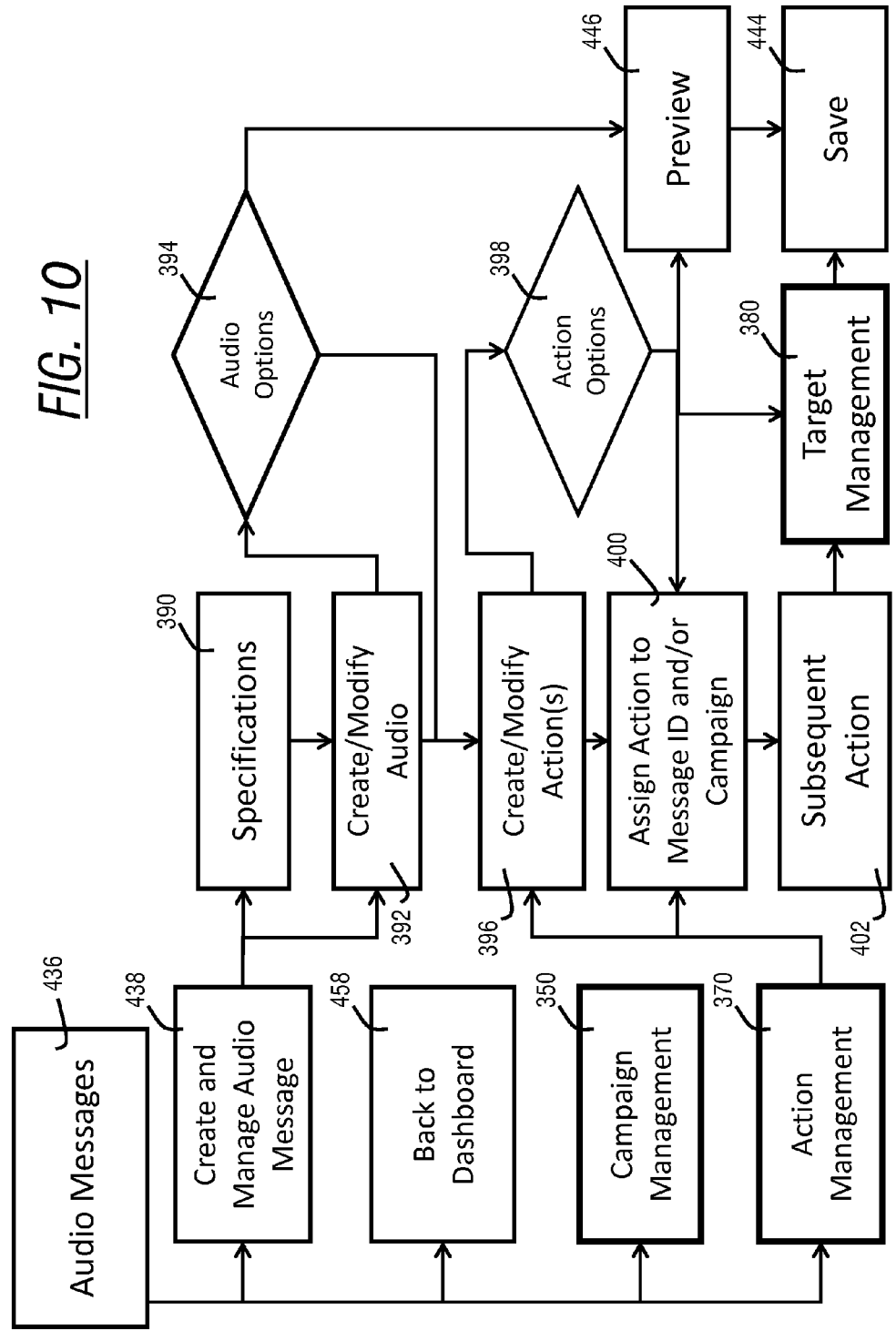
FIG. 10 of the accompanying drawings depicts a flowchart of a process by which the Account Management module can create and/or manage elements of a Campaign.

FIG. 10 illustrates a flowchart of the process example by which the Accounts 60 and their Members can use the Audio Message 436 functions for a particular Campaign. Using a Create and Manage Audio Message 438 function an Account 60 can access and utilize a Specifications 390 module to enter specification data such as the sound quality known or sound quality goals, the bit rate known or the goals, the playback time length known or the goals, etc. These values can be stated in terms of an absolute value and/or as a set of check boxes as to whether the Member will allow the audio to be re-sampled to fit each specific goal parameter. For example, an audio Message may have been recorded at five seconds in length, but an Account 60 Member specified in the Specifications 390 module before the actual audio recording that he/she was okay to have the audio re-sampled at a faster rate to squeeze down the total duration to, say a four second time window, but to go no smaller.

Figure 11:
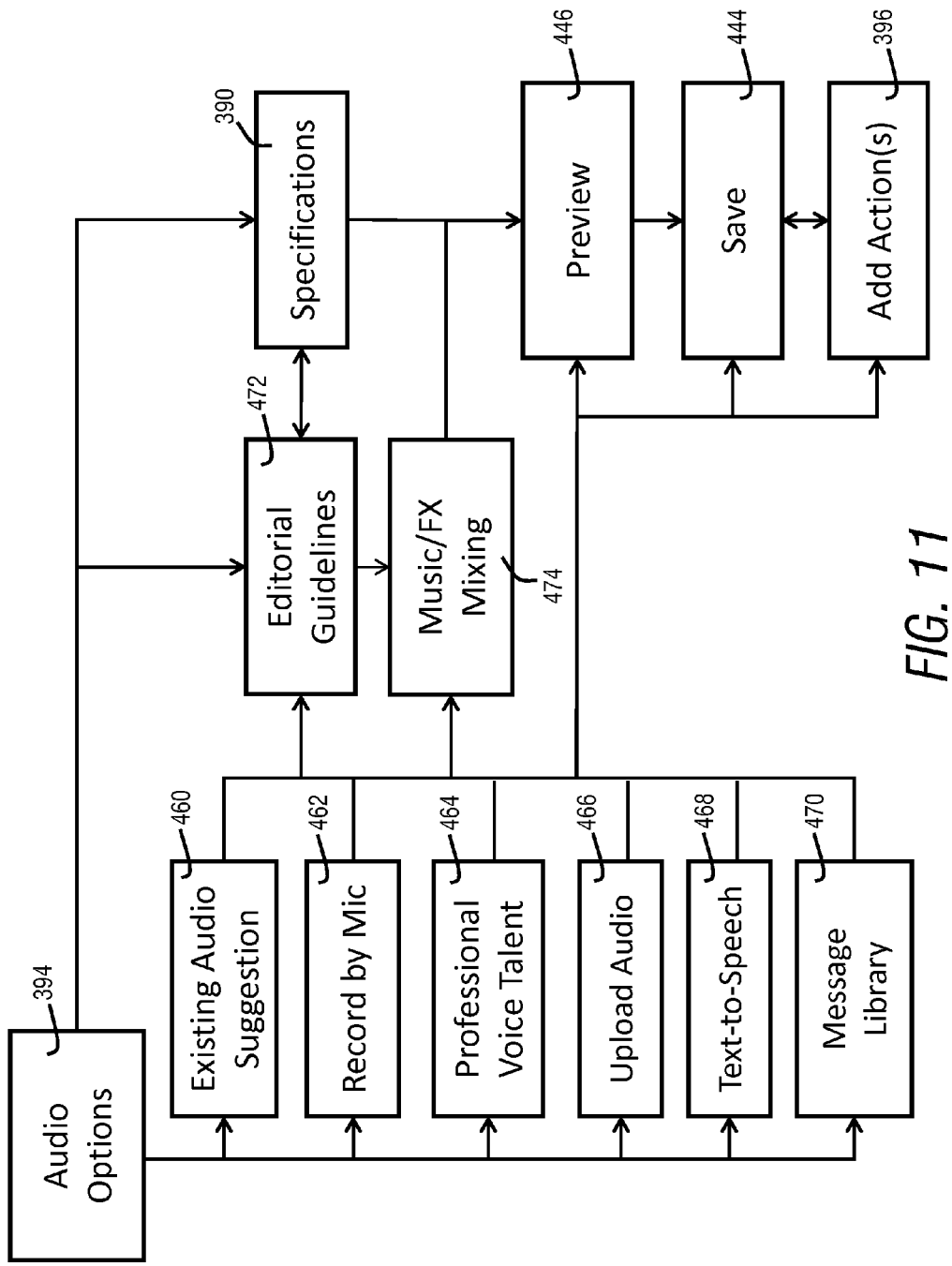
FIG. 11 of the accompanying drawings depicts a flowchart of a process by which the Account Management module can create and/or manage audio content within the Campaign.

A Create/Modify Audio 392 module allows the Account 60 a range of inputs via an Audio Options Module 394 as depicted in the next Figure, FIG. 11. A Create/Modify Action(s) 396 module allows the Account 60 to add at least one follow-up Action to the specific Message and/or their Account 60. Similar to the Audio Options 394 there is an Action Options 398 module in which the Account sets up Action preferences and rules such as whether a particular URL entered in a particular SMS/MMS Action Response will in turn be shortened to a Tiny URL (explained more below), will the clicks be tracked, and/or whether the phone numbers entered in for a particular SMS/MMS Action Response will in turn be replaced with a tracking phone number which then forwards to the Account-provided number (explained more later in FIG. 45). In an embodiment, the Account 60 specifies the original URLs and the phone numbers associated with an Action to the CRM Server 92 which can then replaces these URLs with a unique tracking URL that allows the CRM Server 92 to track whether a Recipient 46 visited the original URL or made a call to the original phone number.

The Action Options 398 module also contains a Library of existing Actions similar to the functionality available from the Audio Options in FIG. 11. An Assign Action to Message ID and/or Campaign 400 module is where the Account 60 can make existing Actions available only to a specific Message within a Campaign, to several Messages, and/or several Campaigns, only to those Members within their particular Account or Accounts, Divisions (sub-Accounts), a particular kind of an Account (e.g. Advertiser(s)/Brand(s) 68), and/or globally to all Accounts and/or Members for a limited time and/or for a limited budget threshold. A Subsequent Action 402 function allows the Account 60 to continually add Actions to a particular Message ID and/or Campaign that are assigned sequentially started with the initial Action, typically a DTMF (more on Actions in usage in FIG. 22 and utilizing the Action Management module in FIG. 30).

The Target Management 380 module also allows the Account 60 to assign multiple rules to Campaigns, Messages, and/or Actions and will be discussed in more detail later in several Figures, including: FIGS. 12, 13, 19, 20, 24-32, and 36-42. The Account 60 can Preview 446 and Save 444 the new materials and/or edits under the Account 60 and the MMP 90 also notes the author/Member, date, and time of each creation/modification, if known.

There can be several Actions and several Action types assigned to follow the initial audio Message delivered to the Recipient 46 in either a random order, in a predetermined sequence, or in a range of possible orders. Each Action taken by a Recipient 46 is tracked for its effectiveness relative to the conditions known and that particular Recipient's 46 known—or to be known data. Each Action can then be multi-variant tested against each other available Action to determine relative effectiveness to a particular segment. This performance testing enables the EP 50 to optimize it's effectiveness through data collected, and/or by Account-based rules.

For example, the initial Action in a predetermined series of Actions to a particular Message within a particular Campaign could be accept DTMF of "any phone key" and reply with an SMS of "please visit this url: www.action-example.com"; the second Action could be assigned to return a specific WAP page that was listed in the previous SMS text message; and the third Action in the series could be to email the Recipient 46 a specific coupon offer. A Subsequent Action 402 module allows the Account 60 to continue to add these Subsequent Actions to the initial DTMF Action.

FIG. 11 illustrates a flowchart example of the process by which an Accounts 60 can create and/or manage audio content using the Audio Options 394 from the previous FIG. 10. These Audio Options 394 allow the Accounts 60 to create audio advertising Messages and customer service Messages from scratch through a creative library that provides: a library of suggested existing Messages (Audio and other types), Message Scripts used for Campaigns for various topics and/or industries and uses; realistic text-to-speech with Inflection Control ("IC") that modifies the tones of the text-to-speech voices according to the Account's 60 requests; Message versioning (i.e. Pools, Classes, IDs, etc. explained later, including FIGS. 14a-17) and editing tools; ad preview, peer-review and ratings request/voting capabilities.

The options available to the Account 60 depicted in the left column in this example, start with an Existing Audio Suggestion 460 where the Account can obtain and/or search for suggestions based on similarities within the Accounts 60, Campaigns, Specifications 390, and/or keywords used in the Message Script used (the text script for the Message). A Record by Mic 462 option allows the Account 60 to record an audio Message, a Professional Voice Talent 464 option allows the Account 60 to assign the script to a particular voice-over talent by previewing the talent's work (the BBBM 352 handles billing for such services and payment to the professionals providing the voice over services), an Upload Audio 466 option allows for uploading existing audio files, a Text-to-Speech 468 module option allows for a software program known in the existing art to convert the text script to an audio Message and a Message Library 470 module option allows Accounts 60 to see all existing audio that the particular Member of that Account 60 has the appropriate privileges to preview, edit, and/or use along with any associated rules on usage, budgets, and time restraints (more details later under user interface examples, including FIGS. 38-50).

For example, some existing audio Messages in the Message Library 470 may be usable and editable by anyone in any Account 60, for any purpose, whereas some audio Messages may only be useable for a limited time, for a specific Campaign, and only to a particular Account 60 and/or a particular Member. These rules can be viewed for existing Messages and assigned to new audio Messages using an Editorial Guidelines 472 module and music and/or other special effects can be added and/or requested by utilizing a Music/FX Mixing 474 module, then Previewed 446 and Saved 444.

Figure 12:
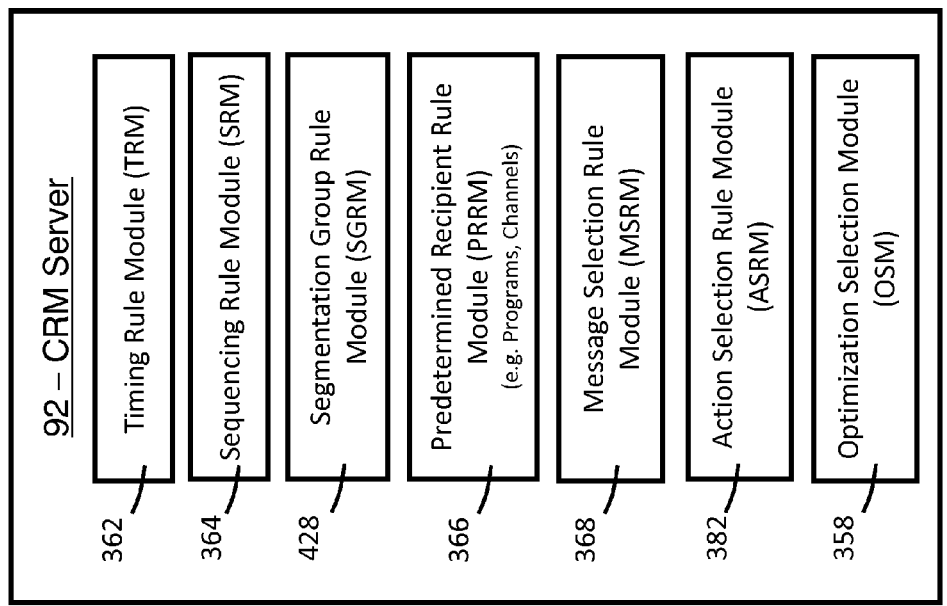
FIG. 12 of the accompanying drawings provides a block diagram for some of the components included within a Customer Relationship Management Server.

FIG. 12 illustrates the CRM Server 92. The CRM Server 92 includes a Timing Rule Module (hereinafter "TRM") 362, a Sequencing Rule Module (hereinafter "SRM") 364, a Segmentation Group Rule Module (hereinafter "SGRM") 428, a Predetermined Recipient Rule Module (hereinafter "PRRM") 366, the MSRM 368, a Action Selection Rule Module (hereinafter "ASRM") 382, and the OSM 358.

Figure 13:
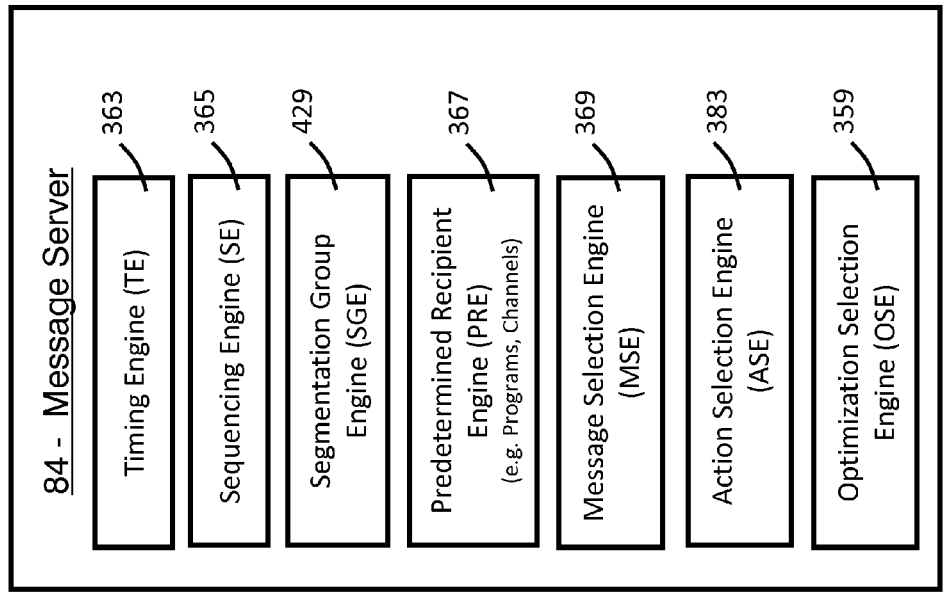
FIG. 13 of the accompanying drawings provides a block diagram for some of the additional components included within the Message Server.

FIG. 13 illustrates the Message Server 84. The Message Server 84 includes a Timing Engine (hereinafter "TE") 363, a Sequencing Engine (hereinafter "SE") 365, a Segmentation Group Engine (hereinafter "SGE") 429, a Predetermined Recipient Engine (hereinafter "PRE") 367, the MSE 369, an Action Selection Engine (hereinafter "ASE") 383, and an Optimization Selection Engine (hereinafter "OSE") 359.

The SGRM 428 depicted in FIG. 12 can be utilized by Accounts 60 to group individual rules and/or rule assignments together. These rule groups in turned get pushed to the SGE 429 and are typically utilized by the MSE 369. Segmentation Rules, Recipient Segmentation, and Segmentation Group Rules are all explained in more detail later.

The TE 363 depicted includes at least one rule generated in the TRM 362. The TE 363 provided in the Message Server 84 communicates to the Signal/Media Server 82, to which incoming Flagged Recipients 46 will receive/hear a Message based on several rules that have been collectively established by all the Accounts 60 using the TRM 362 and other rule modules. An Account 60 can setup a Campaign with Timing Rules through the TRM 362 for such things as limiting when Campaigns run or not run to particular days, days of the week and or times within a day. Another timing rule can control the "Frequency Occurrence" at which an incoming Flagged Recipient 46 will receive Messages.

For example, if the Frequency Occurrence was preset by an Account 60 to a 1:1 ratio for all Flagged Recipients 46 within a particular Campaign, than a Message would be played for every Flagged Recipient 46 routed to the EP 50. If instead, the Account 60 preset the Frequency Occurrence to a 30:1 ratio for all Flagged Recipients 46 for the same particular Campaign, than a Message would be played one out of every thirty times each identified Flagged Recipient 46 was routed to the EP 50. So that when the thirty-first call is made by the Flagged Recipient 46, he/she would receive another Message and not again until the sixty-first call is made in this 30:1 ratio example.

The Frequency Occurrence can be combined with other rules and/or segments of data, for such things as segmentation of Recipients 46. For example, a subset with a 30:1 Frequency Occurrence for Males under 40, and a subset with a 50:1 Frequency Occurrence for Males over 40.

There are many methods to segment data and apply rules independently or cumulatively for targeting Recipients 46. For example, a Mobile Operator/Carrier(s) 62, or another Account 60 who has been granted and/or paid for access to the necessary data, may wish to segment some of the Recipients 46 of a particular Campaign of theirs into different categories, say one for subscribers (the Mobile Operator's customers) who will need a mobile contract renewal within 60 days, and thus have a Campaign with Messages geared towards renewing, while another category of subscribers, say those who are tend to go over their monthly SMS prepaid allotment, and thus have a Campaign with Messages regarding a service up-sell to purchasing unlimited SMS. These delineations for separate Campaigns with rules for different subscriber audiences or groups as Recipients 46 are one type of segmentation.

FIGS. 14A through 17 illustrate how an Account 60 can further delineate Message assignment rules utilizing Sequencing Rules that the Account 60 entered into the SRM 364 and that are in turn pushed to the SE 365, and typically utilized by the MSE 369. FIG. 14A illustrates how the Account 60 can use the SRM 364 to further delineate Messages assigned to a Campaign. All the Messages assigned to a Campaign belong to at least one Message Pool and within each Message Pool is at least one Message Class, and explained more below. There are also Pools and Classes for Actions. Each Action belongs to at least one Action Pool and within each Action Pool is at least one Action Class assigned to a Campaign. These Pools, Classes, and individual Message and Action ID delineations allow for a variety of sequencing rules and functionality to be setup by Accounts 60 with the SRM 364 and used by the SE 365. The SE 365 in turn can be employed by other modules and engines, such as the PRE 367, the MSE 369, the ASE 383 and the OSE 359 (explained in more detail ahead).

In FIG. 14A has one Pool 130 of three Messages A, B, and C, where Pool 130 and the Class are treated as one in the same, since there are no additional delineations for Classes shown. Whereas, in FIG. 17 there is one Pool 132 of nine Messages, which includes an A Class 133 of three Messages: A1, A2, and A3; a B Class 134 with three Messages B1, B2, and B3; and a C Class 135 also with three Messages C1, C2, and C3. This one Pool 133 and three individual Classes distinction can be used by Accounts 60 for setting up sequencing rules for controlling the playback sequence of Messages (and Actions) sent to the Recipients 46 using the SE 365.

For example, using Classes A, B, and C assigned to a specific Campaign, the Messages may have a sequencing playlist rule of either: play each Class completely randomly; play each Class in a given sequence (e.g. A then B then C); play the B Class Messages only after the A Class Messages accomplishes a defined goal of, say getting the Recipient 46 to perform a specific Action (e.g. DTMF); play A Class Messages 50% of the time, play B Class Messages 30% of the time, and C Class Messages 20% of the time; and/or play each Class Message based only on instructions from the MSE 369.

In FIG. 14A, for example, the Account 60 could setup a rule that creates three distinct Classes of A, B, and C, unlike the previous FIG. 14A example where Pool 130 and the Class were the same. For this example, each Class (A, B, and C) has a single Message ID (A, B, and C) inside respective of their parent Class (A, B, and C). The Account 60 could setup additional rules to play any Class Message (A, B, or C) inside the Pool 130 completely randomly. Whereas in the FIG. 14B example, the same Account 60 could instead setup a rule to play any Class Message (A, B, or C) inside the Pool 131 also randomly, but as depicted here, set the EP 50 to maintain a balance of 33.3% between the on going selection of the three Class choices to play over time. This balancing of the three Classes playback/usage could be also given a plus/minus tolerance factor of, say, 5% by the Account.

In addition, the Account 60 could place weighting on the three Classes differently, say A=22%, B=44% and C=34% with a 5% tolerance for each (not shown), so that more than the A Class Messages maintains a 17-29% playback ratio of the total Messages in one Pool, the B Class Messages maintain a 39-49% playback ratio of the total Messages in one Pool, and the C Class Messages maintain a 29-39% playback ratio of the total Messages in one Pool's playback.

In the FIG. 15A example, an Account 60 has set up a rule to play A Class Messages, then B Class Messages, and then C Class Messages in a predefined sequence all within a single Pool 136. If each Class could have only one Message assigned inside it, then this sequence will play an A Class Message, then a B Class Message, and then a C Class Message (one Message on each subsequent call made by the same Recipient 46 who is assigned to the Campaign and assuming a Frequency Occurrence setting of 1:1). There could be further sequencing rules such as: only play the B Class Message after the Recipient 46 has responded to a particular call to Action from receiving the A Class Message.

Whereas in the FIG. 15B example, the Account 60 has setup a rule to play A Class Messages, the B Class Messages, and then C Class Messages sequentially, but with additional weighting, where the rule knows to only play the B Class Messages after 50% of the A Class Messages within the total Messages in the one Pool 137 (of all A, B, and C Class Messages combined) have been played either set to the total use for that Campaign and/or setup to measure what a particular Recipient 46 has received so far for Messages.

For example, in the case in which the Account 60 has elected to control what a particular Recipient 46 receives (as opposed to in total for the Campaign), if there were only one A Class Message in the Pool 137 that played the audio "Have a nice day" and with the weighting tied to the Recipient's 46 usage, that Recipient 46 would receive that A Class Message twice before the sequence rules would then play the same Recipient 46 a B Class Message once, and then play a C Class Message once, due to the A=50%, B=25%, and C=25% sequence and weighting.

If on the other hand, the same Account 60 had used the same A=50%, B=25%, and C=25% sequence and weighting parameters, but instead set the Sequencing to be say, overridden by a particular Recipient 46 Action, then this particular Action would trigger the subsequent Class Message to be played the next time the same Recipient 46 was routed and scheduled to receive another Message from the EP 50.

In FIG. 16A, the Account 60 has setup a sequence rule of A Class Messages, then B Class Messages, then C Class Messages, and then D Class Messages whereas in FIG. 16B, the Account 60 has setup a different sequence rule of A Class Messages, then C Class Messages, then D Class Messages, and then B Class Messages. This allows the Account 60 to apply different sequences rules to different segmentations of Recipients 46 while still being able to reuse existing four Classes of A, B, C and D Messages.

For example, the sequence setup in FIG. 16A could be applied to Flagged Recipients 46 who are known to be a certain demographic, such as males. Whereas the sequence rules set up in FIG. 16B could be applied to Flagged Recipients 46 who are known to be females or males within a certain Geography. These Recipient Segments are exampled in more detail later under a Recipient Segmentation Module (hereinafter "RSM") 356 in FIGS. 23, 24, and 26, where the Account 60 can create and define different segments.

FIG. 16A could also depict an example sequence, again of four Messages Classes divided to Classes A, B, C, and D that were assigned to a particular Campaign of those Recipients 46 who are most likely to pay his/her bill late. For this example, the Class A Messages are friendly hellos, the Class B Messages are gentle payment reminders, the Class C Messages are specific reminders that they have only 3 days left to pay their bill on time, while the last Class D Messages could be have them to connect to customer service because their bill is now past due. So far all the Messages reside within one Pool 138, but if the Account 60 felt that each Class of Messages, Classes A, B, C, and D could be further divided, say for Messages that have been found to work better on younger Recipients 46, say those under 25, from those Messages that have been found to work better on older Recipients 46, say those older than 25. Then the Account 60 could have two separate Pools (not shown) that both have the same sequences of Classes A Messages followed by B, then C and D last. The Messages within each Class have the same purpose, but would be geared for different Recipient 46 audiences or Segmentations.

In FIG. 17, the Account 60 has a sequence rule of play A Class Messages, then B Class Messages, and then C Class Messages. There are nine total Messages in the Campaign Pool 132, three in the A Class (A1, A2, and A3); three in the B Class (B1, B2, and B3); and three in the C Class (C1, C2, and C3). The Account 60 can setup a range of rules combining the logic explained in FIGS. 14A through 16B.

For example, using the logic and weighting used in FIG. 15B for FIG. 17, the Account 60 is allowing the playback sequence just from A Class Messages to B Class Messages to be either, A1, A2, then B1; A1, A2, then B2; A1, A2, then B3; A1, A3, then B1; A1, A3, then B2; A1, A3, then B3; A2, A3, then B1; A2, A3, then B2; and A2, A3, then B3 because of A Class group weighting of 50% (from FIG. 15B applied to FIG. 17). If the Account 60 did not care about equal usage of A1, A2, and A3 with in the A Class Messages, then A1, A1, then B1 and so on are also playback sequence options.

A particular "Campaign W" with only one Message ID "A" assigned has only one Message Pool in use, with only one Message Class inside and in use, with only one Message ID "A" inside and in use. Another particular "Campaign X" with the two Message IDs "A" and "B" assigned, could also have only one Message Pool and only one Message Class inside and in use.

However, another particular "Campaign Y" with the same two Message IDs "A" and "B" assigned, could instead have each Message ID assigned to separate Message Pools as in the two different Pools illustrated in FIGS. 16A and 16B, where 16A has a Pool 138 could contain either the A or B Message ID verses FIG. 16B has a Pool 139 and would contain the other Message ID not in the Pool 138. Both Pool 138 and Pool 139 are assigned to the same "Campaign Y", but now each Pool has only one Message ID each inside (not shown), instead of the four (letters) shown in FIGS. 16A and 16B.

Another particular "Campaign Z" with the same two Message IDs "A" and "B" assigned, could have only Message Pool similar to FIG. 17, but two different Classes within the Message Pool, using Class 133 and Class 134, where Class 133 could contain either the A or B Message ID verses Class 134 would contain the other Message ID not in the Class 133 (not shown). Both Class 133 and Class 134 are assigned to the same Pool 132 and to the same "Campaign Z", but now each Class has only one Message ID each inside (not shown), instead of the three (letters per Class) shown in FIG. 17. The above Pool and Class delineation examples for Message IDs in Campaigns W, X, Y, and Z, also hold true for Action IDs.

Returning back to FIG. 13, the PRE 367 depicted includes at least one rule generated in the PRRM 366 (Predetermined Recipient Rule Module), FIG. 12. The PRE 367 determines if a Flagged Recipient 46 has been predetermined by any particular Account to belong to a predetermined Campaign and which typically has predetermined Messages or a predetermined Message Pool assigned to that particular Flagged Recipient 46.

The PRRM 366 located within the CRM Server 92 in FIG. 12 collects, maintains, and stores all the data, logic, and instructions associated with any Recipients 46 that have been pre-assigned or predetermined to receive Messages without employing the use of the MSE 369 for a particular Account 60 and/or a particular Campaign and pushes synchronized copies of all the necessary components (Messages, Actions, rules, programs, channels, etc.) of that specific Campaign information to the PRE 367 in FIG. 13 for near real-time usage in the Message Server 84.

The PRRM 366 allows Accounts 60 to manage Messages, Actions and the associated rules that has been pre-assigned to a particular Recipient 46 for a particular Campaign, Program and/or Channel. Programs are Campaigns that are typically governed by the Mobile Operator/Carrier 62 in control of the Recipient's 46 who connect to the CS 42 and are generally created to fulfill specific categories of company goals and/or functions, such as: (1) a Customer Relationship Management (hereinafter "CRM") Program which includes customer service and Life Cycle Management (hereinafter "LCM"); (2) Up-selling Programs which include upgrading a mobile subscriber's contract and/or handset; (3) Opt-in; and (4) Pay-in- Advance Programs. An example of a CRM Program would be setting up a Campaign specifically for delinquent subscribers, where the Flagged Recipients 46 receives a Message or Messages regarding their past due bill until the delinquent Recipient 46 performs a predefined Action, such as pays the balance or contacts customer service.

Opt-in and Pay-in-Advance Programs generally have content or Messages that Recipients 46 request to receive around categories of interest, such as: sports, entertainment, news, travel, weather, financial news, gossip, health, technology, religion, culture, politics, etc. For example, the Recipient 46 could learn about an Opt-in and/or Pay-in-Advance Program from a Message he/she heard from a Campaign promoting the Mobile Operator/Carriers' 62 Program options.

The Recipient 46 can perform an Action such as pressing a DTMF command with their Communication Device 75 to request more information about the Program or Program options. Depending on how the Campaign's Actions have been set up, the Recipient's 46 request to the MSP 80, FIG. 3, could return another audio Message with more information via the Connection 54 (or any other appropriate network connection, such as the IMS/LTE); a SMS/MMS type message from the OSS/BSS/SMSC 146 (FIG. 2) which could be sent from the Operator Gateway Server 96 via the TCP/IP 52 connection; a WAP page from the WAP Server 100 via either TCP/IP 52 or 58; an email from the CRM Server 92; and/or send what is called an External Communication request from the CRM Server 92 to a specific Account 60 for such things as an email or piece of direct mail to then be sent directly from the specific Account 60 offering that particular Program and/or Channel (more below).

Recipients 46 could use an Action such as pressing a DTMF command to pay for a Program and/or a Specific Channel in increments, such as monthly. For example, a Program could include Messages regarding current sports scores from ESPN®. These ESPN® Messages could be further designated as ESPN® Sports Scores Channels for different sports. The Channels could all belong to one Program and/or a range of Programs that Recipients 46 could sign-up and pay for. Depending on how the Programs and/or their subordinate Channels are set up, the corresponding Messages can also be set up to play at specific times and/or as certain events/alerts justify. These instructions can be set up by the Accounts 60 and/or the Recipients 46 (and are explained in more details in FIGS. 27, 28, 43-50).

Figure 18:
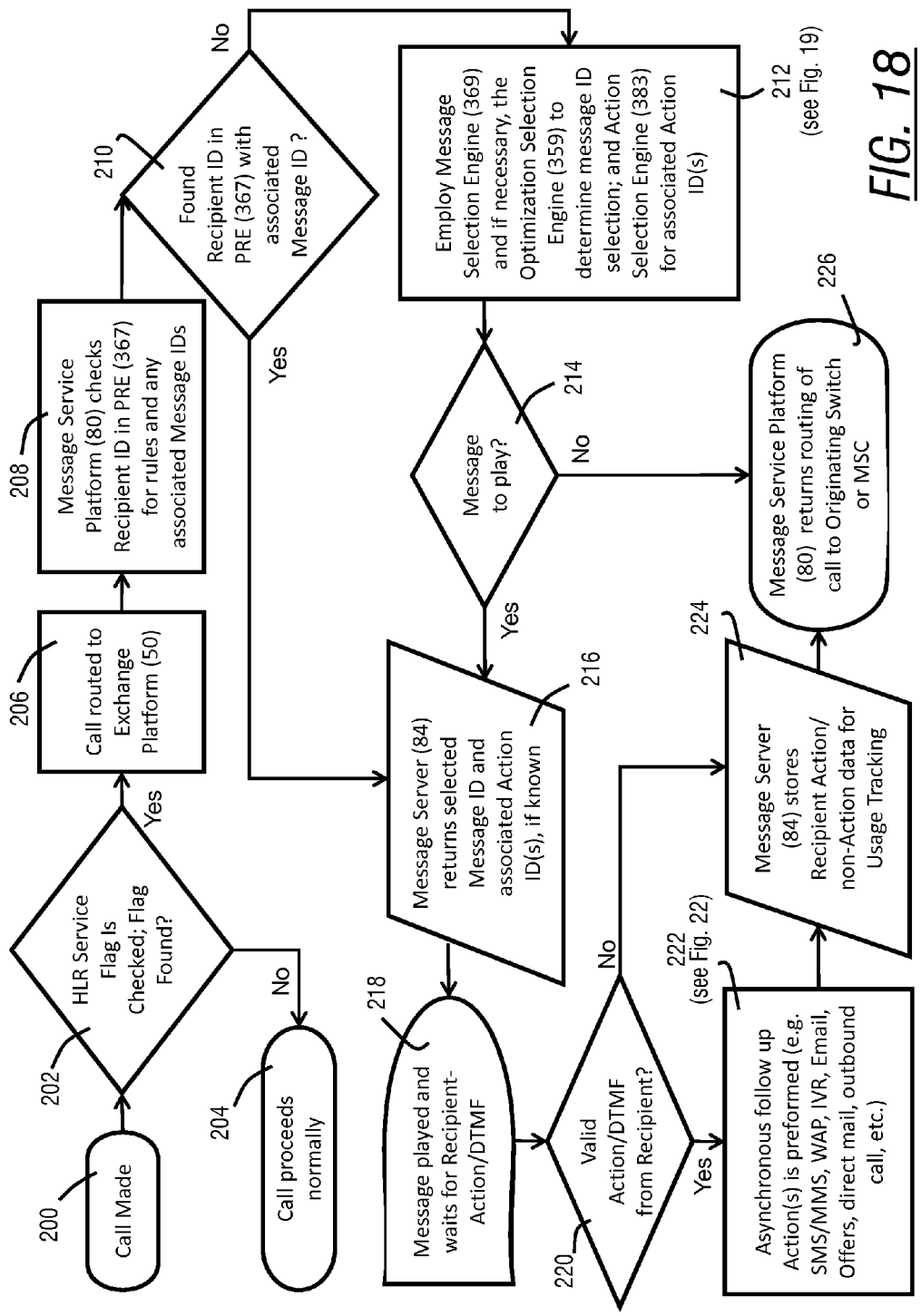
FIG. 18 of the accompanying drawings depicts a flowchart of a process by which a call can be handled and processed in real-time by the Network Communication System.

FIG. 18 illustrates a flowchart of an embodiment of a call flow process in use. Starting with a "Call Made 200" by a Calling (A) Party 40, the call routes through the CS 42 where a "HLR Service Flag Is Checked; Flag Found? 202" query answers a set of instructions to determine if the Calling (A) Party 40 is a Flagged Recipient 46 or not. If not flagged, it routes the call to a "Call Proceeds Normally 204".

If step 202 is answered "Yes" then the "Call is routed to Exchange Platform (50) 206" where a "MSP (80) checks Recipient ID in PRE (367) for rules and any associated Message IDs 208". If the answer to a "Found Recipient ID in PRE (367) with associated Message ID? 210" is "Yes", then a prompt is sent where a "Message Server (84) returns the appropriate Message clip ID and associated Action ID(s) 216". If step 210 is answered "No", then a prompt is sent to an "Employ MSE (369) and if necessary, the OSE (359) to determine the Message ID selection; and ASE (383) for associated Action ID(s) 212" (explained in detail in FIGS. 19, 20, and 21).

The MSE 369 should send a single Message ID to a "Message to Play? 214". If step 214 is answered "No", as in there is no Message ID or if there is no Message found associated with that particular Message ID, then a "Message Service Platform (80) returns routing of call to Originating Switch or MSC 226" step is taken. If the answer to step 214 is "Yes" as in there is a Message associated with the ID and an available Message to play, then a "Message Server (84) returns selected Message ID and associated Action ID(s), if known 216" to the Signal/Media Server 82 where a "Message played and waits for Recipient-Action/DTMF 218" is the next step.

If the answer to the query was there a "Valid Action/DTMF from Recipient? 220" results in "No", during the duration of time that the Connection 54 remains open, then a "Message Server (84) stores the Recipient Action/non-Action data for Usage Tracking 224". If the answer to query 220 is "Yes", then an "Asynchronous follow up Action(s) is performed (e.g. SMS/MMS, WAP, IVR, Email, Offers, direct mail, outbound call, etc.) 222" and sent back to the Recipient 46. Next, a "Message Server (84) stores Recipient Action/Non-Action data for Usage Tracking 224" is performed. Then the "Message Service Platform (80) returns routing of call to Originating Switch or MSC 226".

Figure 19:
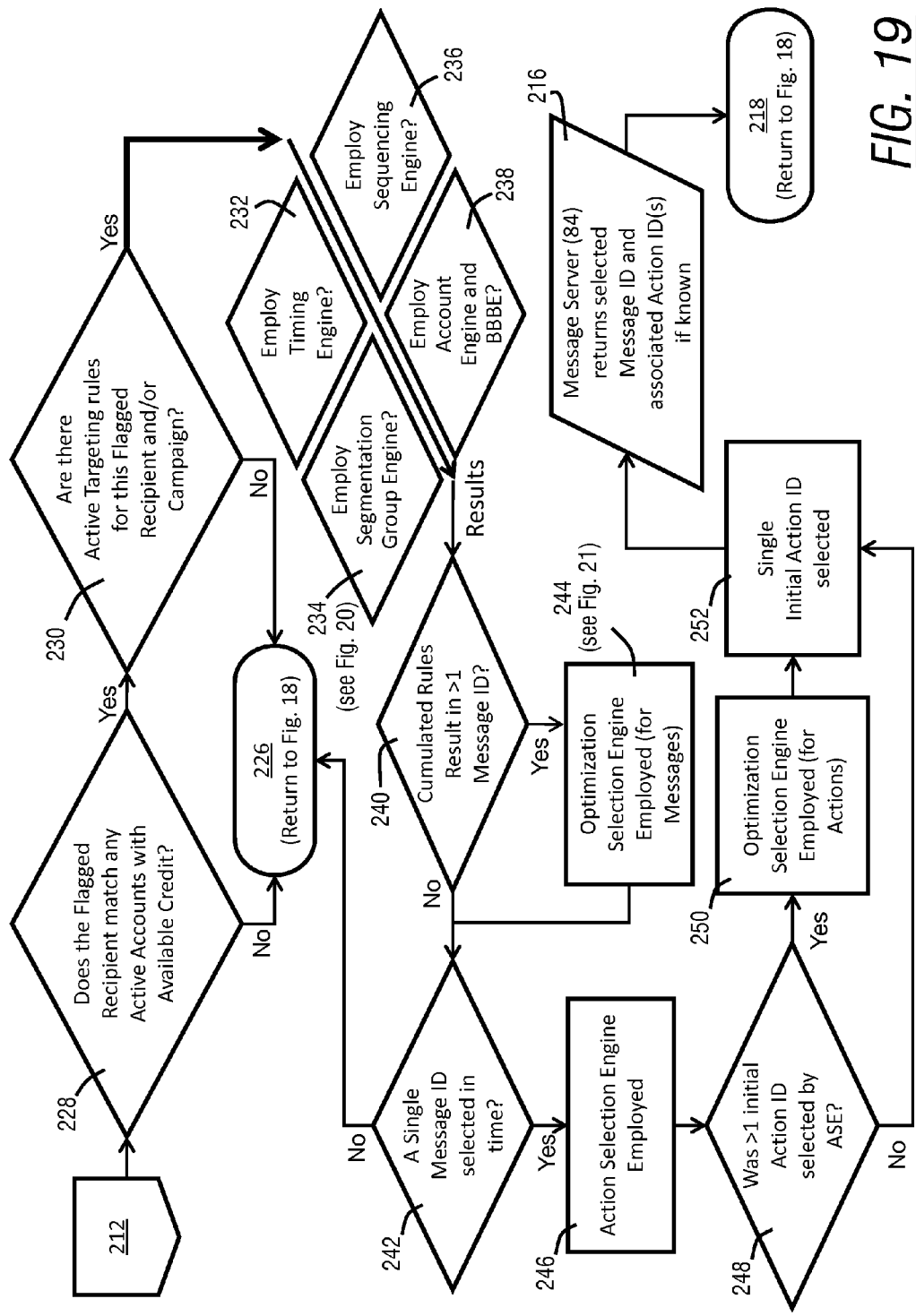
FIG. 19 of the accompanying drawings depicts a flowchart of a process by which a Message Selection Engine (MSE) is used in the call flow.

FIG. 19 illustrates a flowchart of an embodiment of the steps taken by the MSE 369, OSE 359, and ASE 383 stating with part 212 on the previous FIG. 18. The following step asks: "Does the Flagged Recipient 46 match any Active Accounts with Available Credit? 228". If the answer is "No", then the call is routed back to step 226 in the previous FIG. 18. If the answer is "Yes", then the next step asks "Are their Active Targeting rules for this Flagged Recipient 46 and/or Campaign? 230". If the answer is "No", then the call is also routed back to step 226 in the previous FIG. 18.

If the answer to query "230" is "Yes", then the Message Server 84 uses the combined results of the MSE 369 by invoking several cumulative queries, including an "Employ TE? 232"; "Employ SE? 236"; "Employ Segmentation Group Rules? 234"; and "Employ Account Engine and BBBE? 238'. If any of these steps 232, 234, 236, or 238 result in a "No" answer, then the MSE 369 continues to calculate the remaining data in the other steps. The "Employ TE? 232" involves the Campaign's associated rules for Timing, including Frequency Occurrence and was explained earlier in FIGS. 12 and 13. The "Employ SE? 236" involves associated rules for Sequencing and was explained earlier in FIGS. 12-17.

The "Employ Account Engine and BBBE? 238" involves the AE 341 in concert with the BBBE 353. The AE 341 manages which Accounts 60 have access to other Accounts 60 and the BBBE 353 manages the access for those Accounts 60 who do have permission for such things as bidding on available Message Inventory, data collected by the RE 355, such as Usage Tracking data and Recipient data. For example, Accounts 60 can bid for available Message Inventory that they have been granted access to and/or bid based on specific Segmentation Group Rules that they have setup. These Segmentation Group Rules are utilized by the "Employ Segmentation Group Engine? 234" and is explained in detail in the following FIG. 20.

The cumulative results of these rules and associated instructions are passed to step 240 as a list of prioritized Message IDs, from those that have been played the most to played the least (if known). If the answer to the query: Do these "Cumulative MSE Rules Result in >1 Message ID? 240" is answered "Yes", then the "OSE 359 [is] Employed (for Messages) 244" and this step is explained in detail in FIG. 21. If the answer to query 240 is answered "No", then the results are passed to the next query to ask if "A Single Message ID (is) selected in time? 242". If the MSE 369 results had no Message ID, or if the MSE 369 took too long to perform the results based on a time completion requirement known in this 242 step, then the answer here is "No" and then the call is routed back to step 226 in the previous FIG. 18.

If the answer to step 242 is answered, "Yes", as in there is a single Message ID and it was identified within the completion time requirements known to step 242, then that Message ID is passed to the step where an "Action Selection Engine (is) Employed 246". The Action Selection Engine first checks to see if the Message ID has a predetermined single initial Action pre-assigned to it (not shown in illustration). If the initial Action is not pre-assigned, typically a DTMF with corresponding SMS, then the ASE 383 performs cumulative rule instructions similar to the MSE 369 to determine a priority list of possible and appropriate initial Actions.

The Message ID and cumulative ASE 383 results of these rules and associated instructions are passed to query 248 as a list of prioritized initial Action IDs associated with the Message ID, from those Action IDs that have been used by Recipients 46 the most to the least used (if known). If the query: "Was >1 initial Action ID selected by ASE? 248" is answered "Yes", then the selected Message ID and its list of associated Action IDs are passed to the step where an "Optimization Selection Engine Employed (for Actions) 250" is preformed and a similar in logic as the steps for selecting a single Message ID by the OSE 359 explained in detail in FIG. 21.

If the answer to query 248 is answered "No", then the selected Message ID and associated Action ID ASE 383 results are passed to the next step where "A Single Initial Action ID [is] selected 252" and assigned to the selected Message ID. If the ASE 383 results had no Action ID, or if the ASE 383 took too long to perform based on a time completion requirements then step 252 still passes the selected Message ID along to step 216 without any assigned initial Action and the issue is tracked for correction by the EP 50 (explained under "Workflow" later). In the next step the "Message Server (84) returns the selected Message ID and associated Action ID(s) if known 216" to step 218 back in FIG. 18.

The reason some steps, such as step 216, allow for more than one Action ID to be sent is for Campaigns with preset Subsequent Action sequences and not to be confused with the previous steps to assign a "single initial" Action to a Message ID. For example, the initial assigned Action to a Message ID could be for a specific DTMF with a specific SMS Action Response, as well as a subsequent pre-assigned and specific WAP page URL. This information would be tracked and utilized as a predetermined Action when the Recipient 46 responded to the assigned SMS.

Figure 20:
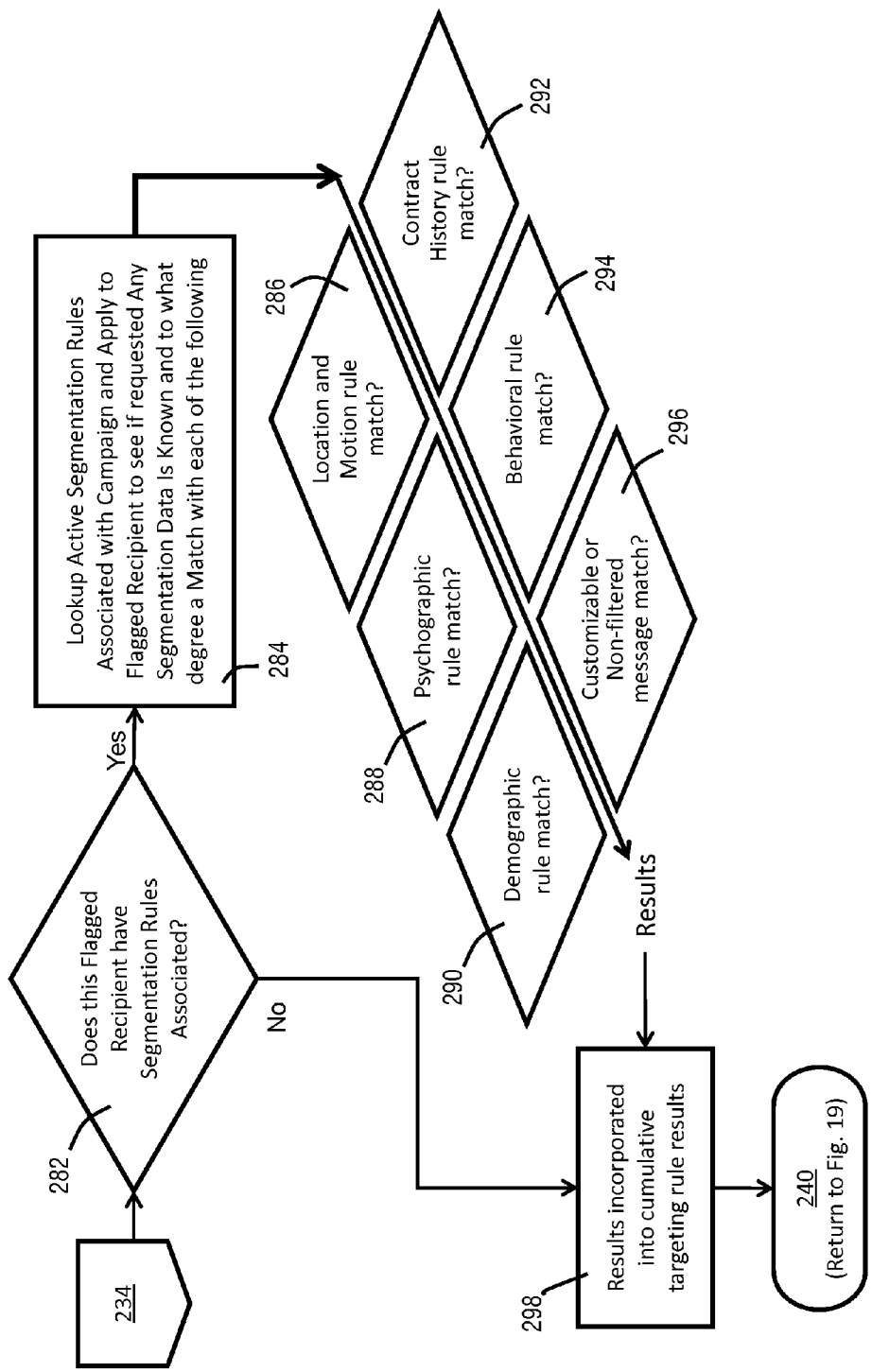
FIG. 20 of the accompanying drawings depicts a flowchart of a process by which Segmentation Group Engine can be employed in the call flow.

FIG. 20 illustrates a flowchart of one embodiment of the steps taken by the Segmentation Group Rules employed back in step 234 on FIG. 19. The first query asks "Does this Flagged Recipient 46 have Segmentation Rules Associated? 282". If the answer is "No", then results are passed as "None" to the last step where a "Results incorporated into cumulative targeting rule results 298" is performed. If the answer to step 282 is answered "Yes", then SE 365 performs a "Lookup Active Targeting Rules Associated with Campaign and Apply to Flagged Recipient 46 to see if requested Recipient Segmentation Data is known and to what degree a Match with each of the following 284" function is preformed, where "the following" are the six steps asking for a "Location and Motion rule match? 286"; a "Psychographic rule match? 288"; a "Demographic rule match? 290"; a "Contract History rule match? 292", a "Behavioral rule match? 294", and a "Customizable or non-filtered rule match? 296". (These Recipient Segmentation Rules are explained in more detail, including FIGS. 23-26, 29, 36-42).

The cumulative results get passed to the "Results incorporated into cumulative targeting rule results 298" step which incorporates all the necessary logic, instructions, and associated data to contribute to the MSE 369 which in turn is passed to part 240 back on FIG. 19.

Figure 21:
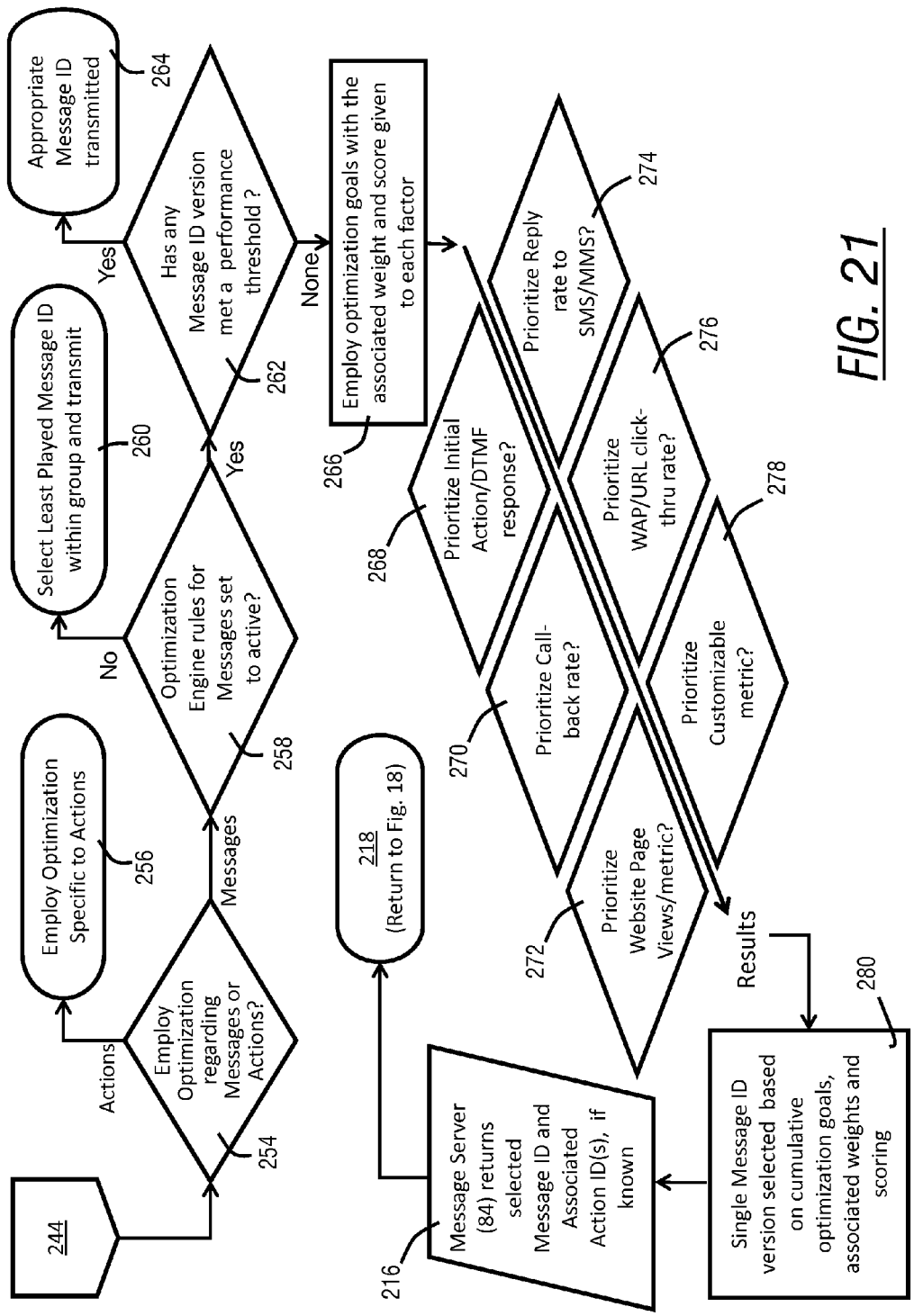
FIG. 21 of the accompanying drawings depicts a flowchart of a process by which an Optimization Selection Engine (OSE) is used in the call flow.

FIG. 21 illustrates a flowchart of an embodiment of steps taken by the OSE 359 in furtherance from step 244 on FIG. 19. The first step asks an "Employ Optimization regarding Messages or Actions? 254" query. If the answer to query 254 is answered "Actions", then the Message ID and list of potential Actions and instructions get passed to an "Employ Optimization Specific to Actions 256" step, where the system employs logic (not shown) similar to the steps here for Messages.

If the answer to query 254 is answered "Messages", then the list of Message IDs gets passed to an "Optimization Engine rules for Messages set to active? 258" query. If the answer is "No" then a "Select Least Played Message ID within group and transmit 260" step is invoked. If the set of Message IDs in step 260 has more than one Message ID tied for equaling the "least played" Message, this step selects randomly a single Message ID from this list of "least played" Messages and that single Message ID is then passed back to step 218 on FIG. 18.

If the answer to query 258 is "Yes", then the next query asked is: "Has any Message ID version met a performance threshold? 262". This performance threshold is predetermined and set up by the Accounts 60 using the OSM 358. For example, if an Account 60 setup a "performance threshold" of, say, "one-thousand plays" for a particular Campaign, then step 262 would pass any Message IDs with "one-thousand plays" or more on to an "Appropriate Message ID transmitted 264" step. If there are more than one Message ID tied for equaling the "most played" Messages, this step 262 selects randomly a single Message ID from this list of "most played" Messages and that single Message ID is passed back to step 218 on FIG. 18.

If the answer to query 262 is that "None" of the Message IDs in the list have met the "performance threshold" then the entire list of Message IDs are passed to an "Employ optimization goals with the associated weight and score give to each factor 266" function where this step can have a rule to either send the entire list of Message IDs or reduce the list to some preset quantity, of say, no more than the ten "most played".

The following six steps are employed: a "Prioritize Initial Action/DTMF response? 268"; a "Prioritize Call-back rate? 270"; a "Prioritize Website Page Views/metric? 272", a "Prioritize Reply rate to SMS/MMS? 274", a Prioritize WAP/URL click-thru rate? 276", and a Prioritize Customizable metric? 278" to provide cumulative results that get passed to a "Single Message ID version selected based on cumulative optimization goals, associated weights and scoring 280" function.

For example, if ten Message IDs where collectively sent from step 266 and the only active rule was select the Message ID with the "highest initial Action/DTMF response" relating to step 268, then the other five functions 270, 272, 274, 276, and 278 would be ignored and the Message ID with "the highest initial Action/DTMF response" would become the single Message ID selected in function 280. The OSM 358 rules can add logic and Boolean operators. For example, a rule could first state take the Message IDs with the top four "highest initial Action/DTMF response" and then second, re-prioritize those four Message IDs based on the Messages that performed best at generating website page views from step 272.

The single Message ID with cumulative best performing rule results would pass from step 280 to the next step where a "Message Server (84) returns selected Message ID and Associated Action ID(s), if known 216". "Associated Action IDs", meaning some Message IDs may only have the initial Action pre-assigned to them, where some others may have the initial Action and some Subsequent Actions pre-assigned to them, and further, some other Message IDs may be setup to allow the ASE 383 to select the most appropriate Action(s). The "Message Server (84) returns selected Message ID and Associated Action ID(s), if known 216" on to step 218 back on FIG. 18.

Figure 22:
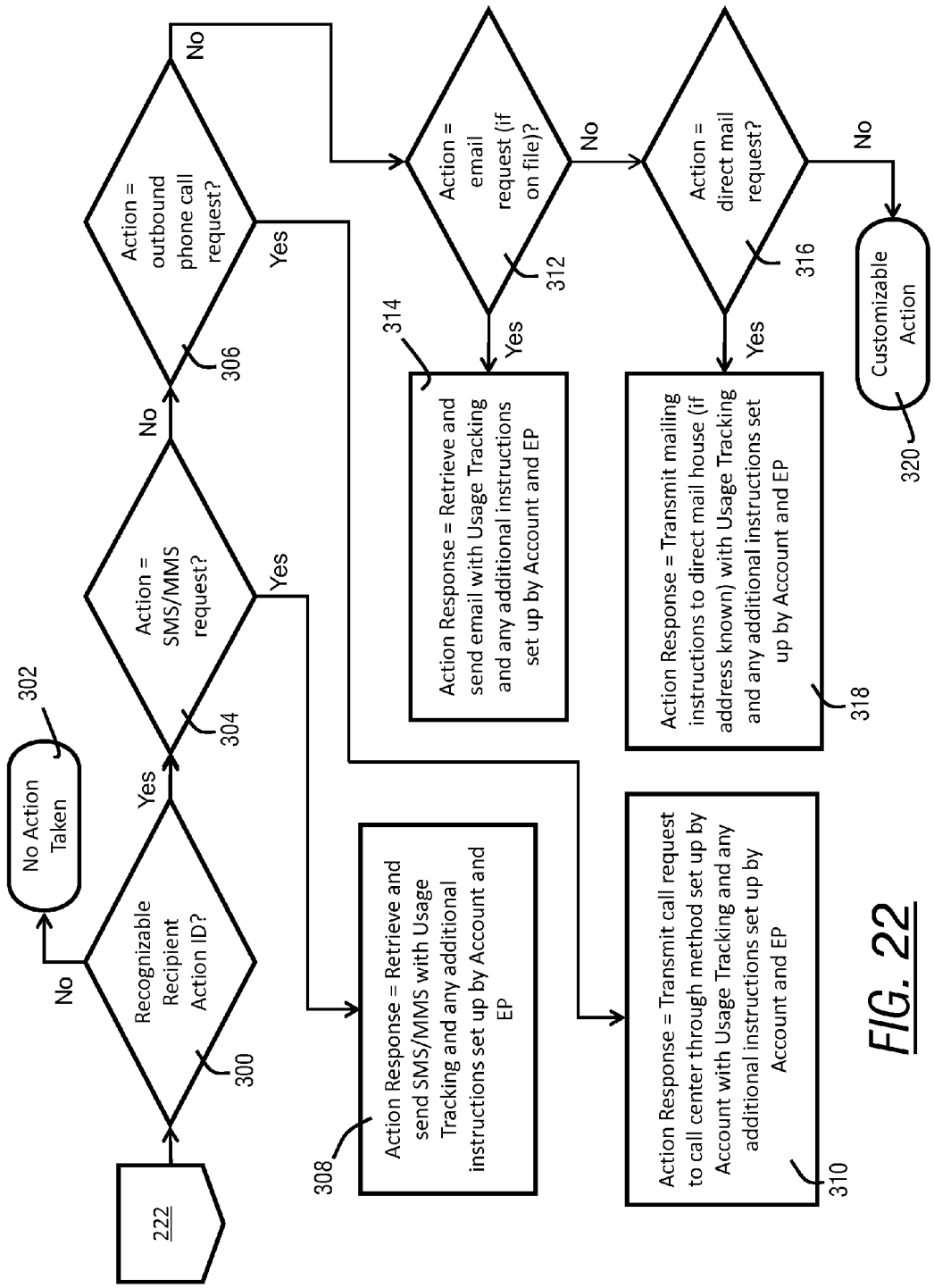
FIG. 22 of the accompanying drawings depicts a flowchart of a post-message Action handling as used in the call flow.

FIG. 22 illustrates a flowchart of an embodiment of the steps taken after a Recipient 46 responds to a Message with an Action depicted back in step 222 on FIG. 18. The first step asks if the Recipient Action is a "Recognizable Recipient Action ID? 300". If the answer to this query is "No", then a "No Action taken 302" is invoked. If the answer to query 300 is answered "Yes", then the Recognizable Recipient Action ID is passed to the next query to ask is it an "Action=SMS/MMS request? 304".

If the answer to 304 is "Yes", then the Action ID is passed to a "Action Response=Retrieve and send SMS/MMS with usage tracking and any additional instructions set up by the Account and EP 308" function that is invoked. "Action Responses" are subset of Actions and refer to an Action sent back to the Recipient 46 in "response" to the Action taken by the Recipient 46 and the "additional instructions set up by the Account and EP" can be for such things as employing a Tiny URLs and/or Tiny phone numbers (explained earlier), Subsequent Action(s), and/or instructions when and where to employ the MSE 369, ASE 383, and OSE 359.

If the answer to query 304 is "No", then the Action ID is passed to the next query to ask if an "Action=outbound phone call request? 306". If the answer is "Yes" to query 306, then the Action ID is passed to an "Action Response=Transmit call request to call center through method set up by Account with Usage Tracking and any additional instructions set up by the Account and EP 310" function. If the answer to query 306 is "No", then the Action ID is passed to the next query to ask is "Action=email request (if on file)? 312".

If the answer to query 312 is "Yes", then the Action ID is passed to a "Action Response=Retrieve and send email with Usage Tracking and any additional instructions set up by the Account and EP 314" function that is invoked. If the answer to query 312 is "No", then the Action ID is passed to the next query to ask is "Action=direct mail response? 316". If the answer to 316 is "Yes", then the Action ID is passed to an "Action Response=Transmit mailing instructions to direct mail house (if address known) with Usage Tracking and any additional instructions set up by the Account and EP 318" function that is invoked.

If the answer to 316 is "No", then the Action ID is passed to a "Customizable Action 320" function that is invoked. At step 320 an Account can create rules for a "catch all Action" for when the Action ID or IDs that were thought to be "recognized" in query 300, but passed through all available Action lookup step queries (e.g. queries 304, 306, 312, and 316) without an Action ID assignment found. Then a rule setup by the Account could be to employ a default Action (e.g. a SMS with the text "Please try again"), to invoke the No Action taken 302 function, or to invoke some set of rules whereby Actions are selected from an available Pool of Actions randomly and/or per a specific Campaign Pool of Actions and Action Rules.

Figure 23:
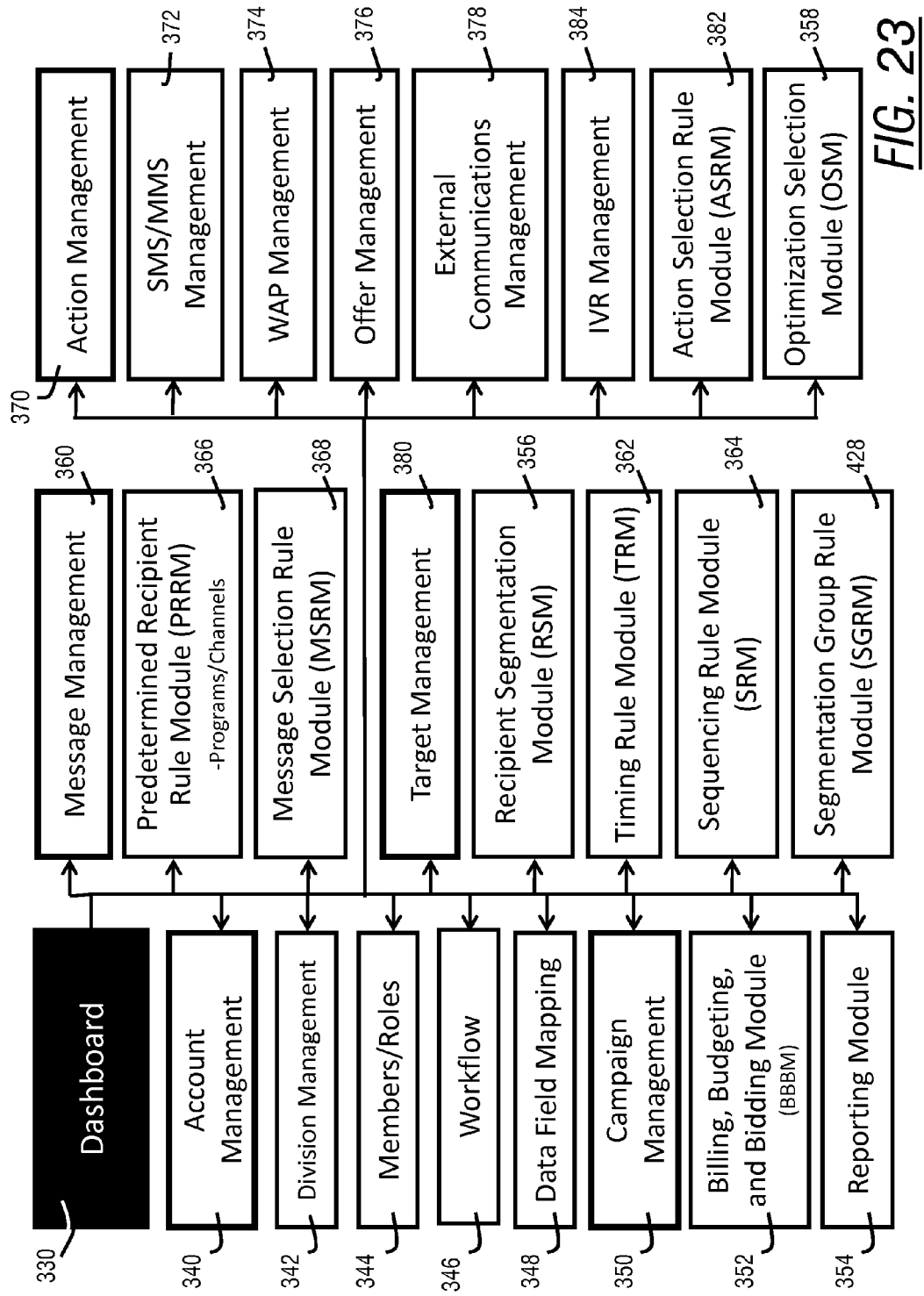
FIG. 23 of the accompanying drawings depicts a flowchart of a process by which the Accounts use the Message Management Platform's UI to create and/or manage the Campaign.

FIG. 23 illustrates a flowchart of the process by which the Accounts 60 can create and/or manage most of the functional elements of their Account 60 and Campaigns from a Dashboard 330. The Account 60 can also setup sub-Accounts or divisions using a Division Management 342 module. For example, an Account 60 such as Sprint®, may want separate divisions created and tracked for Sprint® Post-paid accounts, Boost Mobile®, and Virgin Mobile®.

From the Dashboard 330 an Account 60 can use an Account Management 340 module to assign and monitor login permissions to Members of that particular Account 60 and a Members/Roles 344 module to assign different roles and permissions to Members of that particular Account 60 and to other Accounts 60.

Additional Dashboard 330 functionality comes from a Workflow 346 module, a Data Field Mapping 348 module, and the Recipient Segmentation Module (hereinafter "RSM") 356 all explained with later more Figures. The TRM 362 allows Accounts 60 to manage the ratio and timing of Messages played to a Recipient 46 in a particular Campaign, the SRM 364 allows Accounts 60 to manage the Message sequencing within a particular Campaign and/or across Campaigns.

In addition, the Account 60 can also manage almost all the Actions from the Dashboard 330, including a SMS/MMS Management 372 module, a WAP Management 374 module, a Offer Management 376 Module (in FIG. 31), an External Communications Management 378 module (in FIG. 31), an IVR Management 384 module, the ASRM 382, along with the earlier described Account Management 340, Campaign Management 350, Message Management 360, Action Management 370, Billing, Budgeting and Billing Module 352, and Reporting Module 354.

The MSRM 368 in FIG. 23 and back in FIG. 12, in an embodiment collects, maintains, and stores all the data, logic, and instructions associated with any Messages that will make use of the MSE 369 for a particular Account and/or Campaign and pushes synchronized copies of all the necessary components (Messages, Actions, rules, programs, channels, etc.) of that Campaign information to the MSE 369 in FIG. 13 for near real-time usage in the Message Server 84.

The ASRM 382 in FIG. 23 and FIG. 12 in an embodiment collects, maintains, and stores all the information, logic, and instructions associated with any Campaigns that will make use of the ASE 383 for a particular Account and/or Campaign and pushes synchronized copies of all the necessary components of that Campaign information to the ASE 383 in FIG. 13 for near real-time usage in the Message Server 84. The OSM 358 in FIG. 23 and back in FIG. 12 collects, maintains, and stores all the data, logic, and instructions associated with any Campaigns that will make use of the OSE 359 for a particular Account and/or Campaign and pushes synchronized copies of all the necessary components (Recipient Segmentations, Optimization Rules, etc.) of that Campaign information to the OSE 359 in FIG. 13 for near real-time usage in the Message Server 84.

The Message Server 84 depicted back in FIG. 13 collects, maintains, and stores all the data, logic, and instructions associated with any Account 60, Campaign, Message, and Action and pushes synchronized copies of all the necessary data to the CRM Server 92 in FIG. 12 for interactive usage in performance, tracking, optimization, segmentation, reports and billing, and/or custom Account 60 requests and subsequent management of the data.

Figure 24:
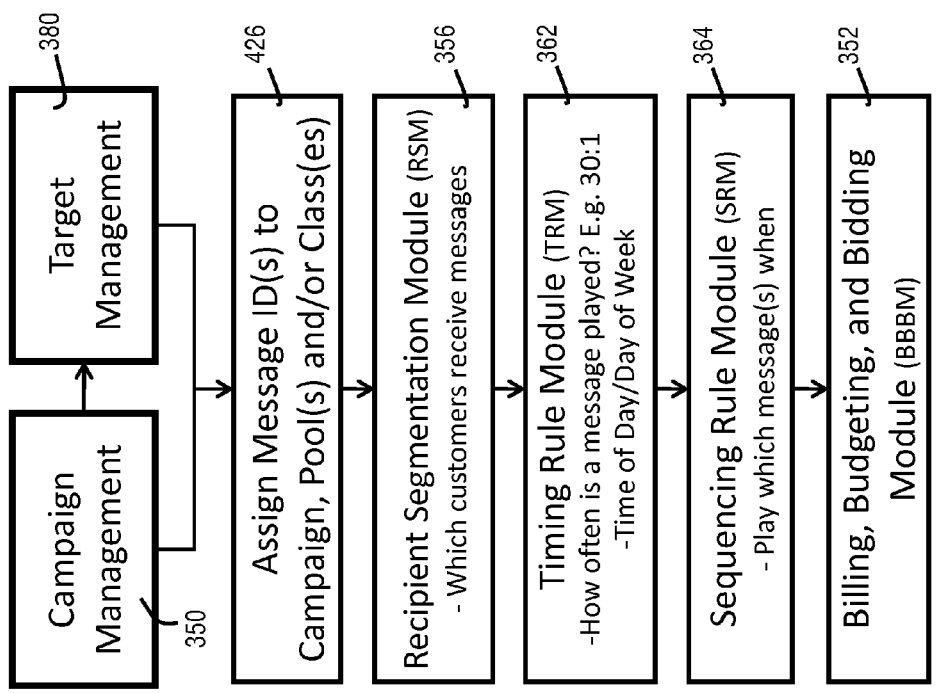
FIG. 24 of the accompanying drawings depicts a flowchart of a process by which the Accounts use the Message Management Platform's UI to create and/or manage the Campaign with Targeting and Billing, Budgeting and Bidding options.

FIG. 24 illustrates a flowchart of one example process by which an Account 60 could set up the Campaign with Targeting instructions. These Targeting instructions are collectively used by the MSE 369, but can also be utilized by the ASE 383, the OSE 359 and/or for setting up Campaigns for Predetermined Recipients 46 (and is explained more detail in FIGS. 27 and 28). The Campaign Management 350 module and the Target Management 380 module are accessible from the Dashboard 330. An Assign Message ID(s) to Campaign and/or Classes 426 first step below allows the Account 60 to select a Message ID or a group of Message IDs that will then be associated with the subsequent rules assigned in steps taken by the Account 60 below. If the Account 60 navigated to the "Assign Message ID(s) to Campaign and/or Classes" 426 through the Campaign Management 350 module, then the Message(s) assignment will be applied to a particular Campaign. If the Account 60 navigated to the "Assign Message ID(s) to Campaign and/or Classes" 426 through the Target Management 380 module, then it depends if the Account 60 had previous setup a specific Campaign before entering the Target Management 380 module. If so, then the same conditions would apply, but if the Account 60 instead had not setup up a particular Campaign and simply navigated through the Target Management 380 module then the "Assign Message ID(s) to Campaign and/or Classes" 426 would be independent of a Campaign and would simply be either a single Message ID or a group of Message IDs with Class and Pool assignments (explained earlier, including FIGS. 14A-17). This ability to create Target Rules independently of Campaigns is beneficial for reusing and sharing pre-existing rules with a plurality of Campaigns, Campaigns elements, and/or a plurality of Accounts 60 on an individual Target Rule by Target Rule basis.

The RSM 356 allows Accounts 60 to segment the potential Recipients 46 into segments (and has been explained in FIG. 20 and is explained in more detail in several Figures ahead, including FIG. 26). Next is the TRM 362. The TRM 362 allows Accounts 60 to setup such timing rules as the Frequency Occurrence for a particular Recipient 46 and/or for a particular Campaign, and segment additional timing perimeters and rules, such as the time of day, day of the week, for a particular Campaign and/or Campaign element that were explained earlier. Next is the SRM 364 (also explained earlier, included in FIGS. 14A-17), followed by the last step depicted, the BBBM 352.

The BBBM 352 allows Accounts 46 to set rules, thresholds and limits on their budgets, billing and bidding for a particular time period, a particular Campaign, a particular Message/Message ID, a particular Action/Action ID, and/or some combinations of these parameters. In addition, an Account 60 can also set the same rules, thresholds and limits to be placed on other Accounts 60 that are tied into the EP 50, Account by Account, whereby those other Accounts 60 may wish to participate in the usage of the EP 50 that is connected to a specific CS 42 where a specific Mobile Operator/Carrier 62 and/or some other specific Account 60 has control over the final communication link to a particular Recipient 46 or group of particular Recipients 46, such as Verizon's® mobile subscribers. There are other factors and methods for using Targeting that will be explained in more detail in several Figures, including FIGS. 26, 29 and 36.

Figure 25:
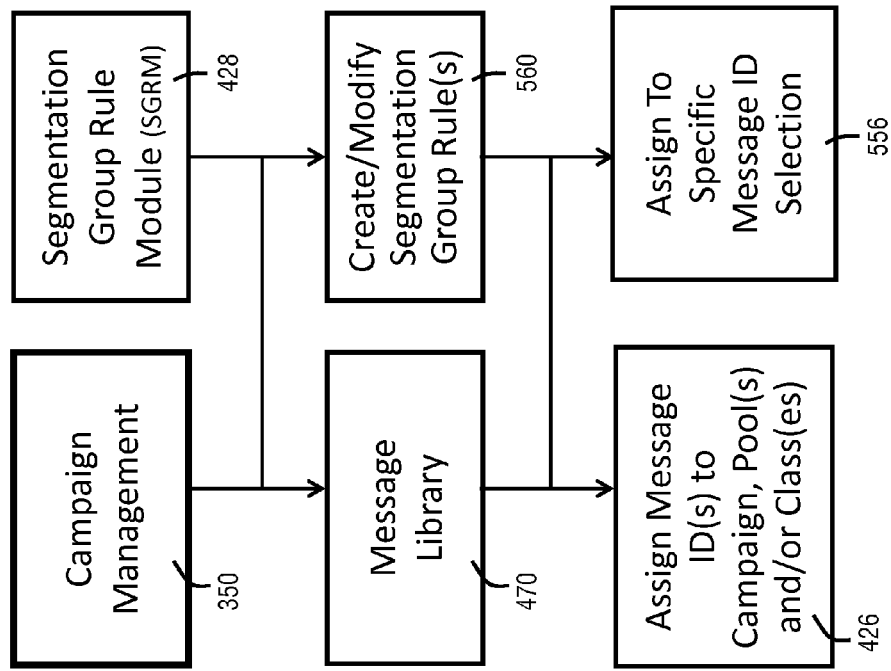
FIG. 25 of the accompanying drawings depicts a flowchart of a process by which the Accounts use the Message Management Platform's UI to create and/or manage the Campaign with Segmentation Rules.

FIG. 25 illustrates a flowchart of an example process by which the Accounts 60 can setup groups of Segmentation Rules using the SGRM (Segmentation Group Rule Module) 428 and match those segmentation group rules to a particular Campaign using a Campaign Management 350 module option, and/or a Create/Modify Segmentation Group Rule(s) 560 and apply the group rules to using either an Assign to Specific Message ID Selection 556 option and/or the Assign Message ID(s) to Campaign, Pool(s), and/or Class(es) 426 option, where the rule can be applied to a single Pool for the entire Campaign (and/or a specific Pool(s) and/or Class(es) verses assigning to a single Message ID available in option 556.

The Account 60 can also use a Message Library 470 module option to review and/or search existing Message IDs and Message Pools, and/or Message Classes. Usage of the RSM 356 and the SGRM 428 (a collection of Segmentation Rules) will be explained in detail both by flowcharts ahead in FIG. 29 and examples with the user interface starting on FIG. 36.

FIG. 26 illustrates a flowchart of the menu functionality process by which the Accounts 60 can setup Recipient Segmentation instructions to be used by a particular Account, Campaign, Message and/or Action. These instructions are used by the MSE 369 and the SGRM 428, but can also be utilized by the ASE 383, the OSE 359 and/or for setting up Campaigns for Predetermined Recipients 46 (explained in more detail later). The RSM 356 is accessible from the Dashboard 330, and through the main management menus 350, 360, 370 and 380.

From the RSM 356, an Account 60 can access a Segmentation Overview 476 that explains the purposes and functionality of using the RSM 356 and a Search 584 function to search for existing Recipient Segmentation Rule(s). A Create/Modify Segmentation Rule(s) 478 function allows Accounts to create new rules from scratch and/or select existing rules. An Assign Segment Rule(s) to Campaign ID(s) 480, an Assign Segment Rule(s) to Message ID(s) 482, and an Assign Segment Rule(s) to Action ID(s) 484, each allow an Account 60 the ability to pick and choice where and how to apply existing Recipient Segmentation rules and/or a newly created rule.

An Account 60 can create a new Recipient Segmentation Rule for entire Campaign or a Campaign element, such as a particular Message, a particular Message Class, a particular Message Pool, and/or a particular Action. Recipient Segmentation Rules need at least one piece of Recipient Data and are typically tied to at least one Campaign element, but can be stored and re-used independently. Rules can incorporate thresholds, weighting, and prioritize the Recipient 46 data into a number of Recipient 46 categories. These types of Recipient 46 categories for creating rules accessible by the Account 60 include a Demographics 486 module option, a Psychographics 488 module option, a Location and Motion 490 module option, a Behavioral 492 module option, a Contract History 496 module option, and/or a Customizable and Requests 498 module option.

The Demographics 486 module option can include such individual Recipient 46 data items as age/DOB, gender, race/ethnicity, home address, work address, marriage status, sexual orientation, occupation, religion, work industry, and the like. The Psychographics 488 module option can include a Recipient's 46 current and past personality, tastes, interests, values, lifestyle, opinions, attitudes, and the like.

The Location and Motion 490 module option can include the Recipient's 46 current location, including an elevation, and this information can be calculated and measured against the Recipient's 46 previous location, in increments of time and/or distance to also determine the Recipient's 46 current, past, and/or future velocity. These data points can also be measured and compared against historical data of the same Recipient 46 and/or other Recipients 46 who have traveled the same path, distance, velocity, and/or time pattern, to create unique set of data points for targeting relevant information. In addition, these comparative data points can help predict likely destination(s), when compared along with data from the current starting point and the current location of the Recipient 46.

Some Mobile Operator/Carrier 62 data comes from the Flagged Recipient's 46 calls that are routed to the EP 50. This collected and utilized data can consist of one or more call features associated with the communication. For example, one or more of the call feature(s) could be determined from the call itself, such as the originating number, the intended destination number, the time and data of the call.

When Mobile Operators/Carriers 62 cannot provide geo-location data, the Message Server 84 rule engines will look for other cues when assigning a default geography for a Recipient 46, including any available billing address data and/or called number data.

The Location and Motion 490 module can also be set up to analyze the call history of each Flagged Recipient's 46 communication device and determine that a significant portion of the calls are made to, for example, a pizza parlor. This information can be set up in advance with Mobile Operator/Carriers 62 and/or the data could be pulled as needed into the EP 50 from the CS 42, typically stored in the OSS/BSS/SMSC 146. Accordingly, with this information, the MSE 369, based on rules pre-established in the MSRM 368, could select either one or more pizza parlors and/or food related Message IDs to play as advertisements to the Flagged Recipient 46.

This can also include such tools as either location sensing technology, responding to geographical cues, and/or a tool that can infer location based upon past location data patterns and, where available, incorporate the Recipient's 46 phone number and/or the Called (B) Party's 44 phone number. For example, a particular Calling (A) Party 40 who has a New York City cell phone number, but whose location data from the Mobile Operator/Carrier's 62 O-MSC 140 shows that the caller is nearly always in Los Angeles could be served Messages, based on a set of rules whereby, either the Calling (A) Party 40 is always treated like a Los Angeles subscriber even though he/she has a New York cell number; is treated like the typical Los Angeles subscriber when calling from Los Angeles; as long as a certain percentage of current phone calls are made from within Los Angeles; and/or some other set of rules that could define the difference between the pattern of calls made by a typical resident of a particular region verses the pattern of calls typical of someone who is just visited that particular region.

If the Calling (A) Party 40 is always calling NYC from outside that area code, then NYC specific Messages could be targeted towards him/her as a potential visitor, such as travel packages or hotel rates. The MSRM 368 rules employed for targeting this Recipient 46 can also include past purchases made using or routed through the EP 50; inquiries from/of Messages directed to this Recipient 46; times associated with follow-up Actions; and what types of Messages and/or Campaigns the Recipient 46 has responded to better. Furthermore, successful Campaigns that are based on a particular region could expand to subscribers known to have similar calling patterns. These calling patterns could go beyond geography, to be based on any similar data patterns collected, such as time of day.

The Behavioral 492 module option can include all the Recipient's 46 other collectable behavioral data, conscious or unconscious, including travel behaviors, history, and patterns; mobile communication behaviors (e.g. beyond the Contract History 496), history and patterns; EP 50 usage behaviors, history and patterns; purchase behavior, history, and patterns; and the like.

The Behavioral 492 module, as well as the other module options, differentiate between the change in relevancy over time between past data (behaviors) and likely current interests. For example, historical behavioral data could support that a particular Recipient 46 who is known to play games on their communication device (mobile handset) is more likely or less likely to have an extended period of interest in games relative to his/her increased or decreased usage.

The Behavioral 492 module is also designed to collect data that can help gauge the interest by a particular Recipient Segment regarding a topic or behavior over time. Each data point can have a different rate of propensity reduction over time. The propensity reduction factors can be determined by evaluating a particular Recipient's 46 Actions or non-Actions, and then testing patterns from which the EP 50 can calculate the relative differences in data (behaviors) over time.

In another example of historical behavioral data, a test group of Recipients 46 could use an Action that is a response to allow future plays or to not allow future plays a particular holiday-focused Message or holiday-focused Campaign. This Recipient 46 historical behavioral data could be extrapolated over other Recipients 46 that fall within like Recipient 46 segments.

The Contract History 496 module option can include any Account 60 data known about a particular Recipient 46, including current and past phone plans with length of contract, prepay or post pay, data plans and usage, calling patterns, friends and family plans, SMS/MMS usage, Web Usage, WAP usage, type of handset(s) used, handset software version used, how often updated and/or upgraded, the number of calls in customer service, any questions and/or complaints, credit issues, Mobile Operator/Carrier's 62 website usage, number portability history, applications downloaded, voicemail usage, email usage, and/or any other data that a particular Account 60 on the EP 50 would be willing to employ/use, and/or share. The Account 60 that uploads the data can also setup data access rules associated with each data point regarding its discretion or setup restricted access for a particular Account Member, another particular Account 60, for a restricted period of time, for a fee, and/or setup a rule to share only needed components of the data to, for example, the MSE 369 selection criteria utilizing the AE 341 and the BBBE 353, and not directly available to other Accounts 60, and/or by any other combination or reasonable sharing manner a particular Account 60 would want to employ.

In an embodiment, the at least one MSRM 368 receives attributes specific to the communication device used by a Recipient 46, such as the manufacturer make, model, applications currently active, the current software version running, and then delivers the Recipient 46 a customer service Message or an advertisement Message, incorporating that data into the rule logic employed by the MSE 369.

Mobile Operator/Carrier's 62 subscribers could also be targeted based upon the type of calling device protocol being used (CDMA, TDMA, GSM, VoIP, etc.). These attributes could be Account 60 provided information; such as the prior calling and SMS history in their OSS/BSS/SMSC 146 made by that particular communication device, that particular Recipient 46 over the life of the contract, and/or that particular Recipient's 46 entire calling plan circle, etc. In additional rule logic could be setup to incorporate the Handset Provider/Manufacturer(s)' 64 warranty, the Recipient's 46 purchases and other Messages responded to and/or the association of keywords or meta-tags between similar Messages. This sensitive data could be restricted and/or limited to certain Accounts 60, Division Management 342, and/or Members/Roles 344 (more details on roles below).

The Customizable and Requests 498 module option can include all other types of Recipient 46 data, not including in the other options, such as a particular Recipient's 46 Facebook or MySpace data, where the Recipient 46 can decide which Accounts 60 can or cannot see the Recipient's 46 data. For example, a particular Recipient 46 may want to make certain data about him/her known to the EP 50 in general or to a particular Account 60, such as a retailer like Best Buy®, or a concert venue like the Staples Center®, so that Messages and/or offers are more tailored and relevant to their personality and likes.

An Account 60 can also request and/or bid on access to particular data and/or the ability to target a particular segment. If a particular Recipient Segmentation is not available as an option for a particular Mobile Operator/Carriers 62 CS 42 and/or some other particular CS 42, the Account 60 can put in a formal request using the Customizable and Requests 498 module option. If the particular Recipient Segmentation was available the Account 60 could use the BBBM 352 explained in more detail in the next Figure. In addition third party data services (e.g. APIs, RSS feeds, news wires, etc.) can be feed to and initialized by the EP 50. These third-parties could be non-Accounts, or integrated as a participating Account 60 as in a Content Provider 66.

These segmentation module options 486, 488, 490, 492, 494, 496, and 498 can be employed independently or collectively. Additional instructions can be added to each data point independently using the Thresholds 500 module option and a Weighting and Rules 502 module option. The Threshold 500 module option can be used for a range of thresholds, such as a particular Threshold for Date of Birth (DOB) range where a particular Recipient's DOB or a Group of particular Recipients 46 DOB must be within a certain range to receive a particular Campaign, Message, and/or Action. For example, this threshold may be for a Campaign geared for teenagers, or a Campaign geared towards people over the age of 65, etc.

The threshold can be set for an entire Campaign for a group of Recipients 46 to receive a particular Message. The Segmentation rule settings can be setup with Boolean operators to either incorporate or not incorporate a range of data points, threshold, and weights. Another Threshold rule could be setup to limit the number of Recipients 46 that are selected to receive a particular Campaign ID, a particular Message ID, and/or receive a particular Action ID before moving to the subsequent ID (e.g. Campaign, Message or Action) within the Sequence Rule.

The Weighting and Rules 502 module option can be setup to place a variety of weighting, prioritization and/or rules to the collective data points, measurements, and cumulative results. For example, more weight could be assigned to a particular Recipient 46 with a relatively new phone contracts, say within the last week, where then a particular Campaign targeted for voicemail setup could be assigned.

The Campaign could be setup to go further and assigned Messages that evolve from a generic welcome Message, to a generic Message with a reminder to setup their new voicemail, to a particular Message with a specific call to Action for setting up their new voicemail, as the time and/or number of made phone calls by a particular Recipient 46 incrementally increases from day zero and/or from the number of calls made zero.

The manner in which an Account 60 applies rules such as the above Recipient Segmentation rules along with the associated Thresholds 500 and the associated Weighting and Rules creates a single Segmentation Rule that are calculated cumulatively in near real-time. The Account 60 can combine individual Segmentation Rules in groups, called Segmentation Group Rules, where rules could be applied to calculate the relevance between the separate Segmentation Rules.

New and modified individual Segmentation Rules can be previewed against an existing Campaign to see the results and/or saved with the Preview/Save 448 function. These Recipient Segmentation Rules along with Segmentation Rules for Accounts, Billing, Budgeting, Bidding, Timing and Sequencing can be group together with other Rules utilizing Segmentation Group Rules.

For example, individual Segmentation Rules can become layers within the Segmentation Group Rule can be weighted against other Segmentation Rules in a stack. For example, one particular Segmentation Rule and the first in the stack, may only include a rule for potential Recipients 46 who are known to be Males And who are known to live in California; while a second and subsequent Segmentation Rule in the stack may say tabulate the number of potential Recipients 46 from Rule 1 who's known DOB puts them between the ages of 21 and 25 years of age; while a third and subsequent rule in the stack may say also tabulate the number of potential Recipients 46 from Rule 1 who's known DOB puts them between the ages of 26 and 30.

The results of Rule 2 and Rule 3 could be compared and the combined number of potential Recipients 46 from Rule 2 and 3 could be for example 100, but the size of Rule 2 was 66 potential Recipients 46 and the size of Rule 3 was 34 potential recipients, then the disproportion sizes of potential Recipients 46 could also be incorporated into a Rule 4 in the stack where Rule 2's potential Recipients 46 are distributed Messages at a higher rate that coincides with their disproportionate size to Rule 3's size; or Rule 4 could instead balance the disproportion by reducing the Rule 2 size of 66 down to the same 34 size of Rule 3's, by employing some other prioritization logic and/or randomization. There is more on Segmentation Group Rules later.

Figure 27:
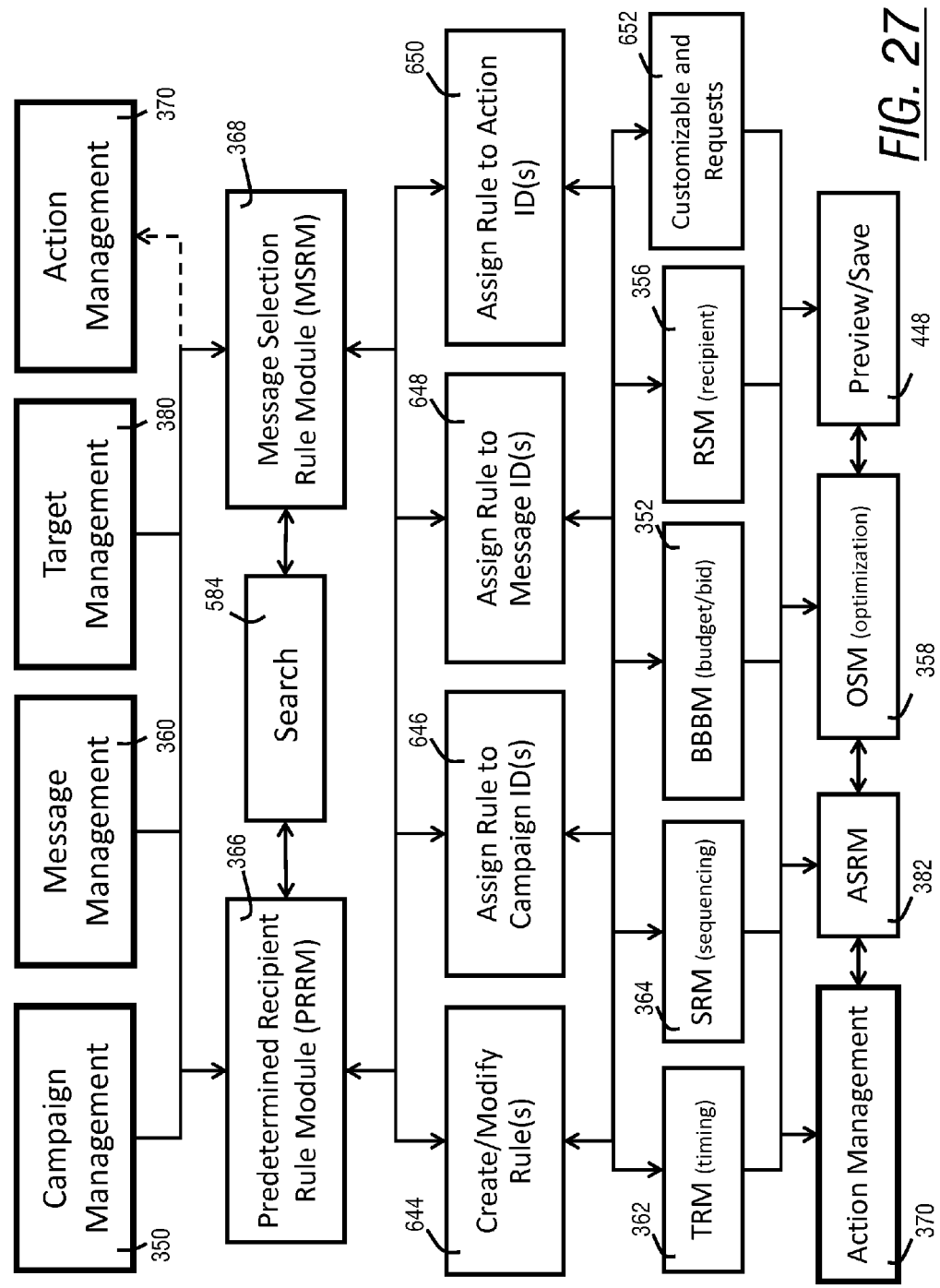
FIG. 27 of the accompanying drawings depicts a flowchart of a process by which the Accounts use the Message Management Platform's UI to create and/or manage the Campaign of predetermined Messages and Actions such as Opt-in Programs with targeting and segmentation.

FIG. 27 illustrates a flowchart of the process by which an Account 60 can setup a particular rule regarding whether a Flagged Recipient 46 routed to the EP 50 will be assigned as a Predetermined Recipient and routed to the PRE 367 or whether instead that Flagged Recipient 46 will be routed to the MSE 369. This assignment can be for a particular Campaign, Message, Message Class, Message Pool, and/or Action; or instead allowing the MSE 369 to select a particular Campaign, Message, Message Class, Message Pool, and/or Action.

For example, the Accounts 60 through the EP 50 can setup Campaigns that are assigned to a particular Predetermined Recipient 46 or a predetermined group of particular Recipients 46 that can be defined within the same segmentation group(s) and utilizing the PRRM 366 (Predetermined Recipient Rule Module) option. Some of these Campaigns are referred to as Programs (and are explained in more detail later).

On the other hand, the Account 60 can instead let the MSE 369 select a particular Message to be played to a particular Recipient 46 based on a setup rules using the MSRM 368 option. A Search 584 function allows Accounts 60 to lookup existing rules and examples.

In general, A Create/Modify Rule(s) 644 allows an Account 60 create and/or modify an existing rule. An Assign Rule to Campaign ID(s) 646, an Assign Rule to Message ID(s) 648, and an Assign Rule to Action ID(s) 650, each allow an Account 60 the ability to pick and choose where and how to apply existing rules and/or a newly created rule.

The Account 60 can select from a range of rule options, including the TRM (timing) 362 option for time-based rules, the SRM (sequencing) 364 option for sequencing-based rules, the BBBM (budget/bid) 352 option for billing, budgeting and bidding rules, the RSM (recipient) 356 option for Recipient 46 dependent rules, and a Customizable and Requests 652 module option.

The Customizable and Requests 652 module option allows an Account 60 to create and/or suggest any rule not covered by the other rule options. For example, an Account 60 could use the Customizable and Requests 652 module option to suggest a new rule to all other Accounts 60 globally where all other Accounts 60 could weigh in on their Member's thoughts regarding the merits and/or lack of merits for such a new tool to be created.

The Action Management 370 function allows Accounts 60 to attach Actions to a particular rule under a particular Campaign, set of Campaign IDs, and/or for a particular Message ID or ID(s). The Account 60 can instead use the ASRM 382 to assign the initial Action, and/or any Subsequent Action to be assigned by the ASE 383. The Account 60 can also use the OSM 358 to assign the OSE 359 to a particular rule to a particular Campaign, set of Campaign IDs, a particular Message ID or ID(s), a particular Class or Classes of Message ID(s), and/or a particular Pool or Pools of Message ID(s). New and modified rules can be previewed against an existing Campaign to see the results and/or saved with the Preview/Save 448 function.

Figure 28:
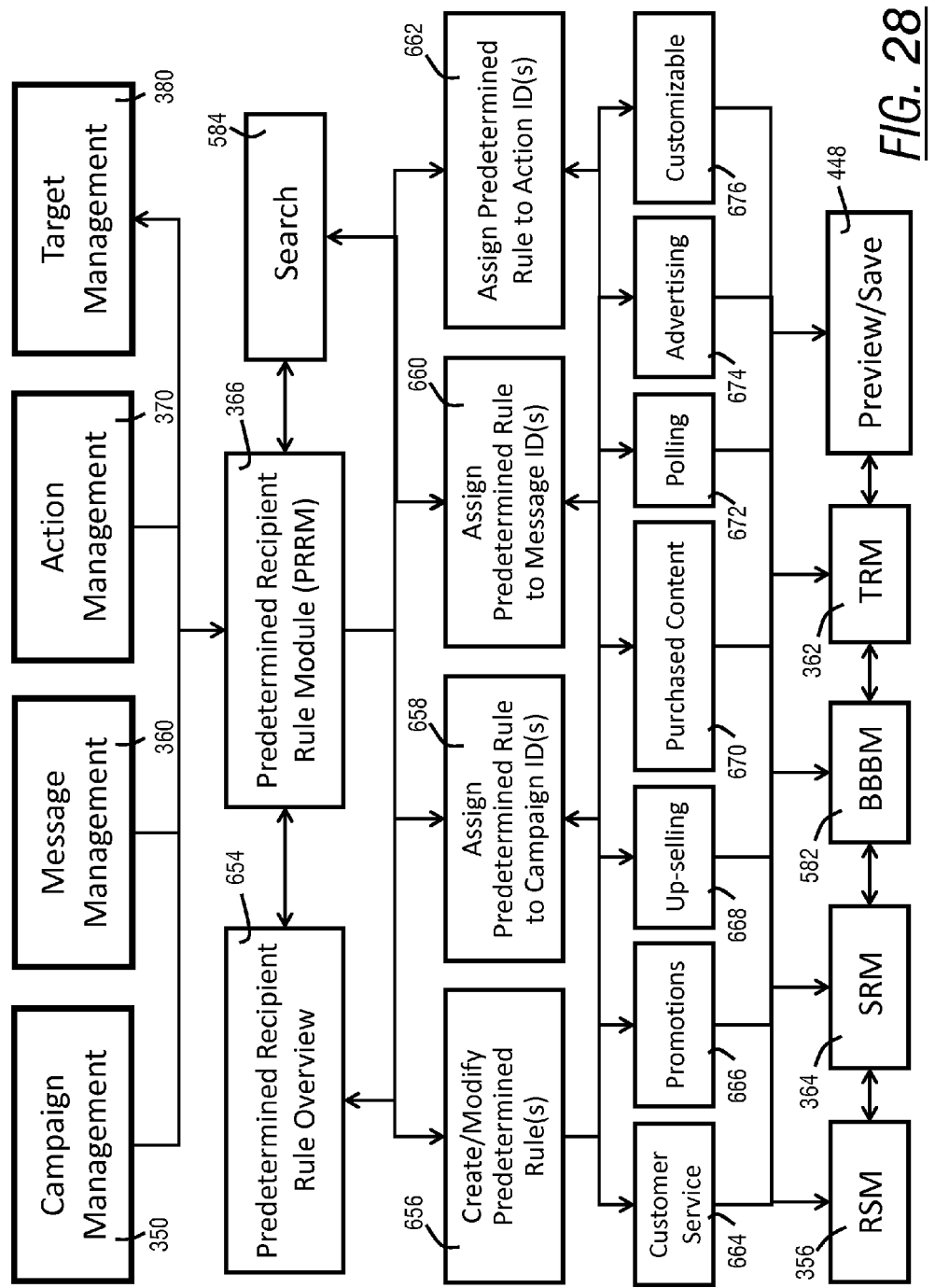
FIG. 28 of the accompanying drawings depicts a flowchart of a process by which the Accounts use the Message Management Platform's UI to create and/or manage the Campaign of predetermined Messages and Actions such as Opt-in Programs with targeting and segmentation.

FIG. 28 illustrates a flowchart of the process by which the Accounts 60 can assign Predetermined Recipient Rules to a particular Campaign, Message and/or Action. An Account 60 can create a new Predetermined Recipient Rule for entire Campaign, a particular Message, a particular Class or Classes of Message ID(s), a particular Pool or Pools of Message ID(s) and/or a particular Action. Predetermined Recipient Rules need at least one piece of Recipient Data to attach to and typically contain a Campaign with at least one Message ID assigned, but can be saved, shared, modified, and reused independent of a Campaign or Campaign element.

Some of these Campaigns are referred to as Programs. For example, there is an Opt-in Program where Recipients 46 can voluntarily elect to join and/or purchase a Campaign Program with specifically requested content and/or content categories. An EP 50 user interface allows Accounts 60 to set up these Programs for Recipients 46 and is depicted in detail later. A collection of content that a Recipient 46 can request within a particular content category such as sports, news, weather, entertainment, financial news, humor and/or other content, are called Opt-in Channels.

The PRRM 366 is accessible from the Dashboard 330, and through the main management menus 350, 360, 370 and 380. The instructions regarding which Recipients 46 will receive these Campaigns, Programs, and/or Channels are setup using the PRRM 366 option, and thus assignment to a Recipient 46 or group of Recipients 46 receiving a Message from the PRE 367, instead of receiving a Message from the MSE 369 (as explained previously). Actions can be assigned the Message ID(s) for a particular Program, but can also be assigned by utilizing the ASE 383 and the OSE 359 for the initial Action, and/or any Subsequent Action.

From the RSM 356, an Account 60 can access a Predetermined Recipient Rule Overview 654 that explains the purposes and functionality of using the PRRM 366 and the PRE 367. A Search 584 function can be utilized to search for existing Predetermined Recipient Rules, Campaigns, Programs, Channels, and related Messages and Actions. A Create/Modify Predetermined Rules 656 function allows Accounts 60 to create new rules from scratch and/or select existing rules. An Assign Predetermined Rule to Campaign ID(s) 658, an Assign Predetermined Rule to Message ID(s) 660, and an Assign Predetermined Rule to Action ID(s) 662, each allow an Account 60 the ability to pick and choice where and how to apply existing rules and/or a newly created rule.

The options for assigning a Predetermined Recipient Rule to a particular Campaign, set of Campaign IDs, a particular Message ID or ID(s), a particular Class or Classes of Message ID(s), a particular Pool or Pools of Message ID(s) and/or Action ID(s) include a Customer Service 664 module option, a Promotions 666 module option, a Up-selling 668 module option, a Purchased Content 670 module option, a Polling 672 module option, an Advertising 674 module option, and a Customizable 676 module option.

The Customer Service 664 module option can include Campaigns with Messages geared toward customer service issues and can be tracked for the effectiveness in terms of Actions taken. For example, there a costs that are directly associated with mobile subscribers and/or customers having to call a Customer Service call center to resolve questions and/or obtain information. The EP 50 can help eliminate some of those calls into an Account's Customer Service call center by providing Campaigns and Messages relevant to questions that are typically asked a particular events, such as new service, overages, contract expirations, etc. These Campaigns can be compared with metrics to determine their effectiveness at improving mobile subscribers (here Recipient's 46) customer satisfaction and yet reducing the cost of calls coming into the Customer Service call center.

The Promotions 666 module option can include Campaigns with Messages geared toward promoting a particular Account 60 and/or service or product offered by a particular Account 60, typically the Account 60 who controls the MSC 140 within the CS 42 where the communication/call originated, but this could be other Accounts 60.

The Up-selling 668 module option can include Campaigns with Messages geared towards up-selling Recipient's 46 of a particular Account 60 with a particular product and/or service to another product and/or service from the same Account 60, typically the Account 60 who controls the MSC 140 in the CS 42 where the communication/call originated.

The Purchased Content 670 module option can include Campaigns with Messages geared towards Opt-in Programs and Channels explained earlier, but could also include specific content for viewing, reviewing, uploading and/or downloading. For example, it could include downloadable ringtones, wallpapers, or Ringback-tone options for Recipients 46.

The Polling 672 module option can include Campaigns with Messages geared towards collecting Recipient 46 opinions, feedback, and/or data. An Account 60 could offer to pay Recipients 46 to take polls in general, pay per question, pay per results, and/or offer some sort of exchange for participation, such as free minutes, services, SMS, wallpapers, ringtones, etc.

Most Campaigns with advertising will likely be assigned by the MSE 369 and not from the PRE 367, but some advertisements can be pre-assigned to Recipients 46 using the Advertising 674 module option. This 674 module option can include Campaigns with Messages geared towards Recipients 46 to receive ads in exchange for their participation, for such things as free minutes, SMS, data usage, and/or products and service discounts from a particular Account. The Customizable 676 module option allows the Accounts 60 the ability to create Campaigns for Predetermined Recipients 46 not covered by the other options, but where there is sufficient data points and content to create or request such a rule.

The Accounts 60 can incorporate additional rules whereby the Message IDs for a Predetermined Recipient can be further selected by instructions employed by the RSM 356, the SRM 364, the BBBM 352, and the TRM 362 as depicted in the next Figure. New and modified rules can be previewed against an existing Campaign to see the results and/or saved with the Preview/Save 448 function.

Figure 29:
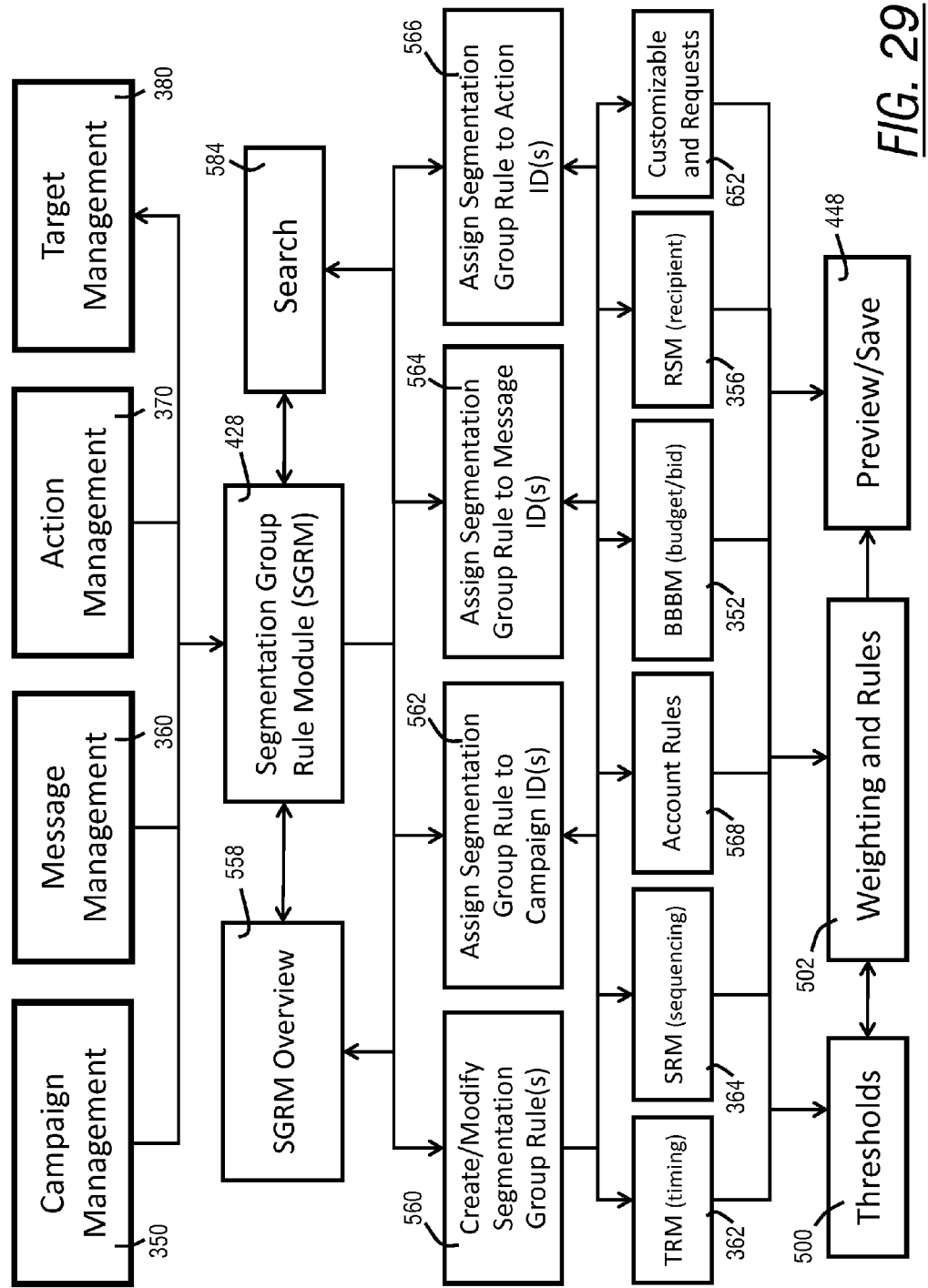
FIG. 29 of the accompanying drawings depicts a flowchart of a process by which the Accounts use the Message Management Platform's UI to create and/or manage the targeting rules in the Campaign of Messages and Actions.

FIG. 29 illustrates a flowchart of the process by which the Accounts 60 can setup targeting instructions to be used by a particular Account, Campaign, Message and/or Action. These targeting instructions can be used independently, but typically grouped by using the SGRM 428 and assigning instructions regarding timing rules, sequencing rules, Account rules, billing/budgeting/bidding rules, Recipient Segmentation Rules, and/or customizable rules to be apply to Predetermined Recipient(s), Recipient Group, Campaign(s), Message(s), Class(es), Pool(s) and/or Action(s). These group rules are or can be employed by the PRE 367, the TE 363, the SE 365, the MSE 369, the ASE 383, and the OSE 359.

The SGRM 428 function is accessible from the Dashboard 330, and through the main management menus 350, 360, 370 and 380. From the SGRM 428 function, an Account 60 can access a SGRM Overview 558 that explains the purposes and functionality of using the Target Management 380. A Create/Modify Segmentation Group Rule(s) 560 function allows Accounts 60 to create new Segmentation Group Rules from scratch and/or select existing Segmentation Group Rules. An Assign Segmentation Group Rule to Campaign ID(s) 562, an Assign Segmentation Group Rule to Message ID(s) 564, and an Assign Segmentation Group Rule to Action ID(s) 566, each allow an Account 60 the ability to pick and choice where and how to apply existing Segmentation Group Rules and/or a newly created Segmentation Group Rule.

Rules incorporate the collective settings an Account 60 places using a range of data options along with associated thresholds and weighting. Before a Segmentation Group Rule can be applied to a particular Campaign or Campaign element, it needs at least one piece of data from the range of options including, the TRM (timing) 362 option, the SRM (sequencing) 364 option, an Account Rules 568 module option, the BBBM (budget/bid) 352 option, the RSM (recipient) 356 option, and/or a Customizable 570 module option.

The TRM 362, the SRM 364, the BBBM 352, and RSM 356 have all been explained earlier. The Account Rules 568 module allows a particular Account 60 to limit and/or selectively allow other outside Accounts 62-74, FIG. 2, to access. This controlled Account 62-74 access can either be to all Recipients 46 where the particular Account 60 setting up the rule controls the Message playback, controls the Message access, and/or controls the Message inventory. These Account Rules 568 are incorporated into the AE 341 in the MSE 369 along with the BBBE 353 in step 238 depicted in the FIG. 19 example. The Customizable and Requests 652 module option was explained earlier in FIG. 27.

These Segmentation Group Rule and data options TRM 362, SRM 364, Account Rules 568, BBBM 352, RSM 356, and Customizable and Requests 652 can be employed independently or collectively. Additional instructions can be added to each rule and data option independently using the Thresholds 500 module option and the Weighting and Rules 502 module option. The Threshold 500 module option can be used for a range of thresholds, such as a particular Threshold used for Message sequencing where there is threshold for the number of plays a Message ID requires before playing a subsequent Message ID setup as a series of Messages to play sequentially.

In another embodiment, the Segmentation Group Rule settings can be set up to either incorporate or not incorporate the Action measurement options and instructions, if a preset "performance threshold" is met.

The Weighting and Rules 502 module option can be set up to place a variety of weighting, prioritize and rules to the collective measures and results. For example, more weight could be assigned to particular Message IDs, Message Class, and/or Message Pools within a sequence (as explained earlier). New and modified Segmentation Group Rule(s) can be previewed against an existing Campaign and identified database, such as Recipients 46 for rules incorporating Recipients 46 to see the results and/or saved with the Preview/Save 448 function.

Figure 30:
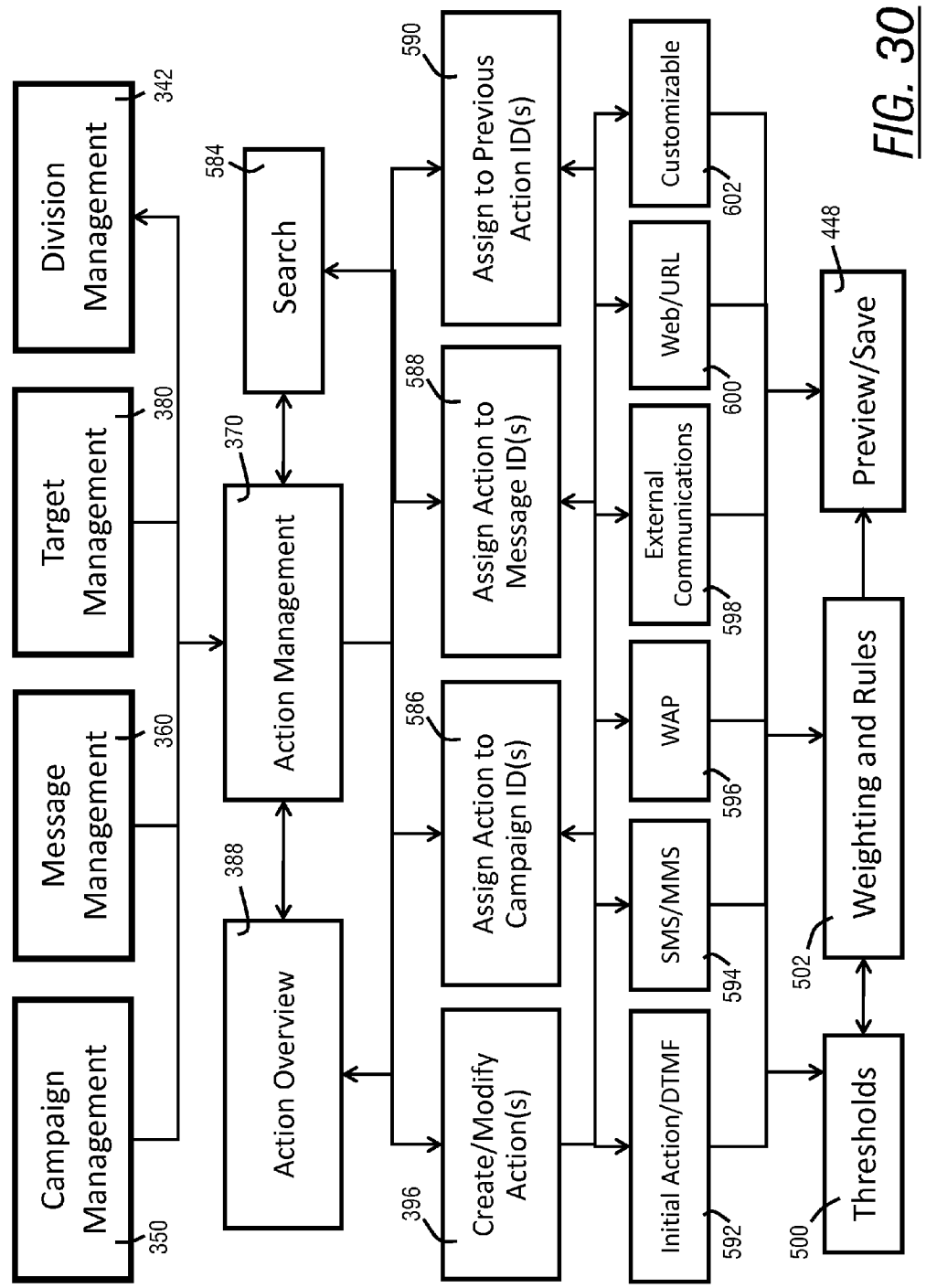
FIG. 30 of the accompanying drawings depicts a flowchart of a process by which the Accounts use the Message Management Platform's UI to create and/or manage the Actions in the Campaign with Messages.

FIG. 30 illustrates a flowchart of the process by which the Accounts 60 can create/modify and assign an Action to be used by a particular Account, Division, Campaign ID(s), Message ID(s), Class or Classes of Message ID(s), Pool or Polls of Message ID(s) and/or following a previous Action ID(s). These Actions can be pre-assigned or the selection of a particular Action that gets sent to a Recipient 46 with a particular Campaign Message can be left to the rules that have been preset for the ASE 383, and if necessary or desired, the rules that have been preset for the OSE 359, that is when the ASE 383 has results that are greater than a single selected Action ID (explained in detail in the OSM 358 in FIG. 32).

An Action Management 370 function is accessible from the Dashboard 330, and through the main management menus 350, 360, 380 and 342. From the Action Management 370 function, an Account 60 can access an Action Overview 388 that explains the purposes and functionality of using Actions. A Create/Modify Action 396 function allows Accounts 60 to create a new Action from scratch and/or select existing Actions. An Assign Action to Campaign ID(s) 586, an Assign Action to Message ID(s) 588, and an Assign to Previous Action ID(s) 590, each allow the Account 60 the ability to pick and choice where and how to apply existing Actions and/or a newly created Action.

Most Message IDs get sent to a Recipient 46 with at least one pre-assigned Action; but the Account 60 can decide not to assign any Actions, such as for a Message that just says: "Thank you for using AT&T®"; and/or there can be a sequence of pre-assigned Actions. The first Action that can be taken by a Recipient 46 within the Action sequence is referred to as an Initial Action. This initial Action is typically a DTMF, but can be a voice prompt as explained earlier.

As mentioned earlier, other Actions can be pre-assigned by the Accounts 60 to follow the Initial Action as pre-assigned Subsequent Actions. Some of these Subsequent Actions are Action Responses that refers to a specific subset of Actions that are sent back to the Recipient 46 in "response" to the Action taken by the Recipient 46 and the "additional instructions set up by the Account 60 and the EP 50. The Account 60 can create an Action and apply its assigned usage for entire Campaign, but more typically to a particular Message, and/or a particular previous Action, as the Subsequent Action. The Account 60 can create and/or modify an existing Action using an Initial Action/DTMF 592 module option, a SMS/MMS 594 module option, a WAP 596 module option, an External Communications 598 module option, a Web/URL 600 module option, and/or a Customizable 602 module option.

The Initial Action/DTMF 592 module option is for setting up the initial Action that the Recipient 46 is directed to take during the audio Message playback (image, video or similar), and is typically a DTMF (keypad response). The Account 60 can assign a specific key press, a set of key presses, or allow any key to be pressed to reflect the appropriate Action taken by the Recipient 46. The Account 60 can also use and/or assign voice prompts to work with or instead of keypad assignments for the initial Account or any Subsequent Action.

The SMS/MMS 594 module option is used for setting up the instructions for a particular Action with a SMS or MMS response, along with any desired Subsequent Action, such as go to this particular WAP page or Web URL. The WAP 596 module option is used for uploading and/or creating the necessary contents and instructions for a WAP page, which typically follows a previous Action as a Subsequent Action.

Figure 31:
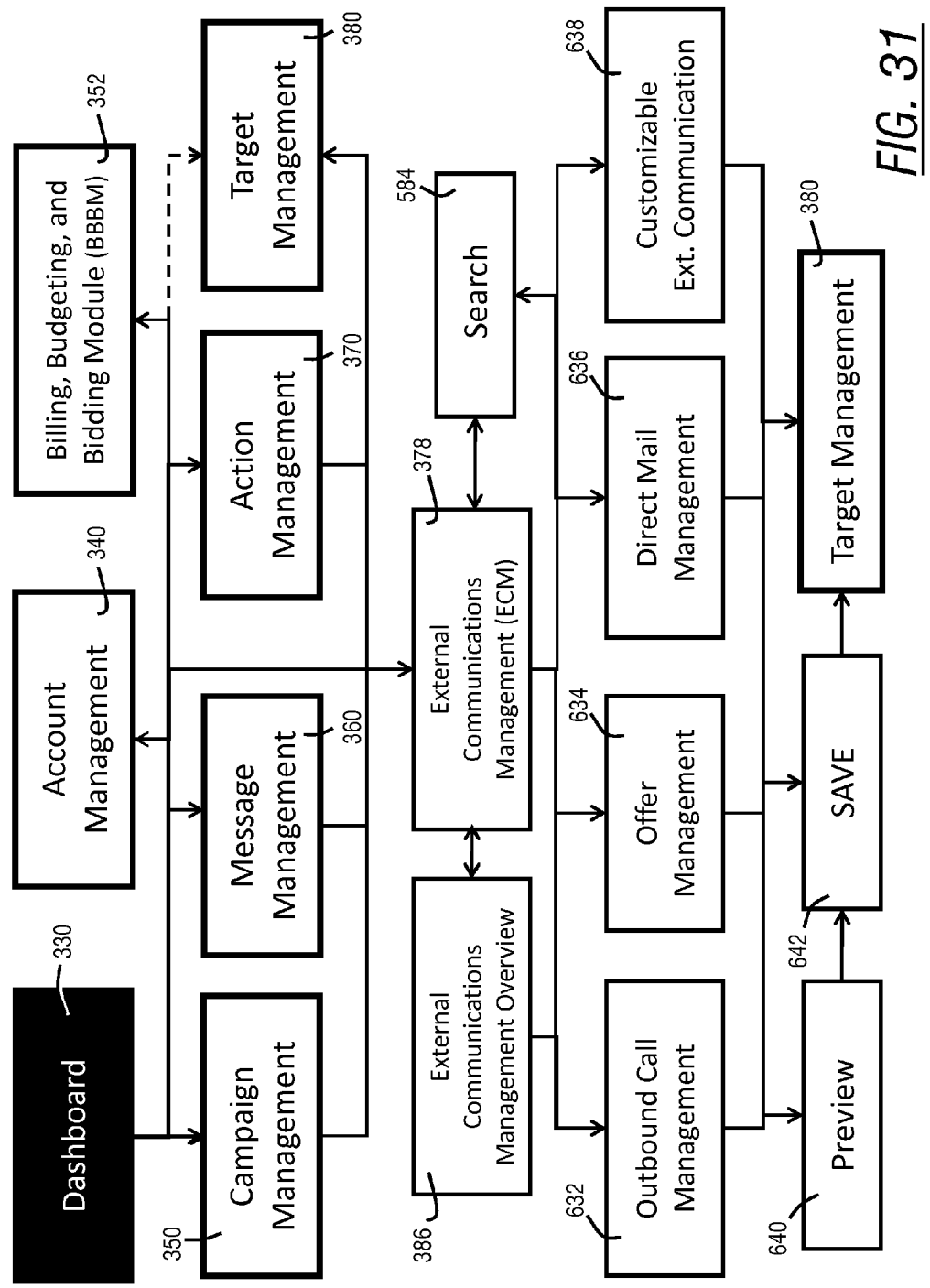
FIG. 31 of the accompanying drawings depicts a flowchart of a process by which the Accounts use the Message Management Platform's UI to create and/or manage External Communication Rules.

The External Communications 598 module option allows the Account 60 to setup External Communications and is explained in more detail in FIG. 31. The Web/URL module option 600 is used for uploading and/or creating the necessary contents and instructions for a Web page/URL, which typically follows a previous Action as a Subsequent Action. The Customizable 602 module option can include all other types of Actions, not including in the other Action module options, such as an Action for sending an email, direct coupon, a poll, etc.

Additional Action instructions can be added to each Action to make use of these data using the Thresholds 500 module option and the Weighting and Rules 502 module option. The Threshold 500 module option can be used for a range of thresholds, such as a particular threshold for the number of plays a Message ID is required to meet as an adequate "performance threshold" and/or as a "performance threshold" for all the Messages within a particular Campaign before A/B testing another Action version. For example, this Action Version could be preset to come from a particular Campaign, a particular Action Class and/or a particular Action Pool. Another Threshold rule could be setup to limit the number of Action IDs that are passed through the OSE 359, to say no more than ten Action IDs (versions) for making a final Action ID selection.

These Actions module options 592, 594, 596, 598, 600, and 602 are tracked and measured independently, and collectively as a unit against and relative to a particular Campaign, Message ID, Message Class, Message Pool, Action Class, Action Pool, Previous Action, and/or Subsequent Action to measure their effectiveness and success rates against different Recipient Segmentations, Timing Rules, Budget Rules, Bidding Rules, Account Rules, Sequencing Rules and Real-time Reporting by utilizing the RE 355.

The Weighting and Rules 502 module option can be set up to place a variety of weighting, prioritizations, and rules to the collective measurements and results. For example, a particular SMS Action ID may be far more effective among a particular Demographic at a particular time following a particular Action when relatively compared to other Actions employed within the same rules, Campaign, Message Class, Message Pool, etc. and thus more weight could be applied towards the favorable segments.

The EP 50 measures an Action's success and this data can also be incorporated into the selection of a further Action being assigned and/or selected by the OSE 359. An Action's relative usage can also be measured and incorporated in the selection of Action(s) by the OSE 359. For example, if the OSE 359 needs to select a single initial Action to a particular Message ID, but where the combined preset rules (accept the "last rule") provides a result with more than one Action ID tied for the best Action ID to assign to a Message ID, then the "last rule" in this example could be to select the Action ID that has been assigned the least, the least assigned with this Campaign, and/or least assigned with this particular Message ID. New and modified Optimization Rules can be previewed against an existing Campaign to see the results and/or saved with the Preview/Save 448 function.

FIG. 31 illustrates a flowchart of the process by which the Accounts 60 can manage External Communications for a particular Account, Division, Campaign, Message and/or Action sequence. External Communications are one form of an Action. Typically an External Communication Action comes sequentially after some other Action(s), such as the initial Action could be a DTMF with corresponding SMS, followed by a Subsequent WAP Action, followed by a Subsequent Action with a request for a piece of direct mail, and/or a Subsequent Action for an offer directly from a particular Account, such as a specific manufacturer or brand.

For example, the External Communication Action could be in response to the DTMF or be triggered by a series of Actions that indicate the need for an External Communication, such as a brochure being mailed from a particular Account's 60 place of business or manufacturer directly to the Recipient's 46 home and/or the Recipient's 46 business.

Using an External Communications Management (hereinafter "ECM") 378 module an Account 60 can access a range of module options for create and/or editing External Communications, such as an Outbound Call Management 632 module option, an Offer Management 634 module option, a Direct Mail Management 636 module option, and a Customizable External Communication 638 module option.

The Outbound Call Management 632 module allows an Account 60 to setup a Campaign with an Action that triggers a notification to place a return phone call to the particular Recipient 46 who requested the Action Response. This return phone call to the Recipient 46 can either come directly from the Account 60; be routed and to some third party the Account 60 has assigned the responsibility, come from an automated source, and/or some combination of appropriate methods.

An outbound call (as controlled by the Outbound Call Management 632 module) means that a third party, such as the Account 60 or a contracted call center company, calls the Recipient's 46 communication device once the Recipient 46 has ended the call on which they originally requested the call via an Action such as DTMF. The Outbound Call Management 632 module can be configured at for an Account 60, Campaign, Segmentation Group(s), Message Pool(s), Action Pool(s), Class(es) Message(s) or Action(s).

For example, a Campaign can have one Message which does not offer the Recipient 46 an outbound call option and another Message which does offer an outbound call option. Using the Outbound Call Management 632 module the Account 60 configures the connection with the party which will make the outbound calls to the Recipient 46. Such a connection can be a real-time API connection in which data is transferred immediately after the triggering Action by the Recipient 46; or can be transmitted in bulk electronically or by other means periodically to the party making the outbound.

The Offer Management 634 module is also accessible from the main Dashboard 330 and allows an Accounts 60 to create/manage Offer Codes that can be stored as data value(s), with associated characteristics, and/or other track-able features for purposes of reporting their redemption counts, redemption rates and/or characteristics of the Recipient Segmentations who redeemed the Offer Code(s).

An Offer (as managed by the Offer Management 634 module) is a unique component that can be associated with either a Message or an Action where an Account 60 wants to define additional parameters principally for tracking and reporting purposes. When an Offer Code is used, it can be tracked either in bulk or on an individual Recipient 46 basis by the RE 355.

For example, an Account 60 could setup a particular Campaign where a unique Offer Code would be generated per Recipient 46 who responds with the appropriate Action request to a particular Offer. The Campaign could have an audio Message that tells Recipients 46 "Get a free Ringtone from Sprint® today by pressing any key or by simply saying 'Ringtone' now and we'll send you a private offer by SMS." When a Recipient 46 presses a key for the DTMF Action request or says the voice-prompt (Action request) "Ringtone", a SMS with a unique and trackable Offer code is sent to the corresponding Recipient 46.

Once the unique Offer Code is generated, the EP 50 stores the necessary data and transferred a copy to the Account and/or any third party they have pre-assigned a designated role during the follow-up. This copy of necessary data can happen as each event occurs in the EP 50, or can be setup to be trigger in some other increments, such as hourly. This data copy may be required to support Web, WAP or phone-based transactions in which the offer code was used. It is also possible to generate Offer Codes that are unique according to Division, Members, other Accounts 60 connected to the EP 50, Campaigns, Segmentation Rule Group(s), Message Pool(s), Action Pool(s), Class(es) and/or any other logical grouping of tracking data.

The Direct Mail Management 636 module allows an Account 60 to setup a Campaign with an Action that triggers a notification back the particular Account 60 to send a bulk and/or uniquely printed, customized and/or addressed unit of mail by postal, express, or messenger service delivery to the particular Recipient 46 who requested the Action Response. When an Account 60 wishes to deliver physical material, product, information or content to a Recipient 46 via postal, express or messenger services (collectively and hereinafter "Direct Mail") as part of its Campaigns, the Account 60 can use the Direct Mail Management 636 module to control the handling of a Recipient's 46 Actions that correlated to a particular Direct Mail Action request. Similar to the Outbound Call Management 632 module and Offer Management 634 module, the Direct Mail Management 636 module is configured through the EP 50 and/or API connections to the module to send notifications to send the Direct Mail to the Recipient 46 at a known address.

Alternatively, the Action may provide for the Recipient 46 to first enter or choose an address to which to send the Direct Mail. The notifications may be sent in real-time through a connection to the party handling the Direct Mail fulfillment or may be sent in bulk at periodic intervals. As with the other External Communication modules, the settings for a particular Direct Mail Action can be applied at an Account, Campaign, Segmentation Rule Group, Message Pool, Action Pool, Class or any other logical grouping of Recipients 46, including individual Recipients 46.

The Customizable External Communication 638 module allows an Account 60 to create custom External Communications, typically through a set of APIs from the EP 50 which can communicate triggering events defined by the Account 60 in the module's user interface or programmatically by employing the appropriate API settings.

The Customizable External Communication 638 module provides a mechanism by which other types of External Communications that are not categorized into the other modules within the ECM 378 can be supported, typically through API connections configured through the Customizable External Communication 638 module user interface, or through data made available through other means of communication, such as via FTP or electronic drop box where it is made available for retrieval by the external party for whom the data is intended.

Accounts 60 can create and/or edit External Communications and assign the rules to a particular Campaign, Message, Action, Action Class, Action Pool, an Action sequence, and/or a combination of these. The Account 60 can also store, edit, and reuse the rules independent of any Campaign or Campaign element. After creating and/or modifying the External Communications, the Account 60 can Preview 640, Save 642, and/or assign targeting constraints using the Target Management 380 function.

Figure 32:
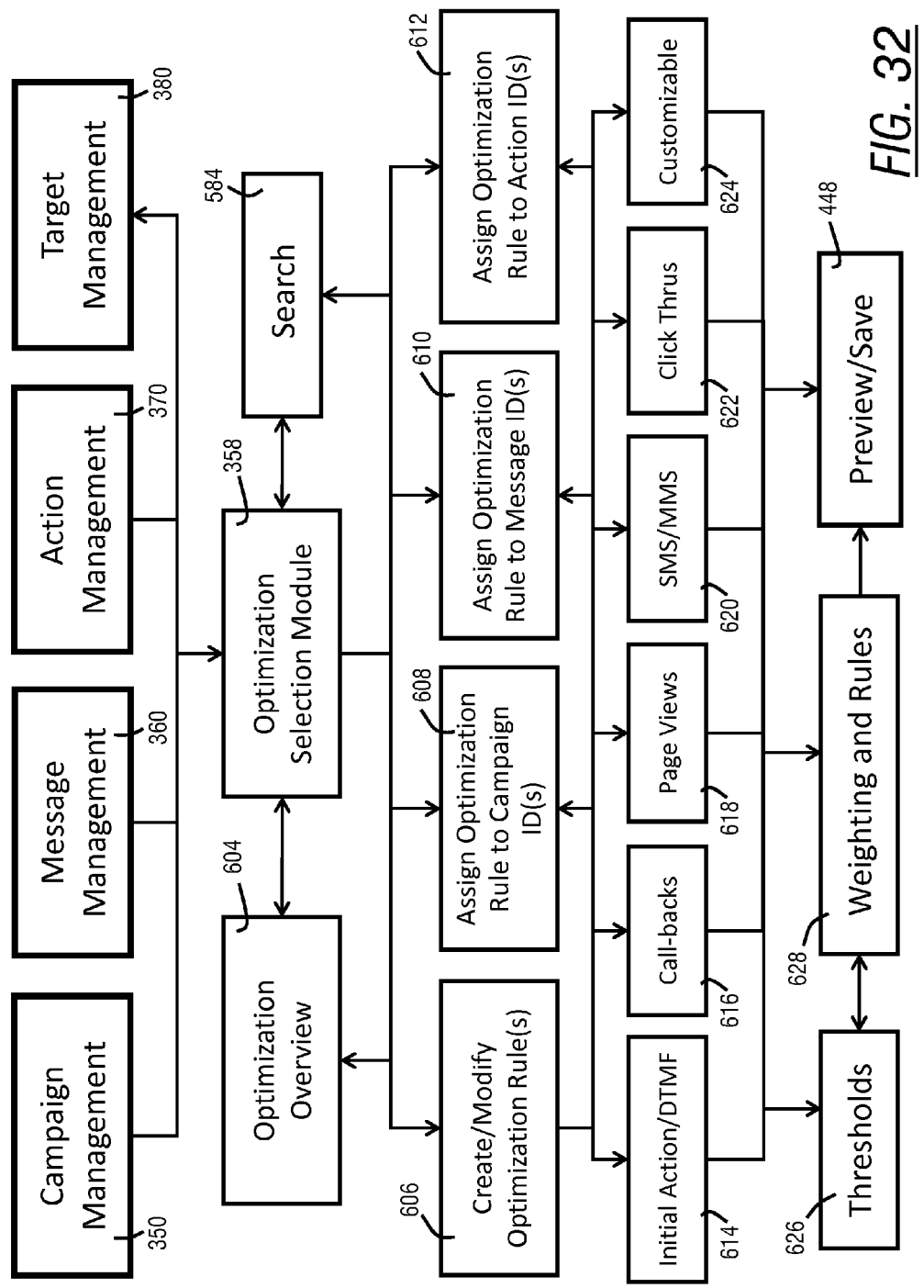
FIG. 32 of the accompanying drawings depicts a flowchart of a process by which the Accounts use the Message Management Platform's UI to create and/or manage the Optimization Rules in the Campaign.

FIG. 32 illustrates a flowchart of the process by which the Accounts 60 can set up optimization instructions to be used by a particular Account, Campaign, Message, Action and/or Subsequent Action. These instructions are used by the OSE 359 when the MSE 369 has results that are greater than a single selected Message ID or single Action ID per sequential step, relative to the current and appropriate step/place within an Action sequence starting with an initial Action. For example, there may be more than one initial Action ID either assigned to a selected Message ID or available after employing the ASE 383, where the OSE 359 needs to select one specific initial Action from the list of available IDs and where there can also be rules preset to select the Subsequent Actions for each step in a series of steps. These Action steps within a series can be setup by the rules to be addressed collectively at one time, say along with the selection of the initial Action, or relative, and as a previous Actions occur with the usage timetable of a given Recipient's 46 usage.

The OSM 358 is accessible from the Dashboard 330, and through the main management menus 350, 360, 370 and 380. From the OSM 358, an Account 60 can access an Optimization Overview 604 that explains the purposes and functionality of using the OSE 359. A Create/Modify Optimization Rules 606 function allows Accounts 60 to create new rules from scratch and/or select existing rules. An Assign Optimization Rule to Campaign ID(s) 608, an Assign Optimization Rule to Message ID(s) 610, and an Assign Optimization Rule to Action ID(s) 612, each allow an Account 60 the ability to pick and choose where and how to apply existing rules and/or a newly created rule.

Rules incorporate the measured past performance of Message IDs and/or Actions. An Account 60 typically creates a new Optimization Rule for entire Campaign, a particular Message, and/or to follow a particular previous Action. Message Optimization Rules need at least one Message ID or at least one type of Action ID to measure and Action Optimization Rules need at least one type of Action ID to measure (examples to follow).

The types of Actions that can be measured and incorporated into a rule are access by the Account 60 using an Initial Action/DTMF 614 module option, a Call-backs 616 module option, a Page Views 618 module option, a SMS/MMS 620 module option, a Click Thrus 622 module option, and/or a Customizable 624 module option.

The Initial Action/DTMF 614 module option can measure the usage of an initial Action taken by all Recipients 46 after receiving the initial audio Message for a particular Message ID, typically a DTMF (keypad response or Action request), but an initial Action could also be a voice response as a command to a voice prompt and explained earlier. The Callbacks 616 module option can measure the number of Callback Actions collective generated by a particular Message ID. The Page Views 618 module option can measure the number of page-views for a designated WAP page or Website generated by a particular Message ID and/or previous Action ID within a series of Actions in connection with a particular Message ID and/or Campaign.

The SMS/MMS 620 module option can measure the number of SMS/MMS that either got sent and/or responded to with another Action for a particular Message ID and/or previous Action ID. The Click Thrus 622 module option can measure the number of click-thrus generated for a particular piece of content as a result of a particular Message ID and/or previous Action ID. The Customizable 624 module option can be setup to measure such Actions as Email Responses, Direct Mail Responses, Coupon Responses, and/or any other Action generated response measurable by the EP 50 and attributable to a particular Message ID, Campaign ID, and/or previous Action ID.

These Action measurement module options 614, 616, 618, 620, 622, and 624 can be employed independently or collectively. Additional instructions can be added to each measurement module-option independently using a Thresholds 626 module option and a Weighting and Rules 628 module option. The Threshold 626 module option can be used for a range of thresholds, such as a preset threshold for the number of plays a Message ID is required to meet as an adequate "performance threshold" and/or a preset "performance threshold" for all the Messages within a particular Campaign are required to meet. The optimization rule settings can be setup to either incorporate or "not" incorporate the Action measurement module-options and instructions, if the preset "performance threshold" is met. Another Threshold rule could be setup to limit the number of Message IDs that are passed through to the OSE 359, from the MSE 369 to say no more than the top ten scoring/performing Message IDs.

A Weighting and Rules 628 module option can be setup to place a variety of weighting, prioritizations and rules to the collective measurements and results. For example, more weight could be assigned to Message IDs that were created relatively recently, say within the last week over Message IDs created before. Otherwise, newly created content may always lose out to older content when selected purely on past usage and/or performance. New and modified Optimization Rules can be previewed against an existing Campaign to see the results and/or saved with the Preview/Save 448 function.

In an alternative embodiment of the OSM 358, the OSM 358 is also able to group results above by common factors, such as market, zip code, area code, or even communication device type. For example, if a Message is for a specific mobile phone an advertiser may want to sell, the OSM 358 determines how best to deliver that advertisement by a plurality of common factors.

The OSM 358 is designed to find the trends that are delivering better performance according to the optimization set-up and will learn the patterns of performance and report back to the Account 60 where there are opportunities to optimize delivery. In another embodiment, the OSM 358 is able to select versions of Campaigns and Message variations that are generating the most desirable Actions from a Recipient 46 within the optimization goal grouping in question.

FIG. 33 illustrates an example screenshot 1000 of the Data Field Mapping 348 module from FIG. 23, where an Account 60 can use the user interface made available through the presentation layer at the Web Server 98 to add information to CRM Server 92 in the MMP 90. The Web Server's 98 user interface provides functionality for many types of Accounts 60 (e.g. 62-74). For example, the MMP 90 includes methods for data transfer from a Mobile Operator/Carrier's database to the MMP's 90 CRM Server 92 and further a method to normalize a multitude of different standards by a single Mobile Operator/Carrier 62 Account and/or to normalize a plurality of standards used by different Accounts 60 for better data storage, metrics, optimization, and comparisons.

To facilitate this import process, the MMP 90 provides a relatively flexible database process which permits Accounts 60 to "map" each Mobile Operator/Carrier's data field into a specific data field in the CRM Server 92. This library of data fields can be utilized by the Segmentation Group Rules explained earlier and more UI examples later.

FIG. 33 illustrates a Data Fields Library 1001 window which below contains an Active 1002 filter and a variety of other filters which permits an Account 60 to easily find fields of interest to them. An Add New Field 1004 button allows Account Members with the right privileges to create new data fields. When a specific Mobile Operator/Carrier 62 does not pre-establish a data field in the EP's 50 CRM Server 92 for data associated with their specific CS 42 that would be useful to other Accounts for such things as creating commonly used and/or shared Segmentation Group Rules, the MMP 90 can create Calculated Fields which join together one or more available data points from existing data fields (from the Mobile Operator/Carrier 62 data and/or from existing EP 50 data) using the necessary and appropriate functions and/or calculations.

For example, a Campaign may have a Segmentation Rule that requires a data field such as the Average Number of Calls Per Day. If the Mobile Operator/Carrier 62 with control of a particular CS 42 has not provided this field, but instead provides two related fields for: Calls in Period, Duration of Period; the EP's 50 Calculated Fields functionality and library allows for the creation of an Average Number of Calls Per Day calculated field by dividing the Calls in Period by Duration of the Period. Other calculated fields could include a field from a Mobile Operator/Carrier 62 such as Average Calls Per Month combined with a collected data field from the CRM Server's 92 database, such as Average Number of Actions Per Month to arrive at a Calculated field for: "Ratio of Calls to Actions".

FIG. 34 illustrates an example UI screenshot of a Calculated Fields Library 1006 window that provides a list of available fields which are comprised of the Recipient Data or other data which is transformed through a calculation specific to an Account 60 specified. If the Account Member has sufficient privileges, he/she will see a complete list of fields available to that particular Account 60. Including view, select, and/or modify privileges. If the Account Member is a Member of the Mobile Operator/Carrier's 62 staff, he/she would only see the particular Calculated Fields that have been made available to him/her through the rules preset by the particular correlating Account, Division, Campaign, and/or by Time Limits related to the particular data.

The Calculated Fields Library 1006 window contains an Active 1008 filter and a variety of other filters which permit the Accounts 60 with access to easily find Calculated Fields of interest. An Add New Calculated Field 1010 button allows Accounts 60 and Account Members with the appropriate privileges to create new calculated data fields. Account Members with the certain privileges can also edit and/or delete previously created fields with an Edit 1011 button and a Delete 1012 button that appear in the list of buttons depicted as available (not grayed out). To create a Calculated Field, an Account 60 clicks the Add New Calculated Field 1010 button that brings up the window in FIG. 35.

Figure 35:
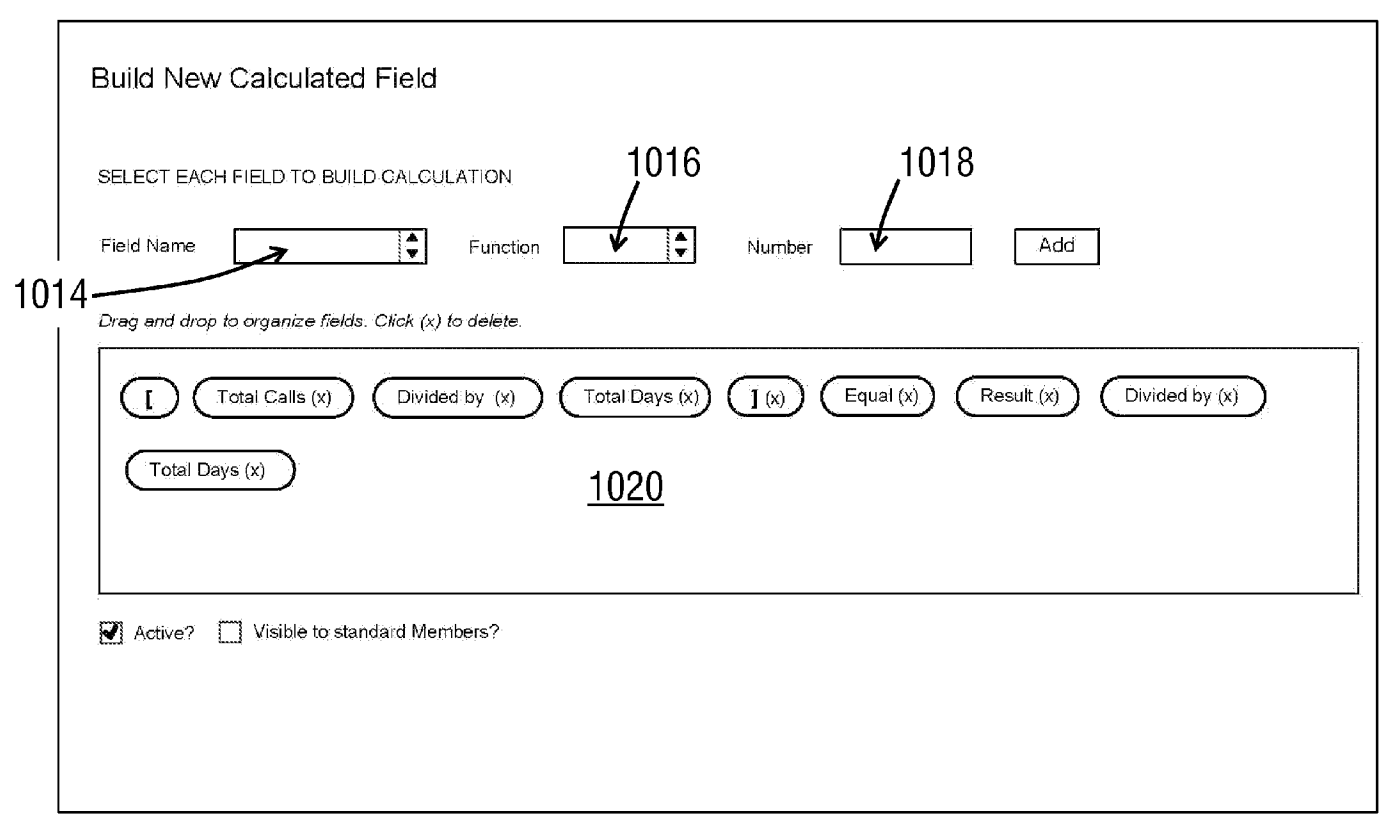

FIG. 35 illustrates an example of the final user interface screen for the Data Fields Library 1000 module. In this screen, the Accounts 60 can use the drop down boxes to locate a Field Name 1014 or use a Function 1016 calculation to employ a particular Calculated Field calculation. The Accounts 60 can then drag and drop the field from the drop down box into a Calculated Field Window 1020 area. Accounts 60 can enter manual field values into a Number 1018 field if the calculated field needs a specific number to generate the calculated value.

For example, if a Segmentation Group Rule used by an Account 60 requires a data value such as the average number of seconds a Recipient 46 calls per day, but the Recipient Data provided by the Mobile Operator/Carrier 62 and stored in the Data Fields Library provided only for average number of minutes, an Account 60 could create a Calculated Field from the data available which multiplies the Average Number of Minutes data field by 60 to arrive at the Average Number of Seconds.

Figure 36:
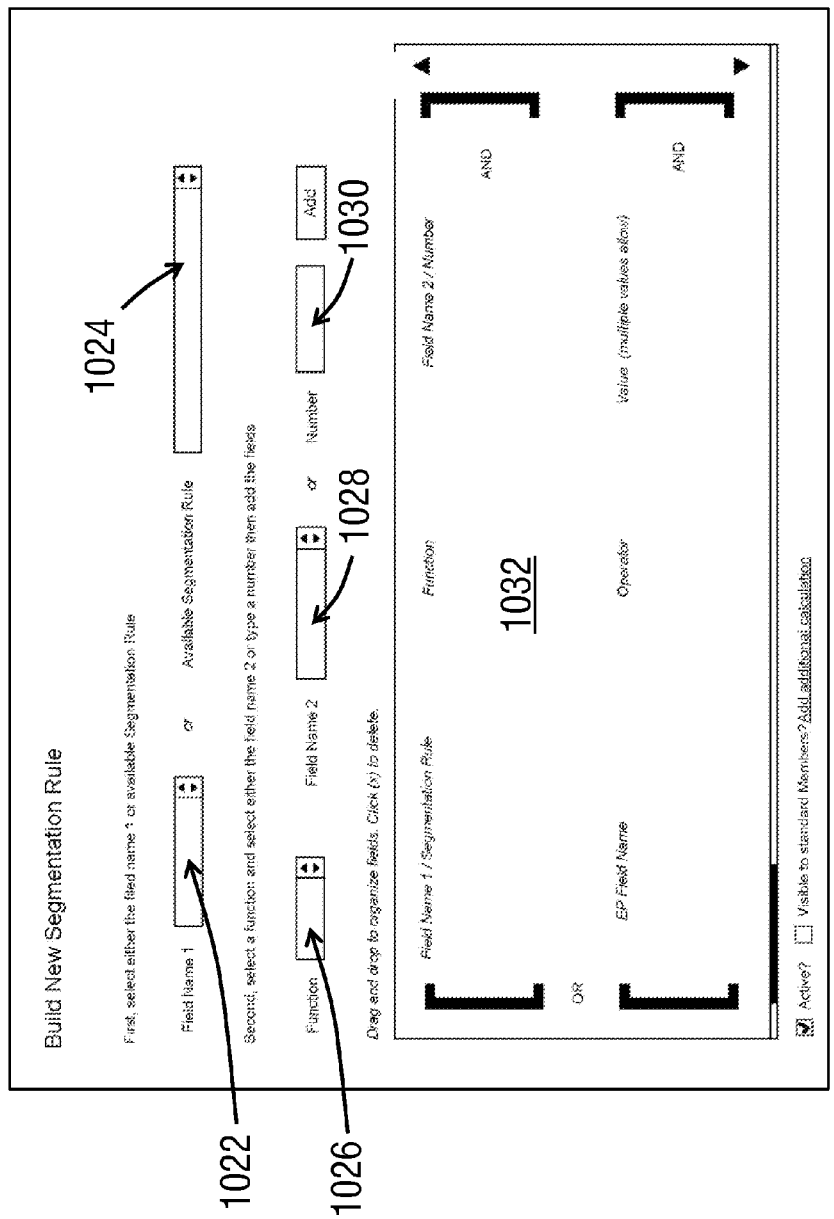
FIG. 36 of the accompanying drawings depicts a screen shot by which the Accounts use the Message Management Platform's UI to create a Segmentation Rule.

FIG. 36 illustrates an alternative of a screenshot an example of the user interface employing some of the RSM 356 functionality from FIG. 23. This Figure depicts how an Account 60 can use the user interface (UI) made available to the Accounts 60 through the presentation layer stored at the Web Server 98. The UI allows the Accounts 60 to add information to CRM Server 92 in the MMP 90, in this case, for the segmentation of the data and for creating group rules. For example, to build and monitor a Campaign effectiveness and/or measure success factors towards a particular segment, such as geography and/or by different times within a day, the Account 60 needs to establish specific segments to track and monitor such data units or segment.

FIG. 36 illustrates an UI screenshot example that would be shown when an Account 60 requests to create a new Segmentation Rule. This rule can be stored independently, or in conjunction with a new or existing Campaign. The Account 60 may either fill in a new Segmentation Rule name using a Field Name-1 1022 field or may instead use the evaluation of another Segmentation Rule by selecting an existing rule utilizing an Available Segmentation Rule 1024 drop down box. Once the Account 60 has made a selection, he/she can then finish creating a rule by selecting the functionality to be used when compared to their first/previous selection, such as: equals, greater than, etc. in the Function 1026 drop down field. The Account 60 can then create a comparison to the first field by the second field utilizing a Field Name-2 1028 drop down field or by entering a hardcoded number that is entered in a Number 1030 field.

Once the Account 60 selects the appropriate field and necessary associated information, the created rule then shows up in a Segmentation Rules 1032 window. In the Segmentation Rules 1032 window, the Accounts 60 can also build Segmentation Rules that are combinations of rules ("and" rules and "or" rules) using typical Boolean type operations.

Figure 37:
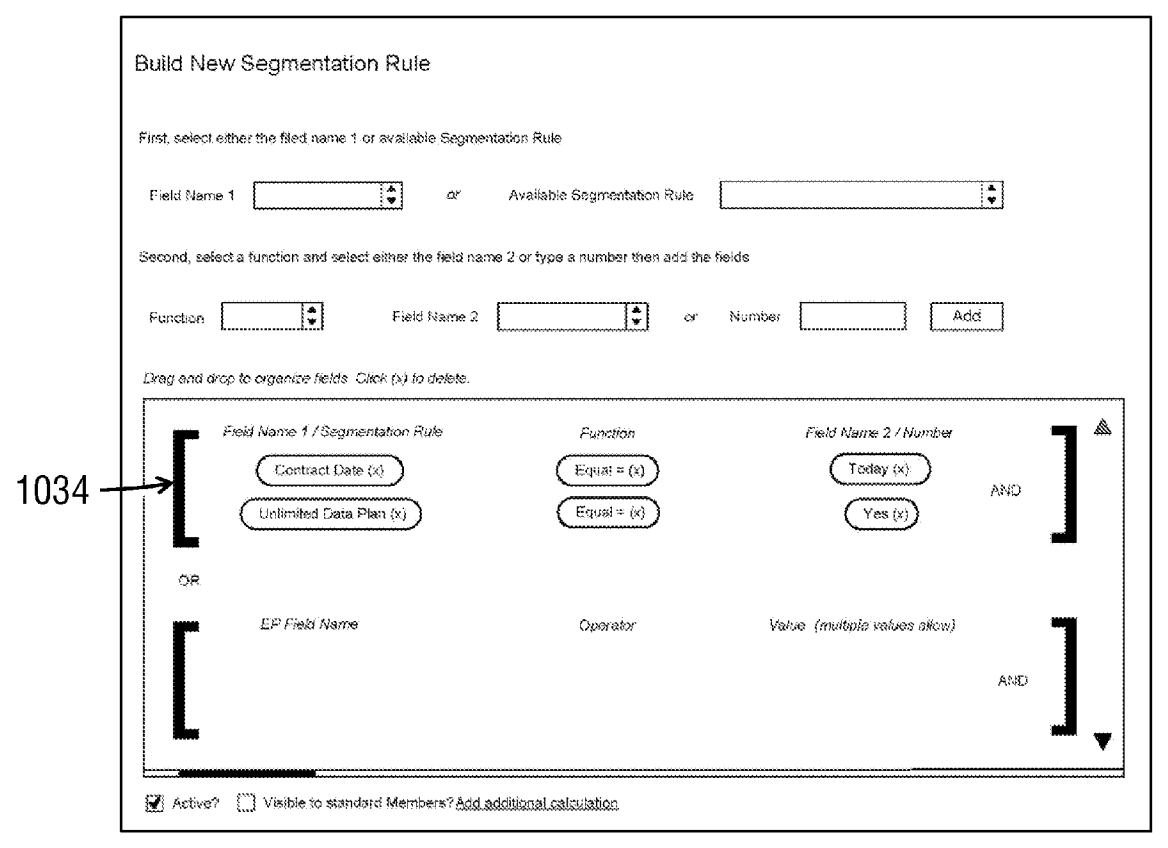

FIG. 37 illustrates an UI example screenshot of a Boolean operation that was created with an "and" type rule. The "and" type rule means that multiple conditions must evaluate to true for that portion of the Segmentation Rule to evaluate to true. The example depicted in between the brackets 1034 illustrates a rule which will evaluate to true if the Mobile Operator's subscriber sets up their new contract the same day and if they have an unlimited data plan.

Figure 38:
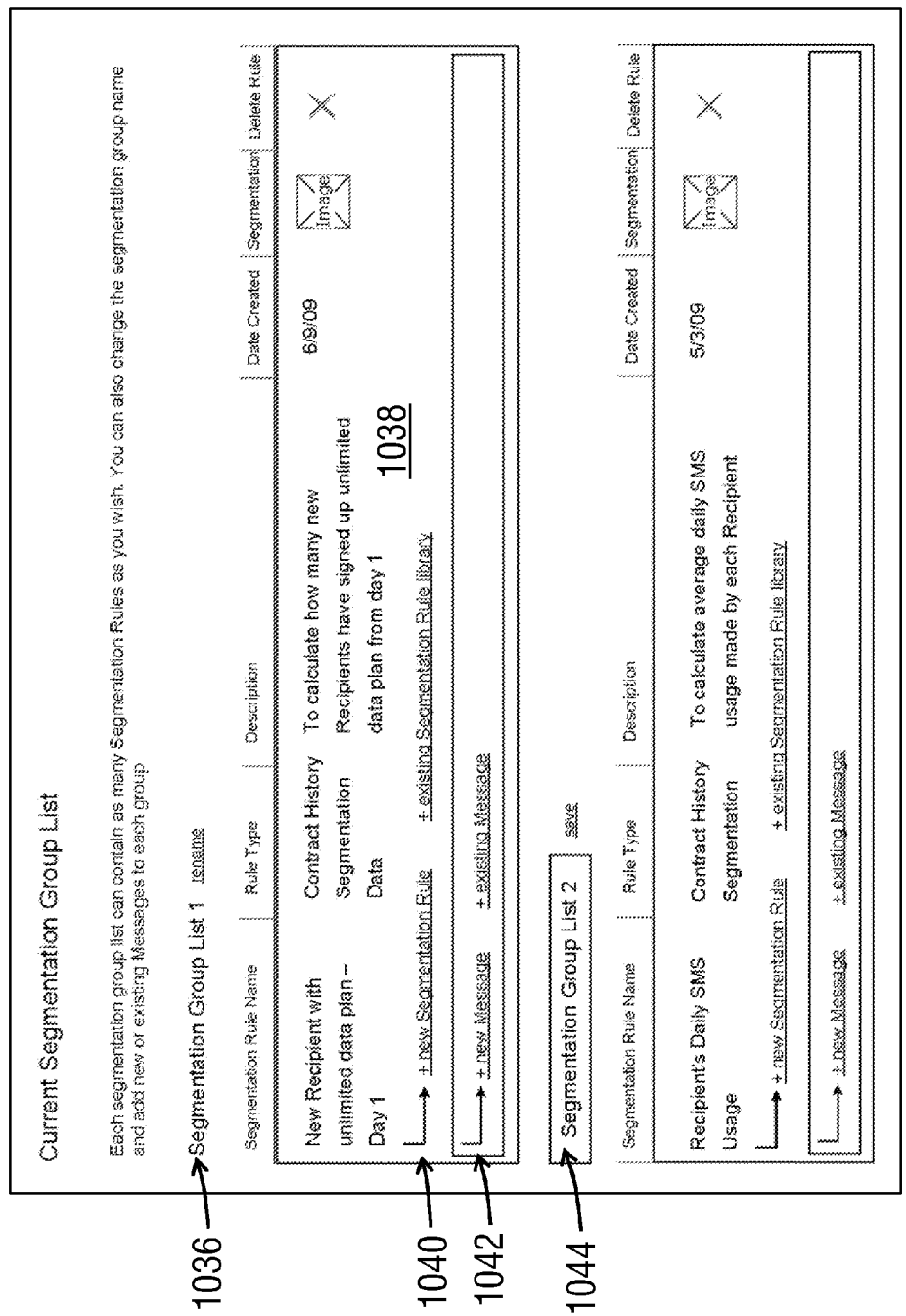
FIG. 38 of the accompanying drawings depicts a screen shot by which the Accounts use the Message Management Platform's UI to review Segmentation Groups, Segmentation Rules and Messages in the Campaign and specifically illustrates two Segmentation Groups in which each Segmentation Group has one rule in each.

FIG. 38 illustrates an example UI screenshot of how a Segmentation Rule, once created, appears up in the Segmentation Rules screen within a Campaign and to further develop Segmentation Group Rules. Segmentation Rules can be collected and used within a group and is depicted as a "Segmentation Group List-1" 1036 in this screenshot example. These rule groups are used to simplify the administration of Campaigns and the assignment of rules where multiple rules can trigger the request to play the same Message similar to how "Styles" can be used and apply with multiple attributes to single body of text in a document. Segmentation Rule Groups, by definition in this embodiment, are "or" conditions, meaning that any rule in a Segmentation Rule Group that evaluates as true will trigger the Message(s) assigned to the Segmentation Rule Group.

A Segmentation Rule as illustrated in the Example 1038 window is currently the only rule in the Segmentation Rule Group (currently named: Segmentation Group List 1). The Account 60 can add another Segmentation Rule to the Segmentation Rule Group by clicking one of the two available 1040 options of either an Add (+) new Segmentation Rule or use an Add (+) existing Segmentation Rule library". The Account 60 can also use an Add (+) New Message 1042 option to add a particular Message to the Segmentation Rule Group. A Segmentation Group List-2 1044 label is the default name of the second group.

Segmentation Rule Groups can be relabeled to help with clarity and further shared referencing as depicted in 1044. If for example, a particular Account 60 has many existing Segmentation Rule Groups, the EP's 50 functionality of naming subsequent groups sequentially by default can help manage the clarity and track the rule assembly order within the Segmentation Rule Group.

Figure 39:
FIG. 39 of the accompanying drawings depicts a screen shot by which the Accounts use the Message Management Platform's UI to review Segmentation Groups, Segmentation Rules and Messages in the Campaign and specifically illustrates one Segmentation Group with three Segmentation Rules in the Group which can trigger the Message, Messages or Sequences assigned to the Group.

FIG. 39 illustrates an example UI screenshot of a Segmentation Rule Group with three separate Segmentation Rules inside, as appears inside a box 1045 for the Group List-1. When the Segmentation Rule Group List-1 evaluates to true it triggers the selection of a particular Message ID that is associated with the rules in this Group example. In this example FIG. 39, the Account 60 has not created any Message assignments for this Segmentation Rule Group yet. The Account 60 can click on an Add (+) new Message 1046 link or an Add (+) existing Message1047 link to attach a Message to the Segmentation Rule Group.

Figure 40:
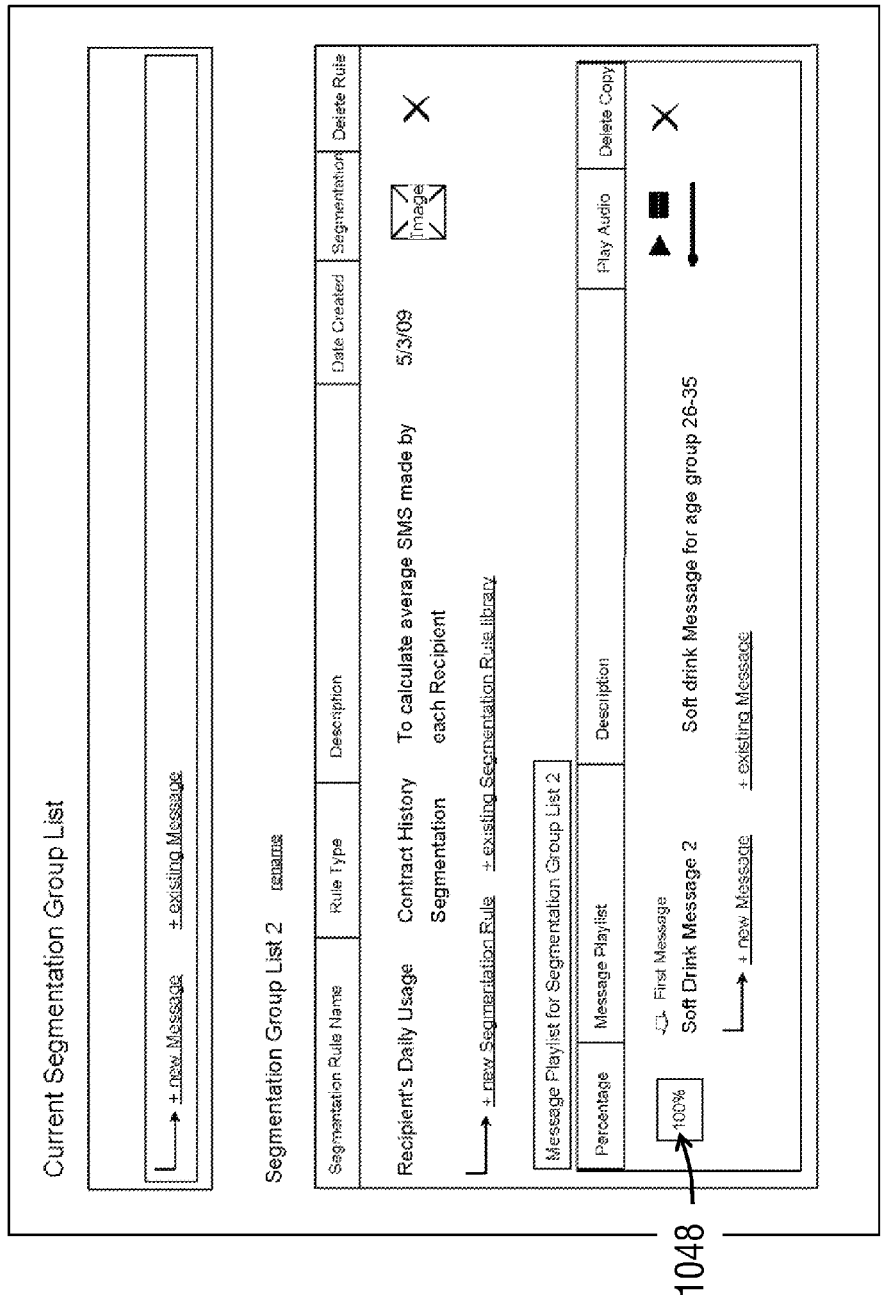
FIG. 40 of the accompanying drawings depicts a screen shot by which the Accounts use the Message Management Platform's UI to review Segmentation Groups, Segmentation Rules and Messages in the Campaign and specifically illustrates one Segmentation Group in which the Account is able to edit a ratio for one of a series of Messages in a Sequence.

FIG. 40 illustrates an example UI screenshot of how Message copy is treated within Segmentation Rule Group. The illustration depicts that when only one Message copy is included within the Segmentation Rule Group, the Message copy is automatically assigned a full 100% 1048 value representing the percentage of time that this particular Message will be played if this particular Segmentation Rule Group evaluates to true. Segmentation Rule Groups may have multiple Message copies or versions included, as in the following FIG. 41.

Figure 41:
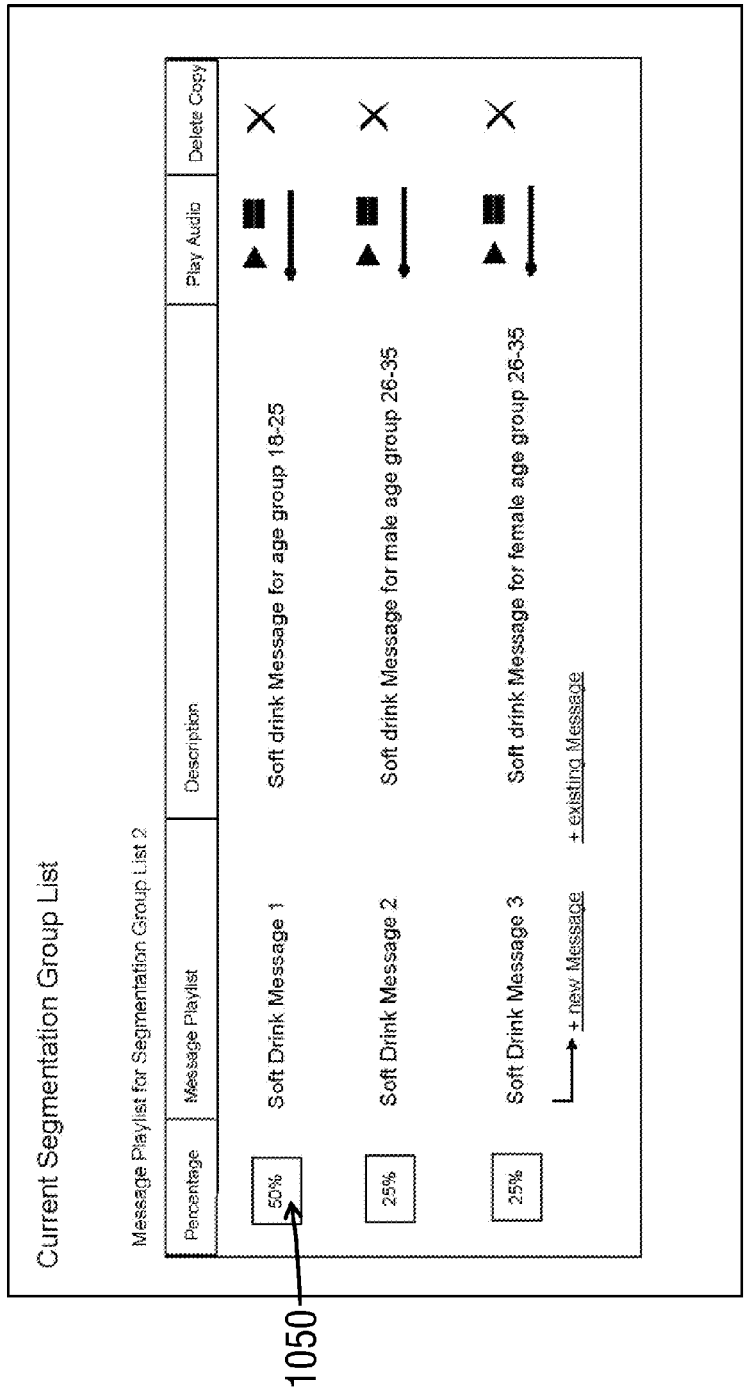
FIG. 41 of the accompanying drawings depicts a screen shot by which the Accounts use the Message Management Platform's UI to review Segmentation Groups, Segmentation Rules and Messages in the Campaign and specifically illustrates one Segmentation Group in which the Account is able to edit the Segmentation Group with three Messages which can be tested against each other.

FIG. 41 illustrates an alternative embodiment of Campaign Message assignment and an example UI screenshot of a Segmentation Rule Group where multiple Message versions are included. In this example, the screenshot illustrates three different percentages that were pre-assigned by an Account Member and each value represents the percentage of Recipients 46 who are meant to receive a each particular Message version. These pre-assigned percentages can be set to provide a mechanism to test the efficacy of a particular Message version in contrast with other Message versions, as is typically done in multi-variant testing. These multi-variant testing capabilities and associated rules can be pre-assigned and incorporated into the MSE 369 and OSE 359.

A field 1050 illustrates a value of 50%, where 50% of Recipients 46 are set up to receive, in this screenshot example, a "Soft Drink Message 1" Message version; another 25% of the total Recipients 46 are set up to receive a "Soft Drink Message 2" Message version; and the last 25% are set up to receive a "Soft Drink Message 3" Message version. As described earlier, thresholds and weighting can further be added to these pre-assigned values by the Account 60. In another alternative embodiment, these initial setting can also be set to be overridden and/or modified based on a threshold of performance data collected by the EP 50 and instructions provided by the Account 60.

Figure 42:
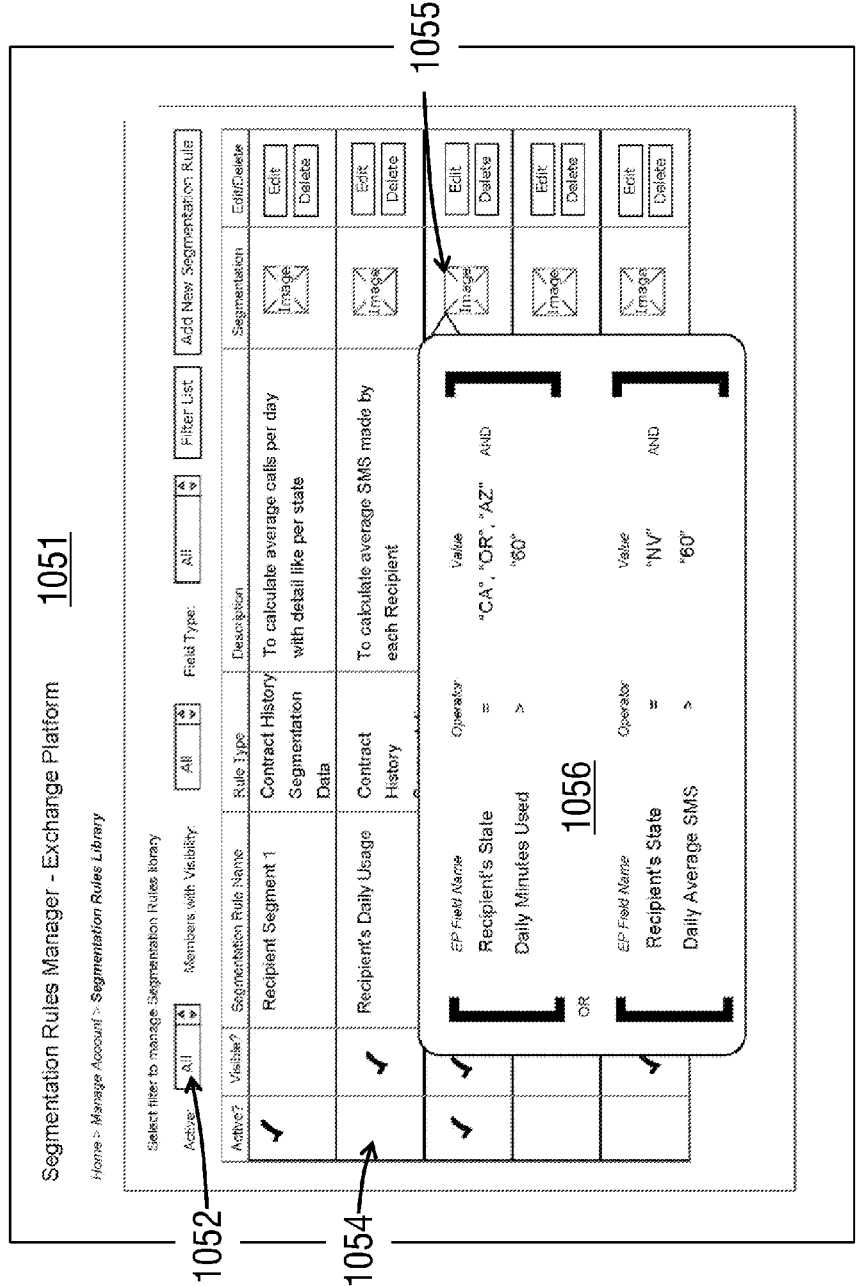
FIG. 42 of the accompanying drawings depicts a screen shot by which the Accounts use the Message Management Platform's UI to review a Segmentation Rules Library and specifically illustrates a window, which pops up when an Account clicks or hovers their mouse pointer on the Segmentation icon to view the details of the Segmentation Rule.

FIG. 42 illustrates an alternative embodiment of assigning Segmentation Group Rules and an example UI 1051 screenshot of a Segmentation Rules Manager. The Segmentation Rules Manager allows an Account 60 to further manage their Segmentation Rules that have been defined. For example, the Account 60 can update an entire Campaign ID or several Campaign IDs to utilize a particular Segmentation Rule and/or Group of Rules. An Active 1052 filter option allows the Account 60 to filter the results depicted in box 1054 of the Segmentation Rules window according to whether the Segmentation Rule is active or inactive, or whether the window (box 1054) should show both the active or inactive Segmentation Rules. A Pop-up 1056 window is displayed when the Account 60 rolls his/her mouse over the icon for the correlating image 1055 found in the Segmentation column of the 1051 window.

In this example and embodiment, the Pop-up 1056 window illustrates that the Segmentation Rule corresponding to the mouse roll over has two conditions which must be met for this particular Segmentation Rule to evaluate to true. In this embodiment, listed Segmentation Rule entries in the Segmentation Rules Manager can reference Messages that have been attached within Campaigns to the Segmentation Rule.

Figure 43:
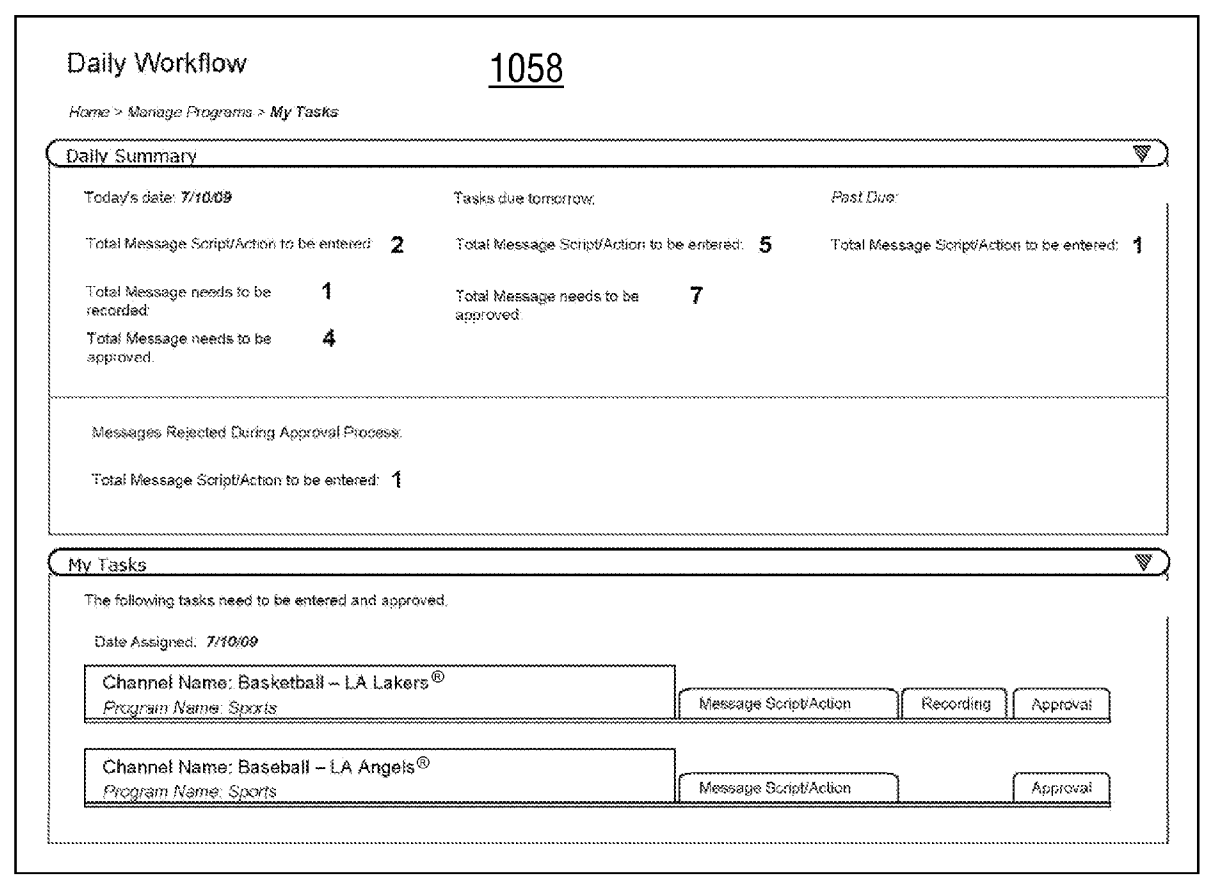

FIG. 43 illustrates an example UI screenshot 1058 of where an Account 60 can set up and/or manage all the tasks associated with their particular Account 60 and/or Account Member referred to as Workflow. This Workflow module is to help avoid situations where Campaigns, such as Opt-in Programs, go live in Campaigns with missing Campaign elements, such as data, rules, and/or content such as Message IDs and/or Action IDs. The EP 50 is setup to track all necessary Campaign elements and provides an interface that facilitates the creation and tracking of any necessary elements, including such elements as a Message's current script, script history, current voice over (VO) talent/background music, voice over/background music history, schedule recordings, VO talent Account 60 feedback, Message success relative to VO talent, current specifications, specifications history, current Message Class, Class history, current Message Pool, Pool history, current Message-to-Action associations, Action Classes and history, Action Pools and history, and whether elements are live, when their scheduled to go, pending what and how many missing elements, and/or currently assigned to a what live Campaign and/or Recipient Segmentations. This Workflow management can be accessed by an Account Member through the Dashboard 330.

In addition, the Workflow Manager, typically a specified Account Member with overall Account Administrator type privileges, can also setup roles for which Members and/or which other Accounts 60 are requested and/or required to approve specific elements and/or specific content before the elements/content are used by the EP 50 and/or before being sent to any Recipients 46 and/or a particular Recipient Segmentation, and by what specific deadline(s).

Figure 44:
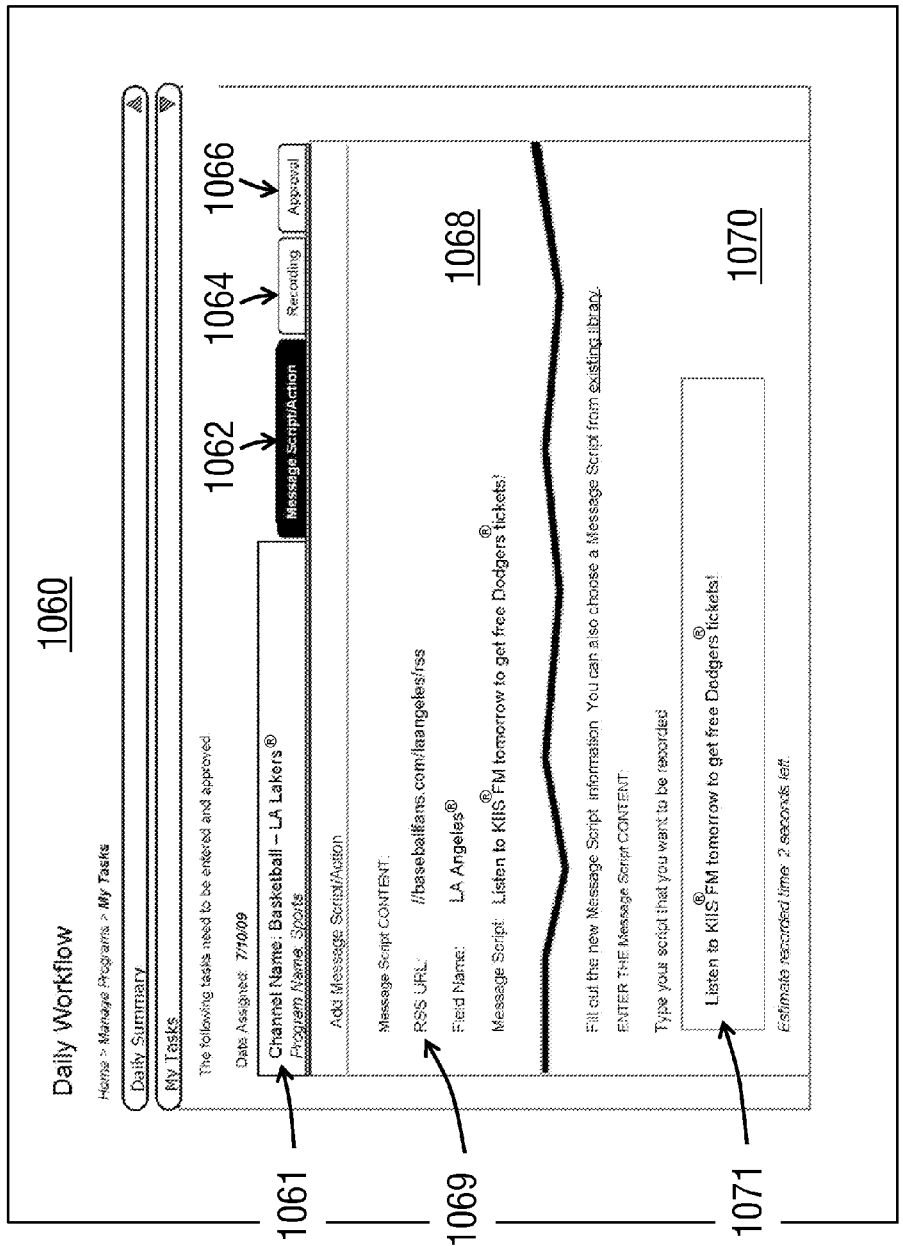
FIG. 44 of the accompanying drawings depicts a screen shot by which the Accounts use the Message Management Platform's UI to review or create Opt-in Messages, and specifically illustrates two ways that Message content can be created.

FIG. 44 illustrates an example UI screenshot 1060 of the daily Workflow where an Account 60 could manage a Sports Program with a Channel Name: Basketball—LA Lakers® 1061 tab. A Message Script/Action 1062 tab illustrates to the Account 60 the particular Message associated with a particular Program Channel, the Sports channel in this example. The tabs that are visible a particular Member of a particular Account 60 are subject to roles, privileges, and responsibilities specifically assigned to the particular Member logged into the 1060 screen.

In this example and embodiment, the Member sees the Message Script/Action 1062 tab, a Recording 1064 tab, and an Approval 1066 tab. The screenshot 1060 has two separate and distinct Message versions. One version illustrated in a screen section 1068 and the other version in a screen section 1070. The screen section 1068 version illustrates the Message Script Content coming from an RSS feed 1069, and the screen section 1070 version illustrates the Message Script Content being manually entered by the Account Member in text window 1071. The amount and types of Messages version(s) depicted on the screenshot 1060 to a particular Member will be based on the settings in the configuration for the particular Channel.

Figure 45:
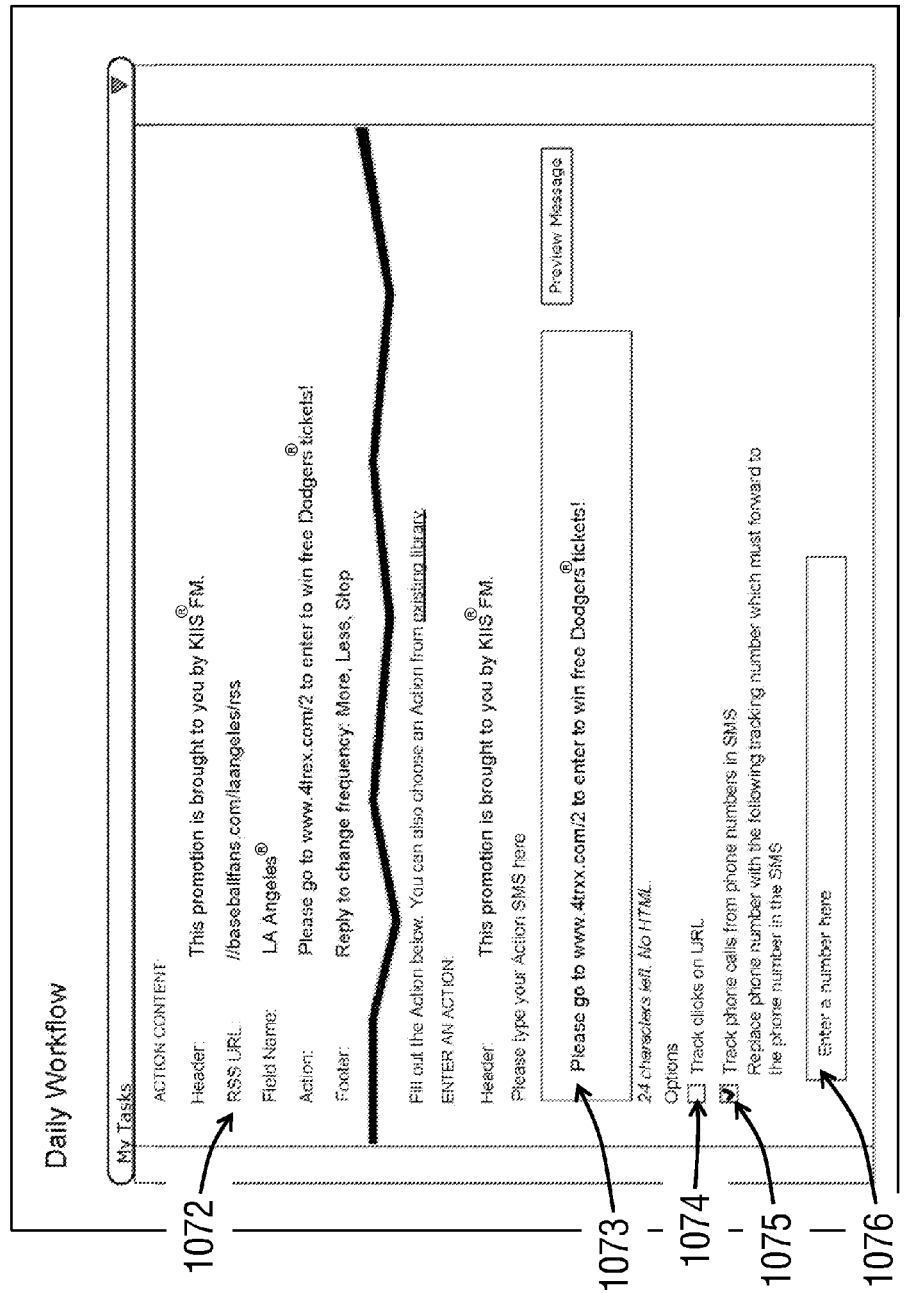
FIG. 45 of the accompanying drawings depicts a screen shot by which the Accounts use the Message Management Platform's UI to review or create a follow-up Action for an Opt-in Message, and specifically illustrates two ways that the follow-up Action content can be created.

FIG. 45 illustrates an example UI screenshot of the daily workflow section of the Message Script/Action tab in which the follow-up Action (SMS/MMS, etc.) is defined for the specific opt-in Message Program. This SMS response to an Action can come from an either an RSS feed 1072 or be entered manually into a window 1073 field, just as with the Message Script. The MSP 80 incorporates a mechanism to track a Recipient's 46 clicks and can be set to "on" by checking a Track clicks on URL 1074 box by the Account Member using the user interface (currently not checked in illustration). This check box 1074 tells the MSP 80 to track the URL provided in an SMS/MMS sent following any previous associated Action.

If a phone number is included in the SMS/MMS, the EP 50 can also replace the associated phone with a phone number that can be specifically tracked by first checking a "Track Phone calls from phone numbers in text (SMS) Message 1075" box. An instruction to "Replace phone number with the following tracing number which must forward to the phone number in the message" allows the Account 60 to setup a tracking phone number which forwards to the original number provided so the EP 50 can track the number of calls originating as a result of the Messages. After the phone number is entered in a 1076 field, the MMP 90 can be set to run a test to verify that the phone number does in fact resolve to the original number. If not, it can alert the specific Account Members with the appropriate roles and responsibilities of the issue in the Workflow manager module when, where, and how appropriate.

For example, this notification can be a Message alert when a particular situation is realized (near real-time) sent to a specific Account Member who is now a flagged and a Predetermined Recipient 46 with an alert Message from the EP 50 at his/her next communication that is connected to the EP 50. The alert can be as read off instructions via the synthesized software of a script automatically created with the missing elements and as to what the current issues are with a specific Campaign or with the EP 50.

Figure 46:
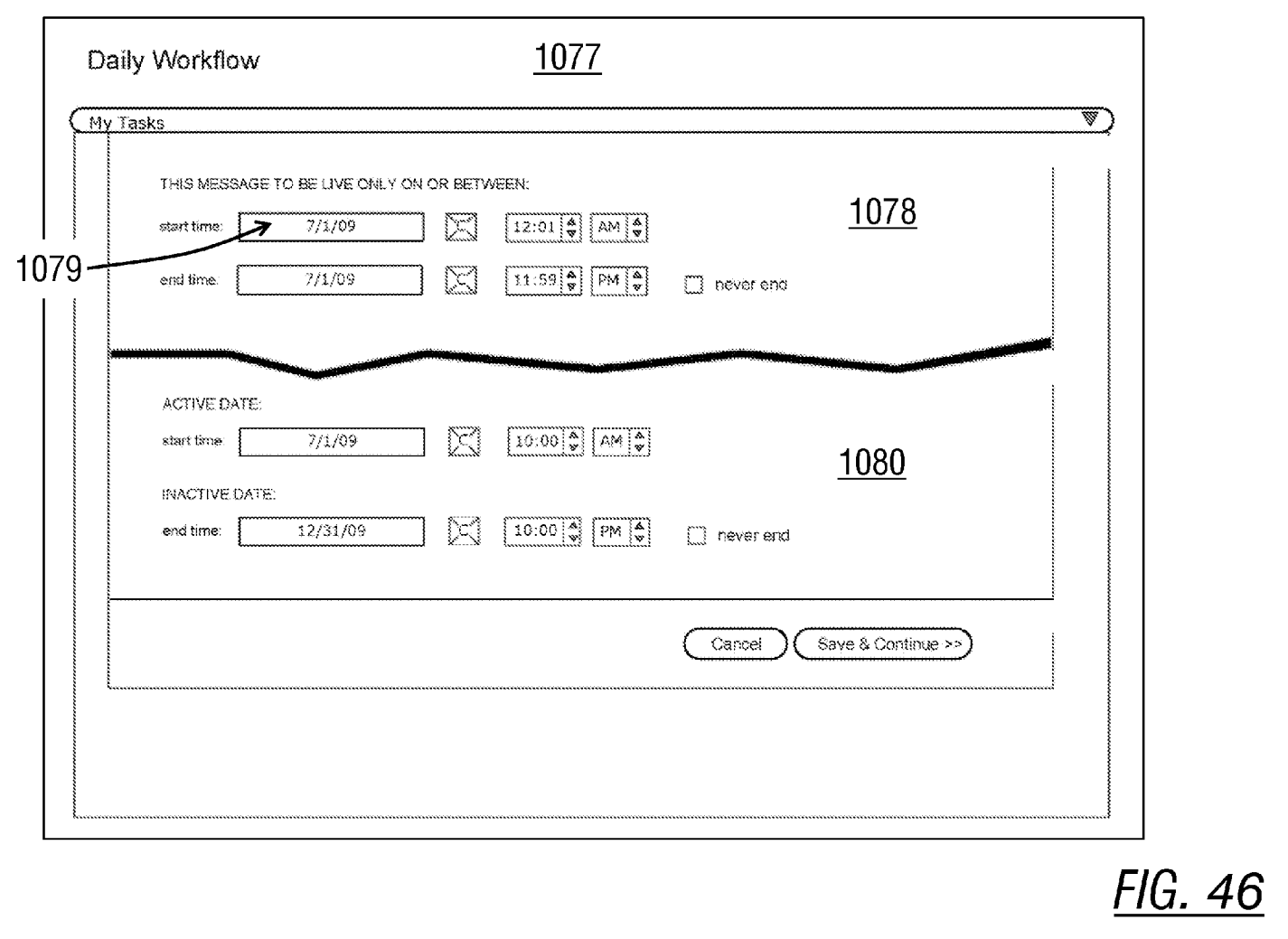

FIG. 46 illustrates an example UI screenshot 1077 of the daily workflow dedicated to tasks related to Timing Rules for Messages. An upper half screenshot section 1078 illustrates an example screenshot after an Account 60 has clicked the Message Script/Action 1062 tab back on FIG. 44 for a particular Message ID.

For example, some Programs, such as Opt-in Programs could be alerts and/or notifications of special dates, such as a famous person's birthday or a holiday where the corresponding date is setup as only day/dates in which the particular Message should and/or must be played. In screenshot upper half section 1078, the Account 60 can setup some of the TRM 362 rules by indicating which dates a particular Message may and/or must be played using a "start time" 1079 field, a end time, and the associated clock fields.

Alternatively, the Account 60 would use the lower half screenshot section 1080 on the illustration if instead the Message Script was preset to only be playable on a particular set of dates. In this example, the Account 60 may also select a date range during which the Message could be made available according to the overall timing rules of the particular channel setup in the TRM 362 and/or the PRRM 366.

Figure 47:
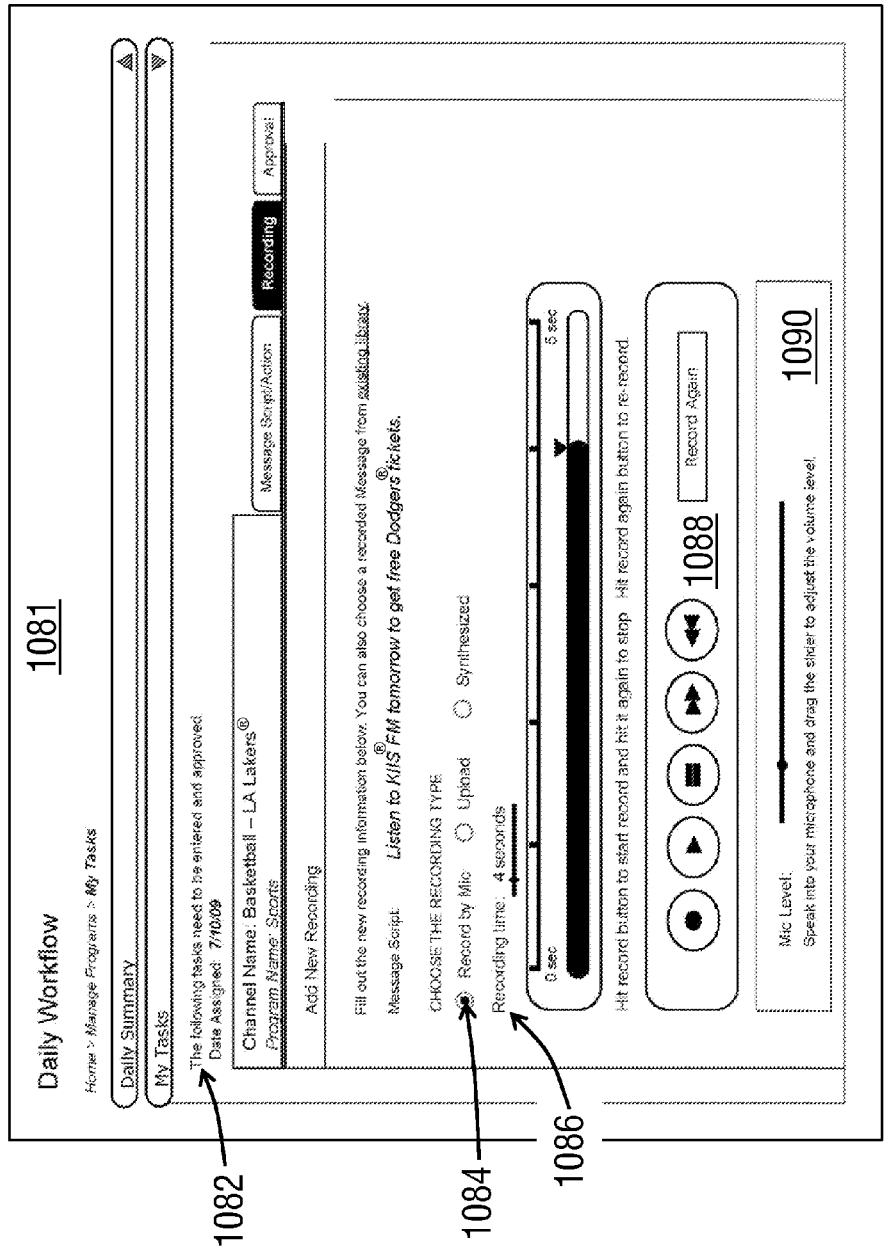
FIG. 47 of the accompanying drawings depicts a screen shot by which the Accounts use the Message Management Platform's UI to review, create or upload an audio Message for a specific Opt-in Channel that is part of an Opt-in Program, and specifically illustrates the features available when the Account plans to record the Message using the Platform's UI.

FIG. 47 illustrates an example screenshot 1081 of the daily workflow dedicated to the tasks of Recording. This example screenshot 1081 would be entered by an Account 60 after clicking the Recording 1064 tab back in FIG. 44.

A "The following tasks need to be entered and approved. Date Assigned: Jul. 10, 2009—1082" header tells an Account 60 Member some specific tasks due for an associated a particular Sports Message clip. The subsequent information in this example outlines some of the elements that could be requested as Tasks to a specific Member.

Based upon the settings for the channel in this example, the MMP 90 could be setup to automatically voice the Message Script via software within a synthesized voice module. If the Account 60 prefers another method an Account Member would be required to create the recording utilizing either a connected live microphone or by uploading the appropriate audio file for the Message clip. This screenshot 1081 illustrates some of the relevant settings and recording tools for those Accounts 60 who decide to record by microphone (mic), where starting with a Record by Mic 1984 radio button the Account Member has selected the "Recording Type".

Other Specifications can also be created, modified, reviewed, and/or assigned, such as the total recording time entered in a Recording Time 1086 field and depicted as "4 seconds" in this example. There is a set of recording controls in screen area 1088, and a Mic Level in screen area 1090 for microphone recording levels for those Accounts 60 who wish to manually record the Message's audio clip through the computer's microphone port or with a built-in microphone.

Figure 48:
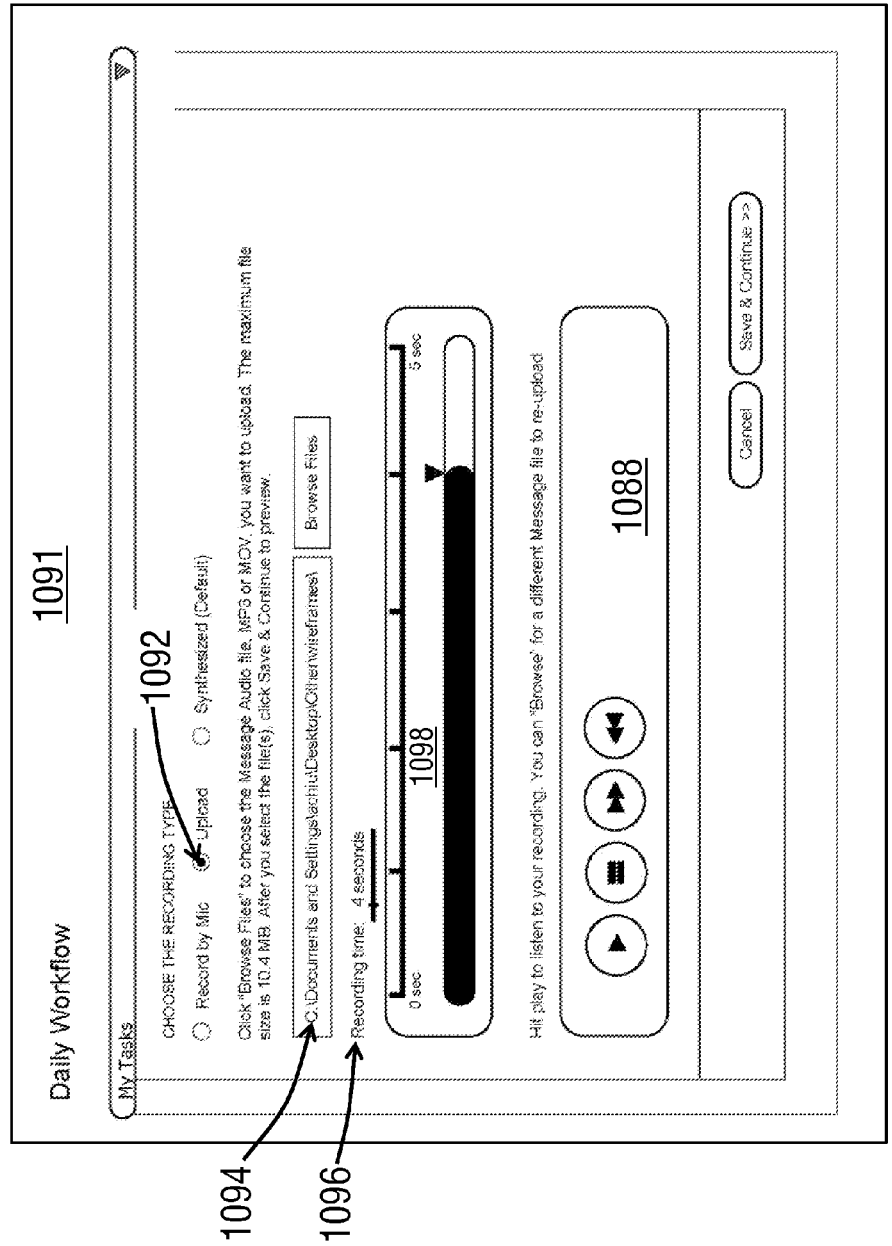
FIG. 48 of the accompanying drawings depicts a screen shot by which the Accounts use the Message Management Platform's UI to review, create or upload the audio Message for a specific Opt-in Channel that is part of an Opt-in Program, and specifically illustrates the features available when the Account plans to upload the Message's audio file using the Platform's UI.

FIG. 48 illustrates another UI example screenshot 1091 of the daily workflow dedicated for additional Recording tasks options. This example screenshot 1091 would also be entered by an Account 60 after clicking the Recording 1064 tab back in FIG. 44 and is the screenshot for the Account 60 who has instead selected the manual upload option for uploading a prerecorded Message audio clip using an Upload 1092 radio button.

The Account Member then selects a filename using a Browse Files 1094 button. After uploading the particular Message audio clip, the screenshot reflects a Recording time 1096 that is depicted as "4 seconds" in this example and is illustrated with the appropriate indicator bar length in a timeline 1098 window. The preview controls 1088 are also available, but appropriately without "Record" button option, since this is an upload.

Figure 49:
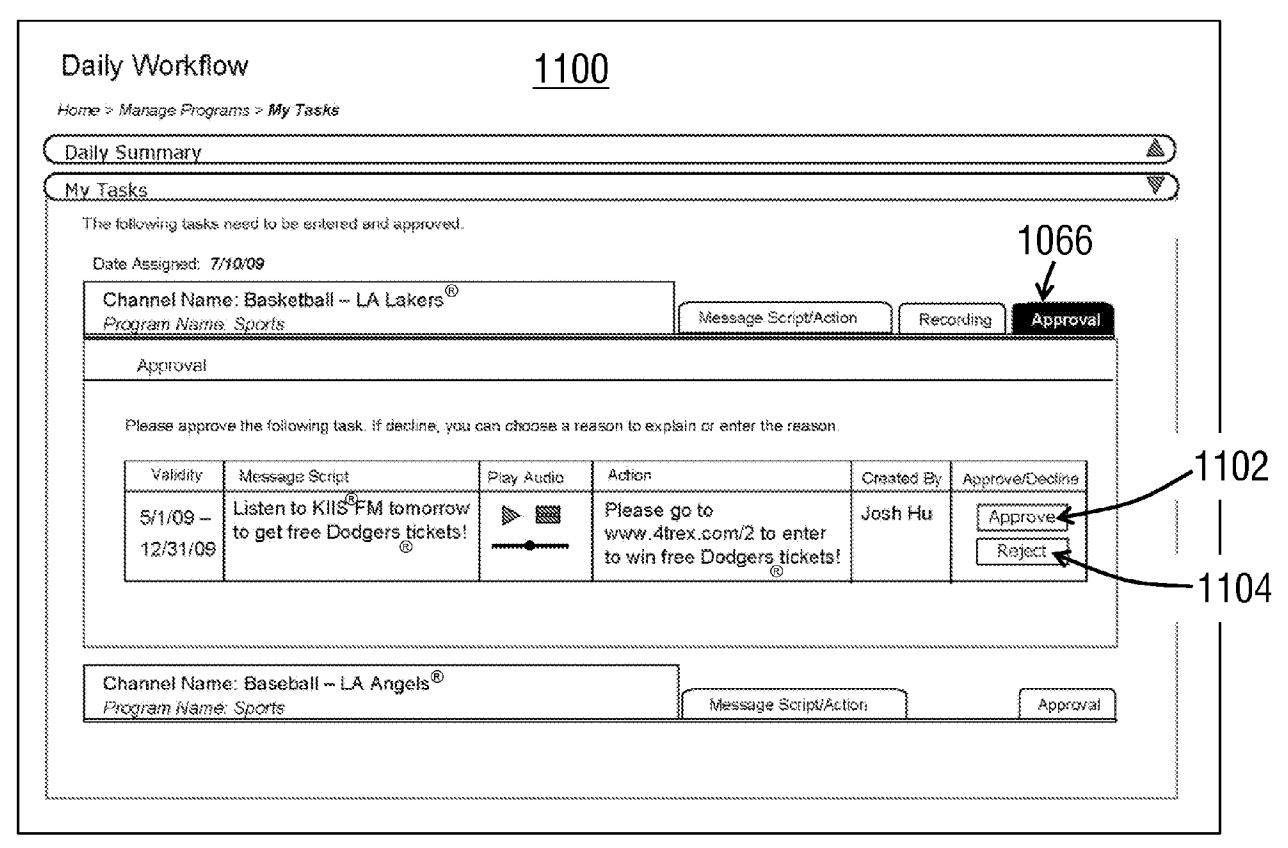

FIG. 49 illustrates an example UI screenshot 1100 of the daily workflow dedicated for Approval tasks that would be entered by an Account 60 after clicking the Approval 1066 tab (also depicted back in FIG. 44). Here the Account Members with the appropriate roles and privileges can pre-screen a particular Message and then give that particular Message an approval or rejection using an Approve 1102 option or instead using a Reject 1104 option.

In this example, the screen reflects an Account Member who has been assigned responsibility to approve the Message audio clips and thus he/she is provided the usage of the Approve 1102 and the Reject 1104 button privileges. Whereas these Approve/Reject buttons would be grayed out as inactive for those Account Members who did not have the necessary privileges.

This workflow Member privileges mechanism is configured through the Members/Roles 344 module mentioned back in FIG. 23 and also mentioned throughout where the Accounts 60 can assign specific approval responsibilities. Assuming this functionality is enabled by an Account 60, this Approve/Reject feature can ensure that Recipients 46 only receive Messages that have been pre-approved by the proper and pre-assigned Account Member, Members, and/or pre-assigned Members for pre-approving of other relevant Accounts, such as a participating Brand or Retail-type Accounts 68.

Figure 50:
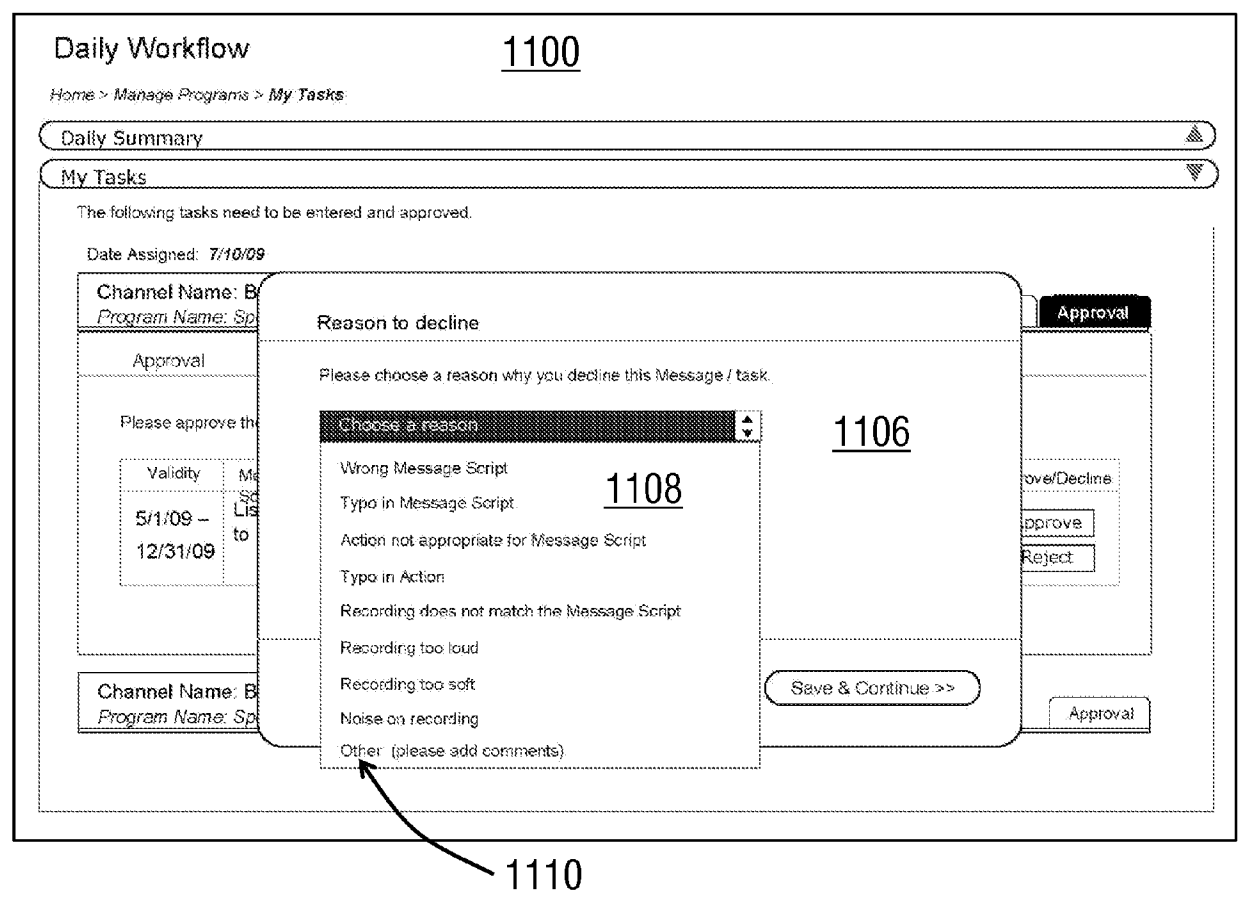

FIG. 50 illustrates the same example screenshot 1100 of the daily workflow dedicated for Approval tasks, but now with a Pop-up 1106 window. This Pop-up 1106 window appears after the Account Member has clicked the Reject 1104 option in the previous FIG. 49. The MMP 90 can be setup so that the Pop-Up 1106 window allows and/or requires the assigned Account Member or Members with the appropriate roles and privileges to explain the reason for his or her rejection for the particular Message audio clip or other Campaign elements being rejected by utilizing a Choose a Reason 1108 drop down list.

If the rejection is simply stated as "Other" as is illustrated with a Other 1110 rejection from the 1108 drop down options, then the EP 50 can be preset to allow and/or require the Account Member to utilize an additional comments text field to provide additional specific information regarding the reasoning (not shown). The rejected Campaign elements, such as a specific Message audio clip and any associated Campaign elements, such as the associated Actions then appear as an assignment on the Task list of either the appropriate Account Member who has responsibility for creating the Message script and/or the current audio recording; it can be specifically assigned to someone to correct, and/or it can be assigned to an Account Member who is specifically responsibility of addressing and/or correcting the specific rejection type given.

For example, if the reason for a rejection is that the recording quality was poor due to say, the recording levels being too soft, the Account Member who was responsible for the recordings could be notified in their Dashboard's 330 Workflow 346 module. If the reason for a rejection is that there is a "Typo in follow-up Action", then an Account Member specifically assigned to correcting typos could be notified to make the correction, and may be someone other than the Account Member who originally typed the specific follow-up Action that was rejected.

Figure 51:
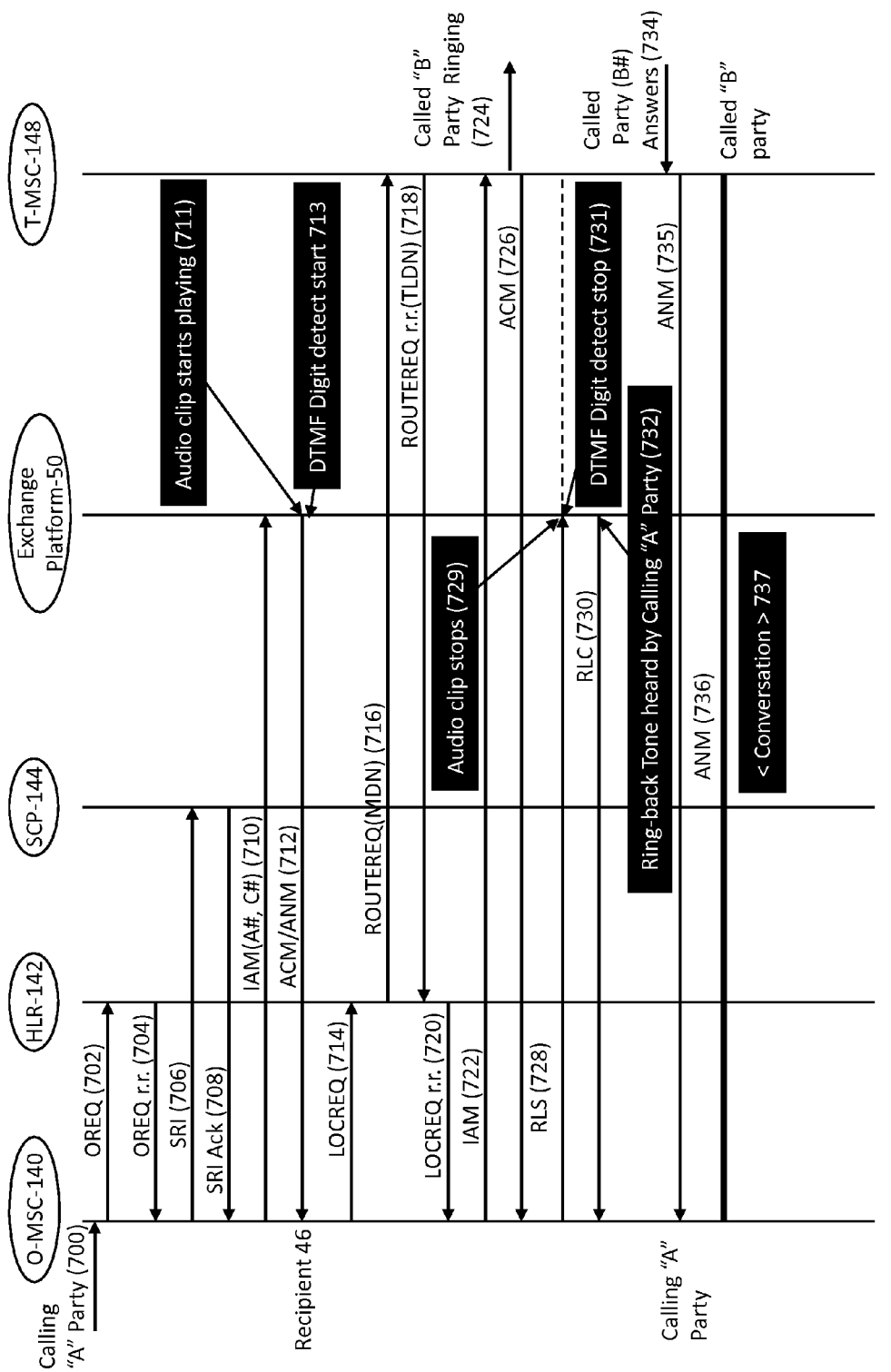
FIG. 51 of the accompanying drawings depicts a process of providing information from the Exchange Platform in the intelligent network according to an embodiment of the present invention.

FIG. 51 is a drawing illustrating a Call Sequencing process of providing the EP 50 service in a Mobile Operator/Carriers 62 intelligent network according to an embodiment of the present invention.

First, a Calling "A" Party 700 dials a Called "B" Party by pressing <send> on their mobile communication device. An Originating MSC (O-MSC) 140 sends an Origination Request (hereinafter "OREQ") 702 message to a HLR 142 for processing. The HLR 142 sends an OREQ 704 return result with Message Service flag set. The O-MSC 140 sends a Send Routing Information (hereinafter "SRI") 706 request message to a SCP 144 for processing.

In a SRI Acknowledgement 708, the SCP 144 directs the O-MSC 140 to route the call to an EP 50. The O-MSC 140 sends an Initial Address Message (hereinafter "IAM") 710 with the Redirect Number, A# and C#. The EP 50 returns an Address Complete Message (hereinafter "ACM/ANM") 712 to the O-MSC 140 and an Audio clip (Message) starts playing 711 the audio file associated to the Message ID that is designated for this specific mobile operator subscriber or now a Recipient 46. The EP 50 is at this point is listening for the Recipient's 46 Action, such as a DTMF Digit detect start 713 where a button pressed on the keypad of the mobile communication device or the Recipient 46 Action could instead be spoken words in a pre-assigned voice prompt Action.

Once the O-MSC 140 receives the ACM/ANM from the EP 50 and while the Message audio clip is playing to the Recipient 46, the O-MSC 140 sends a Location Request (hereinafter "LOCREQ") 714 to the HLR 142 for processing to a T-MSC 148.

The HLR 142 sends a RouteRequest with Mobile Dialed Number (hereinafter "MDN") 716 to the T-MSC 148. The T-MSC 148 responds to the HLR 142 with a RouteRequest Acknowledgement with Temporary Local Dialed Number (hereinafter "TLDN") 718.

The HLR 142 sends the TLDN 718 to the O-MSC 140 in the LOCREQ Return Result (hereinafter "r.r.") 720 which triggers the call to the T-MSC 148. The O-MSC 140 sends an IAM 722 to the T-MSC 148, meanwhile, the Recipient 46 is still hearing the audio Message played by the EP 50.

The Called "B" Party hears Ringing 724. The T-MSC 148 returns an Address Complete Message (hereinafter "ACM") 726 to alert the O-MSC 140 that the "B" Party is "ringing". The O-MSC 140 sends a Release (hereinafter "RLS") 728 to the EP 50 to disconnect from the call. The EP 50 stops the playing of the audio Message in an Audio clip (Message) stops 729 and a DTMF Digit detect stop 731 stops listening for Recipient's 46 button presses or spoken words in a voice prompt and returns a Release Complete (hereinafter "RLC") 730 to the O-MSC 140.

If a digit from the Recipient's 46 initial Action/DTMF were detected or a spoken word voice-prompt received while the EP 50 was listening for the Recipient's 46 Subsequent Action and an Action Response would then be triggered by the EP 50, such as an SMS message, although other Action Responses are possible with the EP 50 depending upon the settings for the Campaign and have been explained in detail earlier. In this diagram, an SMS requested by a Action taken by the Recipient 46 is returned as an Action Response by the EP 50.

A "Ring-back Tone heard by Calling "A" Party 732 allows the Recipient 46 to hear the "ring back" until the Called "B" Party 734 answers. The Called "B" Party Answers 734 resulting in an Answer Message (ANM) 735 being sent from the T-MSC 148 to the O-MSC 140. The O-MSC 140 connects the voice path to the T-MSC 148 and the Recipient 46, now the Calling "A" Party 700, can engage in a Conversation 737 with the Called "B" Party 734.

Figure 52:
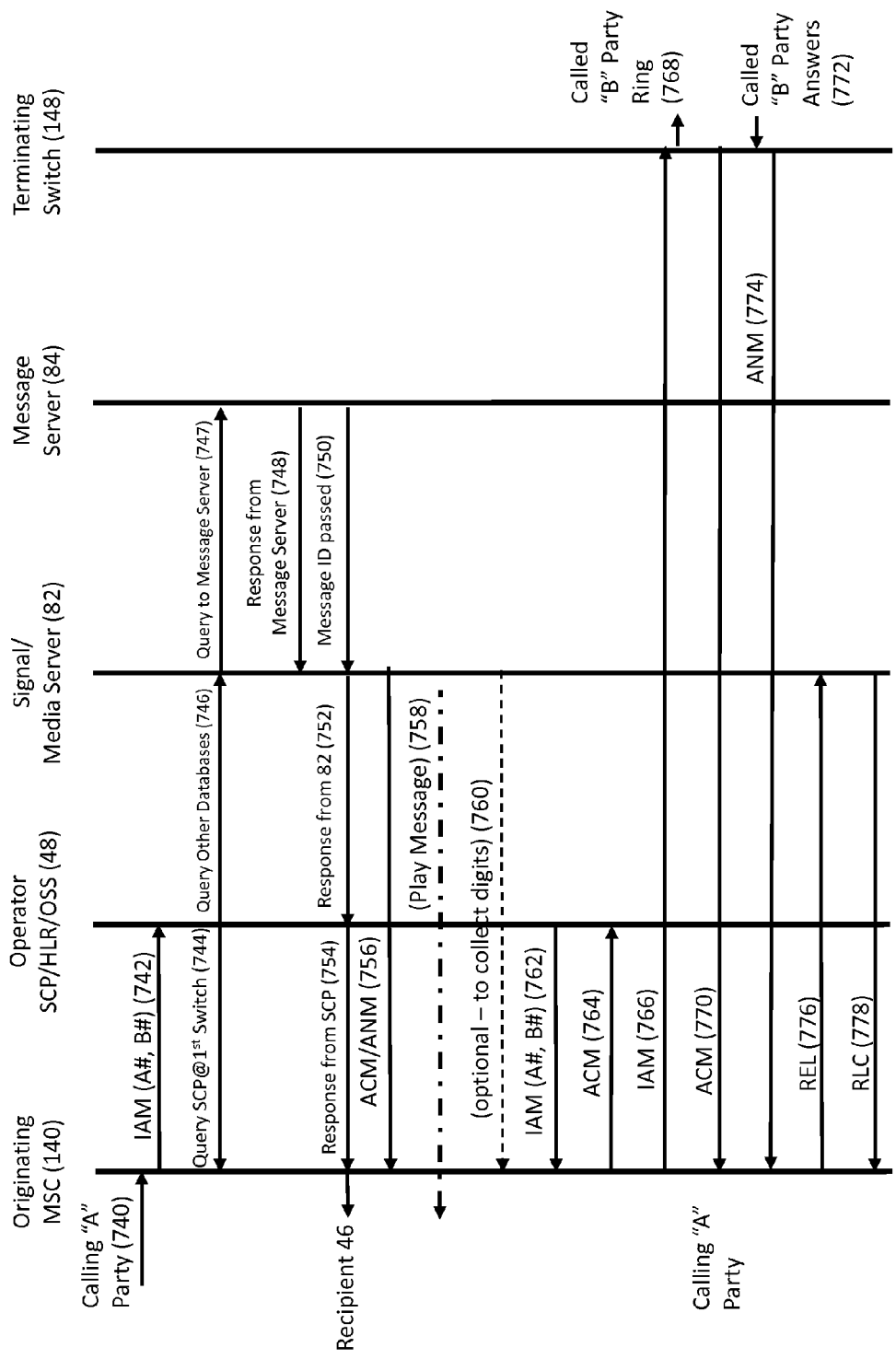
FIG. 52 of the accompanying drawings depicts a process of providing information from the Exchange Platform outside in the intelligent network in an alternative embodiment of the present invention.

FIG. 52 is a drawing illustrating an alternative embodiment of the Call Sequencing process in FIG. 51 that provides the EP 50 service in a Mobile Operator/Carriers 62 communication network according to the present invention.

First, A Calling "A" Party 740 dials a Called "B" Party by pressing <send> on their mobile communication device. An Originating MSC (O-MSC) 140 sends an IAM (A#, B#) 742 message to a HLR 142 (FIG. 2) within an Operator SCP/HLR/OSS 48 for processing. The HLR 142 within the Operator SCP/HLR/OSS 48 queries a SCP 144 (FIG. 2) to determine how the call should be handled. The SCP 144 within the Operator SCP/HLR/OSS 48 sends a return result as a Query SCP@1$^{st}$ Switch 744 to the O-MSC 140. The HLR 142 within the Operator SCP/HLR/OSS 48 may request information in a Query Other Databases 746 function to a Signal/Media Server 82 within the EP 50 (FIG. 3).

The Signal/Media Server Message 82 sends a Query to a Message Server 84 which responds with a "Response from Message Server 748" that indicates to the Signal/Media Server 82 whether or not there is a Message to play to Calling "A" Party 40, referred to as a Flagged Recipient 46 in this embodiment, as well as providing a Message ID passed 750 to the Signal/Media Server 82 if there is, in fact, a Message to be played.

If there is no Message ID or no Message to be played, the Message Server 84 will not return a Message ID. The Signal/Media Server 82 changes the response format into a Message format that can be interpreted by the SCP 144 within the Operator SCP/HLR/OSS 48 and sends a Response from 82 (752) back to the SCP 144 within the Operator SCP/HLR/OSS 48.

The SCP 144 within the Operator SCP/HLR/OSS 48 then responds to the O-MSC 140 in a Response from SCP 754 along with instructions on how to handle the call. The instructions will either be to process the call normally and connect to a Terminating Switch (T-MSC) 148 (not shown), or open a voice connection to the Signal/Media Server 82, depending on whether there was a Message ID and Message to play in step 750.

If a Message is to be played, the Signal/Media Server 82 returns an Address Complete Message (ACM) 756 to the O-MSC 140 and starts to play the audio Message clip selected in a Play Message 758 step for this specific Calling "A" Party 40, referred to now as a Recipient 46 is this embodiment. Once the audio Message starts to play, the Signal/Media Server 82 is listening for a button press on the keypad or spoken words from the Recipient 46 in the form of a predefined Action stored within the Message Server 84. If the Recipient 46 responds an Action request through such a button press or spoken word voice prompt, the Signal/Media Server 82 will respond with an Answer Message (ANM) 760 and will indicate the response from the Recipient 46.

Once the O-MSC 140 receives the ACM 756 from the Signal/Media Server 82 and while the Message is playing to the Recipient 46, the SCP 144 within the Operator SCP/HLR/OSS 48 sends an IAM (A#, B#) 762 back to the O-MSC 140 to request that the call proceed to the T-MSC 148. The O-MSC 140 responds with an ACM 764 to acknowledge the request, and triggers the connection to the T-MSC 148 with an IAM 766. The Called Party "B" begins to hear the ring 768 on their mobile communication device and acknowledges the request with an ACM 770. The T-MSC 148 alerts the O-MSC 140 that that Called "B" Party is "ringing" 770. When the Called "B" Party answers 772, the T-MSC 148 sends an ANM 774 notifying the O-MSC that the Called "B" Party has answered their phone. The O-MSC 140 sends a Release (REL) 776 which disconnects the Signal/Media Server 82 and Message Server 84 from the call. The Signal/Media Server 82 acknowledges the REL 776 request with a Release Completed (RLC) 778 message. At this point, the Recipient 46 and the Called "B" Party are connected and in a conversation.

FIGS. 53-56 are an alternative embodiment for the real-time call handling involving the MSE 369, the OSE 359 and the Actions that were depicted earlier in FIGS. 18-22.

Figure 53:
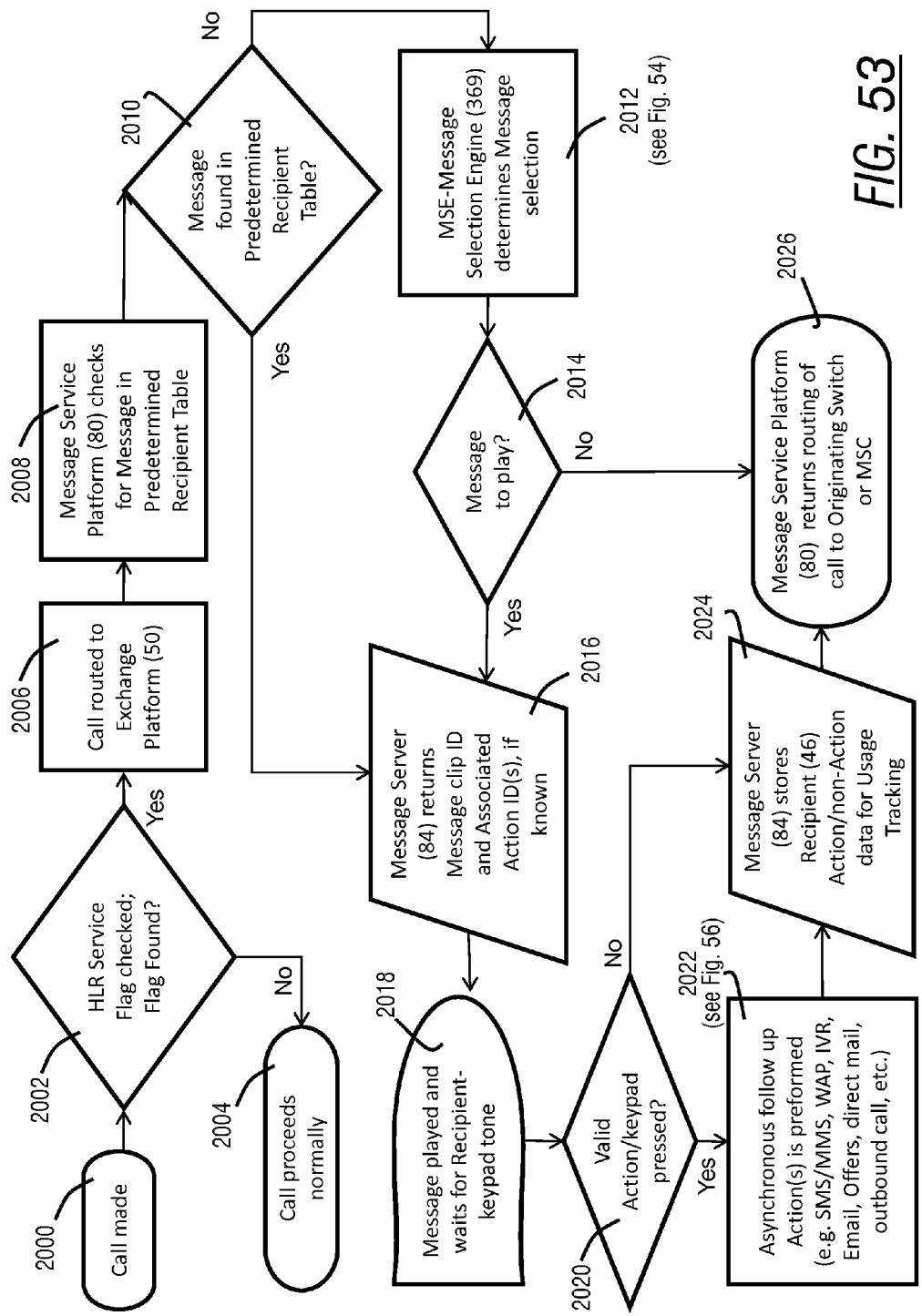
FIG. 53 of the accompanying drawings depicts a flowchart of an alternative embodiment of a process by which a call can be handled and processed in real-time.

FIG. 53 illustrates a flowchart of an alternative embodiment of a call flow process in use. Starting with a "Call Made 2000" by a Calling (A) Party's 40, the call routes through the CS 42 where a "HLR Service Flag Is Checked; Flag Found? 2002" set of instructions determines if the Calling (A) Party 40 is flagged or not. If not flagged, it routes to a "Call Proceeds Normally 2004".

If step 2002 is answered "Yes", then "Call is routed to Exchange Platform (50) 2006" where a "Message Server Platform (80) checks for a Message in Predetermined Recipient Table 2008". If the answer to a "Message Found in Predetermined Recipient Table? 2010" is "Yes", then a prompt is sent where a "Message Server (84) returns Message clip ID and Associated Action ID(s), if known 2016". If step 2010 is answered "No", then a prompt is sent to a "MSE-Message Selection Engine (369) determines Message selection 2012" (explained in detail in FIG. 54 for this alternative embodiment).

The MSE 369 should send a single Message ID to a "Message to Play? 2014" query. If step 2014 is answered "No", as in there is no Message ID or there is no Message found associated with that particular Message ID, then the "Message Service Platform (80) returns routing of call to Originating Switch or MSC 2026". If the answer to step 2014 is "Yes" as in there is a Message associated with the Message ID and available to play, then the "Message Server (84) returns Message clip ID and Associated Action ID(s), if known 2016" to the Signal/Media Server 82 where a "Message played and waits for Recipient-keypad tone 2018" function is invoked.

If the answer to the next query: Was there a "Valid Action/keypad pressed? 2020" results in a "No", during the duration of time that the Connection 54 remains open, then a "Message Server (84) stores the Recipient (46) Action/non-Action data for Usage Tracking 2024" function is invoked. If the answer to step 2020 is a "Yes", then an "Asynchronous follow up Action(s) is performed (e.g. SMS/MMS, WAP, IVR, email, offers, direct mail, outbound call, etc.) 2022" back to the Recipient 46. Next the "Message Server (84) stores Recipient (46) Action/non-Action data for Usage Tracking 2024" function is invoked. Then the "Message Service Platform (80) returns routing of call to Originating Switch or MSC 2026" is invoked.

Figure 54:
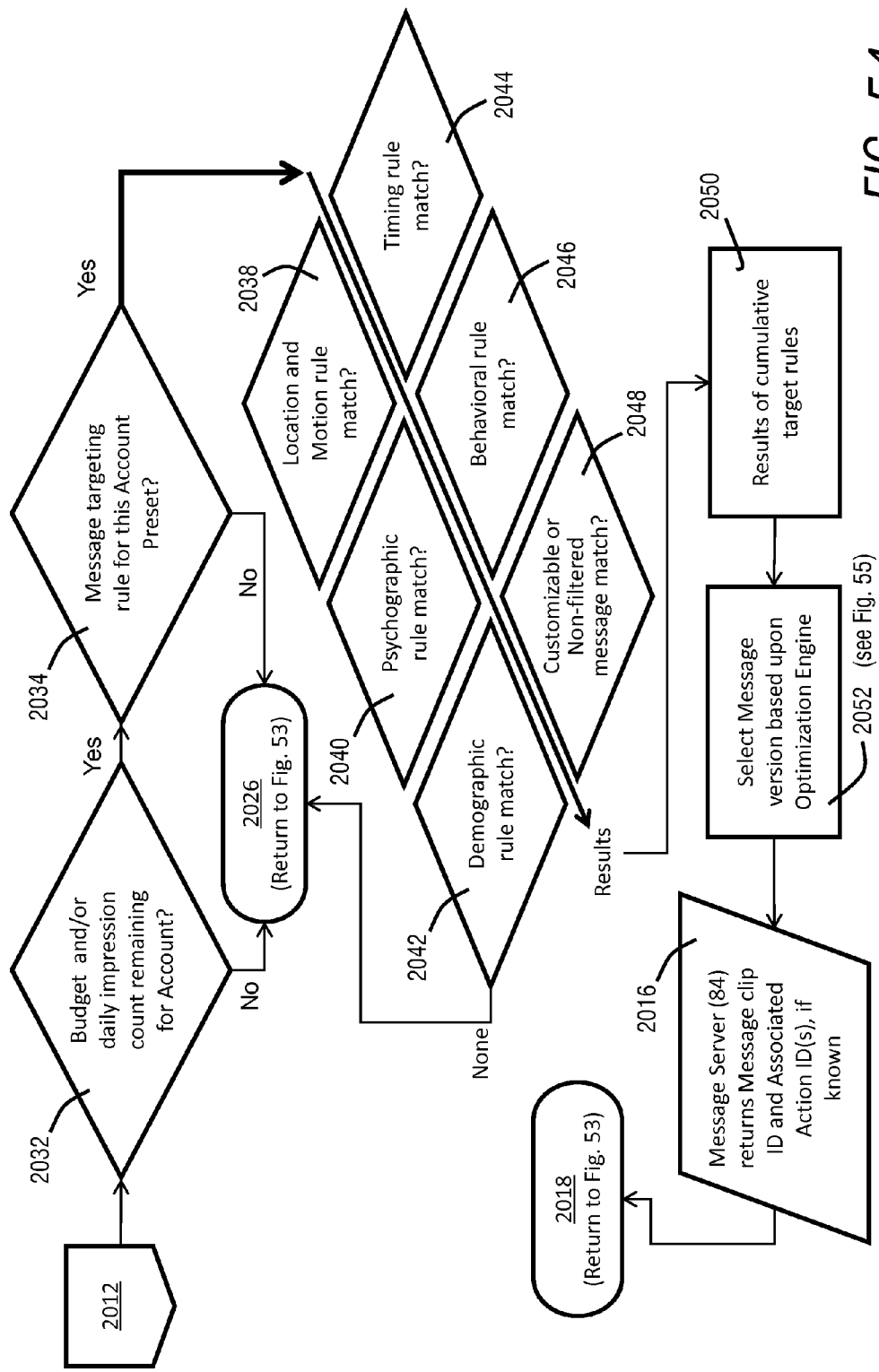
FIG. 54 of the accompanying drawings depicts a flowchart of an alternative embodiment of an alternative embodiment of a process by which the Message Selection Engine is used in the call flow.

FIG. 54 illustrates a flowchart of an alternative embodiment of FIG. 19 of the steps taken by the MSE 369 in part 2012 on the previous Figure. The step following step 2012 asks If there is a "Budget and/or daily impression count remaining for Account? 2032". If the answer is "No", then the call is routed back to step 2026 in the previous Figure. If the answer to query 2032 is "Yes", then the next query asks if a "Message targeting rule for this Account Preset? 2034". If the answer to query 2034 is "No", then the call is also routed back to step 2026 in the previous Figure.

If the answer to query 2034 is "Yes", then the Message Server 84 uses the combined results of the MSE 369 by invoking several cumulative queries, including an "Employ Location and Motion rule match? 2038"; a "Psychographic rule match? 2040"; a "Demographic rule match? 2042"; a "Timing rule match? 2044"; a "Behavioral rule match? 2046"; and a "Customizable or Non-filtered Message match? 2048". If any of these queries 2038, 2040, 2042, 2044, 2046 or 2048 result in a "No" answer, the MSE 369 continues to calculate the remaining data. The "Location and Motion rule match? 2038" involves the Campaign's associated rules for the Location and Motion of the Calling (A) Party 40 and/or Called (B) Party 44 and was explained earlier. The "Psychographic rule match? 2040" involves associated rules for targeting based upon the Recipient's 46 profile information. The "Timing rule match? 2044" includes traditional advertising delineations, such as restricting or only allowing the Campaign to run during certain times of day, days of the week, etc. and is referenced in more detail earlier. The "Behavioral rule match? 2046" involves associated rules for targeting based upon the Recipient's 46 prior Action/non-Action to Messages, Actions, Offers or other available Behavior information described earlier. The "Customizable or Non-filtered Message match? 2048" involves custom rules created by an Account 60 and is described earlier.

The cumulative results of these rules and associated instructions are passed to step 2050 as a list of prioritized Message IDs, from those Messages that have been played the most to those Messages that have been played the least (if known). This Message ID list is then passed into the "Select Message version based upon Optimization Engine 2052" which is explained in detail in FIG. 55. With the single Message ID selected in step 2052, the "Message Server (84) returns Message clip ID and Associated Action ID(s), if known 2016" back to the step 2018 as is also illustrated in the previous Figure.

Figure 55:
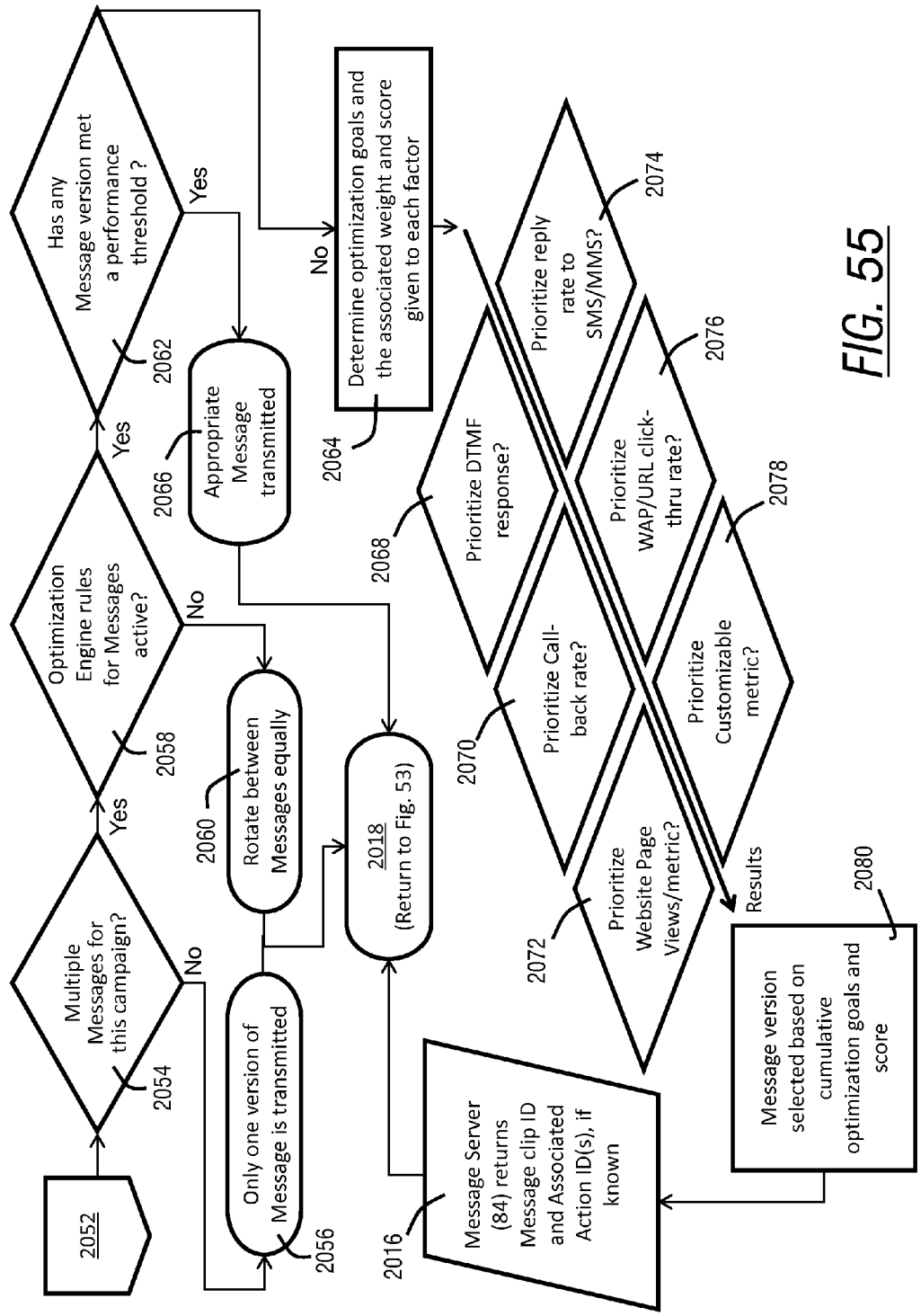
FIG. 55 of the accompanying drawings depicts a flowchart of an alternative embodiment of a process by which the Optimization Selection Engine (OSE) is used in the call flow.

FIG. 55 illustrates a flowchart of an alternative embodiment of FIG. 21 of the steps taken by the OSE 359 and illustrated back in step 2052 on FIG. 54. The first query asks if there are "Multiple Messages for this Campaign? 2054". If the answer to the query 2054 is "no", then "Only one version of Message is transmitted 2056" is invoked where the one Message ID and list of potential Actions and instructions associated with that Message ID get passed back to the step 2018 in FIG. 53.

If the answer to query 2054 is "yes", then the next step asks if an "Optimization Engine rules for Messages active? 2058". If the answer to query 2058 is "No" then the list of associated Message IDs will be sent to a "Rotate between Messages equally 2060" function, where a single Message ID is then passed back to the step 2018 in FIG. 53.

If the answer to query 2058 is "yes", then the next query asks a "Has any Message ID version met a performance threshold? 2062". This performance threshold is predetermined and set up by the Accounts 60 using the OSM 358. For example, if an Account 60 set up a "performance threshold" of say "one-thousand plays" for a particular Campaign, then step 2062 would pass any Message IDs with "one-thousand plays" or more on to an "Appropriate Message ID transmitted 2066" step. If there is more than one Message ID tied for the "most played", this step 2062 selects randomly a single Message ID from this list of "most played" and that single Message ID is then passed back to step 2018 on FIG. 53.

If the answer to the query 2062 is "yes" then the version which has already met a performance threshold is selected and the "Appropriate Message transmitted 2066" back to the step 2018 in FIG. 53.

If the answer to query 2062 is "no" then the next step is a "Determine optimization goals and the associated weight and score given to each factor" that commences a process whereby the optimization rules are retrieved from the OSE 359 and can be "yes" to employ one or more of the following instruction settings: a "Prioritize DTMF response? 2068"; a "Prioritize Call-back rate? 2070"; a "Prioritize Website Page Views/metric? 2072"; a "Prioritize reply rate to SMS/MMS? 2074"; a "Prioritize WAP/URL click-thru? 2076"; and a "Prioritize Customizable metric? 2078".

For example, if ten Message IDs were collectively sent from step 2064 and the only active rule was the "Prioritize DTMF response? 2068" then the other five functions 2070, 2072, 2074, 2076, and 2078 would be ignored and the Message ID with the highest number of initial DTMF responses would become the single Message ID selected in step 2080. The OSM 358 rules can add logic and Boolean operators. For example, a rule could first state take the Message IDs with the top four highest initial number of DTMF responses and then second, re-prioritize those four Message IDs based on Messages that have performed best at generating "website page views" from step 2072.

The single Message ID with cumulative best performing rule results would pass from step 2080 to the next step where the "Message Server (84) returns Message clip ID and Associated Action ID(s), if known 2016". Meaning some Message IDs have the initial Action pre-assigned to them, some have the initial Action and some Subsequent Actions pre-assigned to them, and some Message IDs allow the ASE 383 to select the most appropriate Action. The "Message Server (84) returns Message clip ID and Associated Action ID(s), if known 2016" on to step 2018 back on FIG. 53.

Figure 56:
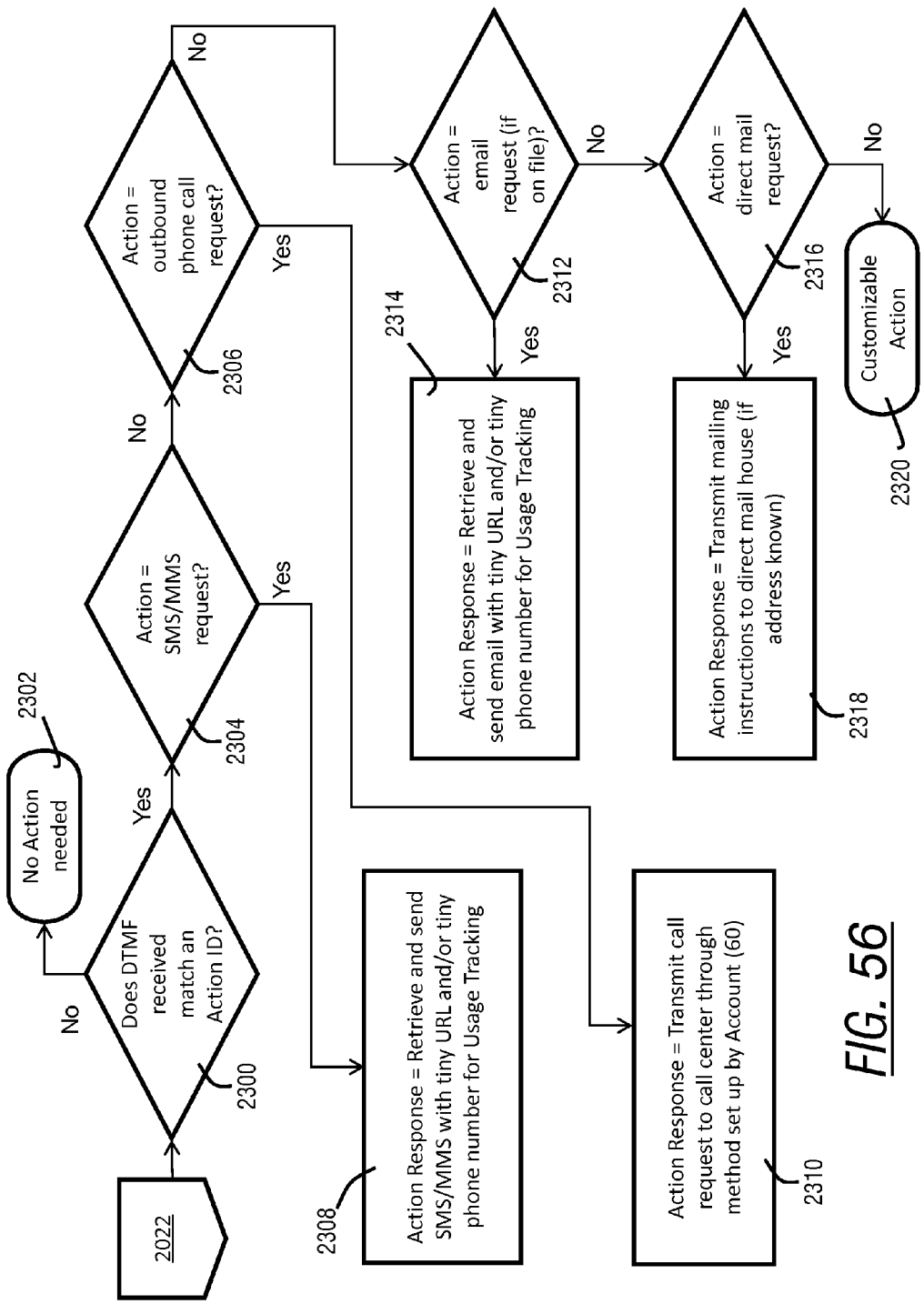
FIG. 56 of the accompanying drawings depicts a flowchart of an alternative embodiment of the post-message Action handling as used in the call flow.

FIG. 56 illustrates a flowchart of an alternative embodiment of FIG. 22 of the steps taken after a Recipient 46 responds to a Message with an Action back in step 2022 on FIG. 53. The first query asks a "Does DTMF received match on an Action ID? 2300". If the answer is "No", then a "No Action needed 2302" is invoked. If the answer to query 2300 is "Yes", then the Recognizable Recipient Action ID is passed to the next query to ask does an "Action=SMS/MMS request? 2304". If the answer to query 2304 is "Yes", then the Action ID is passed to an "Action Response=Retrieve and send SMS/MMS with tiny URL and/or tiny phone number for Usage Tracking 2308" function that is invoked.

If the answer to query 2304 is "No", then the Action ID is passed to the next query to ask does an "Action=outbound phone call request? 2306". If the answer to query 2306 is "Yes", then the Action ID is passed to an "Action Response=Transmit call request to call center through method set up by Account (60) 2310" function that is invoked. If the answer to query 2306 is "No", then the Action ID is passed to the next query to ask does an "Action=email request (if on file)? 2312".

If the answer to query 2312 is "Yes", then the Action ID is passed to a "Retrieve and send email with tiny URL and/or tiny phone number for Usage Tracking 2314" function that is invoked. If the answer to query 2312 is "No", then the Action ID is passed to the next query to ask does an "Action=direct mail response? 2316". If the answer to query 2316 is "Yes", then the Action ID is passed to an "Action Response=Transmit mailing instructions to direct mail house (if address known) 2318" function that is invoked.

If the answer to 2316 is "No", then the Action ID is passed to a "Customizable Action 2320" function that is invoked. At step 2320 an Account 60 can create rules for a "catch all Action" for when Action IDs that were thought to be "recognized" in step 2300, but pass through all available Action lookup queries (e.g. 2304, 2306, 2312, and 2316) without an Action assignment. The rule applied to step 2320 could be to employ a default Action (e.g. a SMS "Please try again"), No Action needed 2302, or some set of rules whereby Actions are selected from an available Class and/or Pool randomly and/or per a specific Campaign.

The present invention has vast applicability in the relevant industry. According to the industry, at the end of 2008, there were over 17 billion global mobile subscribers. Now, there are over 300 million mobile subscribers in just the United States and Canada. North American mobile operators are believed to collectively average over five customer service calls per mobile subscriber annually. The calls from these mobile subscribers into customer service centers are often quite costly to facilitate and time consuming to both the mobile call center as well as the subscriber.

Further, every year millions of mobile subscribers simply switch who their mobile service provider is contracted through, often due to frustrations encountered over difficult interactions and/or misunderstandings with customer service, billing issues, hardware and software problems, and the like. Therefore, a great disconnect exists which facilitates the aforementioned problems.

As has been described above, according to the above-described embodiments, an advantage of the invention is that it facilitates the linkage of targeted information, customer service, content, marketing, and/or advertising between the "Recipient" 46, typically a mobile subscriber of a particular "Mobile Operator/Carrier" 62, and parties who wish to effectively communicate to these Recipients 46. The ability to target individuals, or customers/subscribers, with relevant information, marketing, and customer service messaging is crucial to the mobile communication industry in solving the mentioned issues.

The invention facilitates the ability for mobile network operators and carriers to communicate effectively with their customer base through targeted Campaigns. These profiled Messages can help the mobile network operators and carriers enhance their Lifecycle Management efforts to improve the customer experience, reduce churn, promote Value Added Services, and increase Average Revenue Per User (ARPU). These Campaigns are created to be unobtrusive and to provide actionable Messages that are inserted into the Recipient's 46 call stream, which can reinforce brand tenets, preempt customer service issues, and promote new products and services.

The invention further provides an advantage by offering a vehicle for competing mobile operators, advertisers, advertising agencies, retailers, brands, handset manufacturers, distribution channel owners, content providers, online users, and the mobile subscribers themselves to all become active participants or "Accounts," 60 via a web-based Exchange Platform 50. This invention can leverage existing technology within the Mobile operator's/Carrier's 62 network that is linked to the Exchange Platform's 50 content insertion capabilities and rules-logic engines. Yet, an advantage of the invention is that the platform is not limited to mobile operator and carriers' infrastructure. The invention can effectively connect anywhere there is a physical and/or wireless communication link to the EP 50 via such connection tyically used for land lines, mobile devices, transceivers with motion detectors, etc.

A significant advantage of the system is the Exchange Platform 50. The Exchange Platform 50 provides the ability to target customer service, improve communication efficiencies, and provide information and content that's relevant to each Recipient 46. The aforementioned problems often sterns from one's ability to initially and properly collect, normalize and segment the data. The Exchange Platform 50 solves this problem. The Exchange Platform 50 facilitates these key elements and continually tracks usage and performance so that in turn, the data collected leads to even greater optimizations, functionality, and data granularity for improved information searching.

Another advantage of the Network Communication System 38 is the Campaign. The Campaign messaging setup by the Accounts 60 within the Exchange Platform 50 can employ a wide range of targeting rules and instructions that including sequencing, timing, permissioning, provisioning, budgeting, and/or bidding Furthermore, the Campaigns themselves have subsequent and trackable elements/components that build upon the previously delivered Messages, Actions, and data that was sent, requested, and/or collected. These data points are measured, and in turn, continually improve the effectiveness of subsequent Messages and Actions that follow within a Campaign or Campaign goal.

The Exchange Platform 50 also facilitates the ability to have mobile subscribers and online user's preselected channels of programs or Campaigns with content of interest to him or her individually, such as specific sports, news, weather, financial news, gossip, entertainment, etc. In addition, Recipients 46 can also become Accounts 60 and even create their own Campaigns that have targeted messages to family members and/or friends. The foregoing description of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

The foregoing description of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed:

1. A method for providing messages to a recipient, the method comprising the steps of:
providing a flagged recipient database;
receiving a communication from a potential recipient with a recipient identifier via a communication device;
determining if the potential recipient is a flagged recipient in the flagged recipient database via the recipient identifier;
if the recipient identifier is found, returning a message identifier and one or more associated action identifiers; and
forwarding a message from a message pool from a message server to the flagged recipient via the communication device.

2. The method of claim 1 further comprising the steps of receiving a response from the flagged recipient and providing a further message from the message pool to the flagged recipient.

3. The method of claim 1 wherein the step of forwarding the message from the message pool comprises an audio message.

4. A method for providing messages to a phone call originator comprising the steps of:
providing a flagged caller database;
receiving a request from the phone call originator with a phone call originator identifier to initiate a phone call to an intended destination;
determining if the phone call originator is a flagged caller in the flagged caller database via the phone call originator identifier;
if the phone call originator identifier is found, returning a message identifier and one or more associated action identifiers; and
transmitting a message to the flagged caller; and
forwarding the phone call to the intended destination.

5. The method of claim 4 wherein the step of transmitting a message includes transmitting an audio message.

6. A method for providing messages to a recipient, the method comprising the steps of:
receiving a communication request from a communication device with a communication device identifier;
if the communication device identifier is found, returning a message identifier and one or more associated action identifiers; and
delivering a message to the communication device, wherein the message has a message attribute specific to the type of the communication device.

7. The method of claim 6 wherein the step of delivering a message includes delivering an audio message.

8. A method for providing a message to a recipient using a communication device, comprising:
receiving a communication from a potential recipient via the communication device with a communication device identifier;
determining if the potential recipient is flagged in a recipient database;
determining if the potential recipient matches an active account;
determining at least one message with a message identifier according to a message selection engine;
retrieving the at least one message;
if the communication device identifier is found, returning the message identifier and one or more associated action identifiers; and
forwarding the at least one message to the recipient via the communication device.

9. The method of claim 8 wherein the message selection engine includes attributes specific to the communication device.

10. The method of claim 8 including receiving at least one input prior to forwarding the at least one message to the recipient.

11. The method of claim 10 wherein the at least one input includes an association with a purchased product.

12. The method of claim 8 including forwarding an action response to the recipient after receiving a recipient action to the at least one message.

13. The method of claim 12 including extracting the recipient action to the at least one message and inputting the recipient response into the message selection engine.

14. The method of claim 8 including forwarding an action response to the recipient according to an action selection engine after receiving a recipient action to the at least one message.

15. The method of claim 14 wherein the recipient action is a voice prompt or a dual-tone multi-frequency signal.

16. The method of claim 14 wherein the action response is pre-assigned.

17. The method of claim 14 wherein the action response is selected from a group comprising at least one of Short Message Service (SMS), Multimedia Messaging Service (MMS), audio message, and a wireless access page.

18. The method of claim 8 wherein forwarding the at least one message includes forwarding a plurality of pre-assigned subsequent messages to the recipient.

19. The method of claim 18 wherein the sequence of the pre-assigned messages are dependent on recipient actions.

20. A method for providing a message to a recipient using a communication device, comprising:
receiving a communication from a potential recipient with a recipient identifier via the communication device;
if the recipient identifier is found, determining if the potential recipient is flagged in a recipient database;
determining a plurality of messages associated with the recipient;
determining one message with a message identifier from the plurality of messages according to an optimization selection engine;
retrieving the message; and forwarding the message to the recipient via the communication device, wherein the message has an assigned action with an action identifier.

21. The method of claim 20 including receiving a recipient action to the message.

22. The method of claim 21 including inputting the recipient action within the at least one optimization selection engine.

23. The method of claim 21 including forwarding an action response to the recipient after receiving the recipient action to the message.

24. A method for providing an action response to a recipient using a communication device, comprising:
receiving an action from the recipient with a recipient identifier via the communication device;
if the recipient identifier is found, associating a message identifier and one or more associated action identifiers;
determining a plurality of action responses associated with the recipient;
determining an at least one action response according to at least one optimization selection engine from the plurality of action responses;
retrieving the action response; and
forwarding the action response to the recipient via the communication device.

25. A method for providing an action to a recipient using a communication device, comprising:
receiving a communication from a potential recipient with a recipient identifier via the communication device;
if the recipient identifier is found, associating a message identifier and one or more associated action identifiers;
determining if the potential recipient is flagged in a recipient database;
determining a plurality of actions associated with the recipient;
determining one action according to at least one optimization selection engine;
retrieving the action; and
forwarding the action to the recipient via the communication device.

26. A method for providing a message to a recipient using a communication device, comprising:
receiving a communication from a potential recipient with a recipient identifier via the communication device;
if the recipient identifier is found, determining if the potential recipient is flagged in a recipient database;
determining at least one message with a message identifier from a message pool according to a message server;
returning the message identifier and one or more associated action identifiers; retrieving the at least one message; and
forwarding the at least one message to the recipient via the communication device.

27. A method for providing a message to a recipient using a communication device, comprising:
receiving a communication from a potential recipient with a recipient identifier via the communication device;
if the recipient identifier is found, determining if the potential recipient is flagged in a recipient database;
determining at least one message with a message identifier according to a predetermined recipient engine;
returning the message identifier and one or more associated action identifiers;
retrieving the at least one message; and
forwarding the at least one message to the recipient via the communication device.

28. A method for providing a message to a recipient using a communication device, comprising:
receiving a communication from a potential recipient with a recipient identifier via the communication device;
if the recipient identifier is found, determining if the potential recipient is flagged in a recipient database;
determining at least one message with a message identifier according to a message selection engine;
retrieving the at least one message with the message identifier and one or more associated action identifiers;
determining at least one action with the action identifier according to an action selection engine;
retrieving the at least one action; and
forwarding the at least one message and at least one action to the recipient via the communication device.

29. A method for providing a message to a recipient using a communication device, comprising:
receiving a communication from a potential recipient with a recipient identifier via the communication device;
if the recipient identifier is found, determining if the potential recipient is flagged in a recipient database;
determining at least one message with a message identifier according to a timing engine or a sequencing engine;
retrieving the at least one message with the message identifier and one or more associated action identifiers; and
forwarding the at least one message to the recipient via the communication device.

30. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
receiving a communication from a potential recipient with a recipient identifier via the communication device;
if the recipient identifier is found, determining if the potential recipient is flagged in a recipient database;
determining if the potential recipient matches an active account;
determining at least one message with a message identifier according to a message selection engine;
retrieving the at least one message with one or more associated action identifiers; and
forwarding the at least one message to the recipient via the communication device.

31. The computer-executable program of claim 30 wherein the message selection engine includes attributes specific to the communication device.

32. The computer-executable program of claim 30 including receiving at least one input prior to forwarding the at least one message to the recipient.

33. The computer-executable program of claim 32 wherein the at least one input includes an association with a recipient purchased product.

34. The computer-executable program of claim 30 including forwarding an action response to the recipient after receiving a recipient action to the at least one message.

35. The computer-executable program of claim 34 including extracting the recipient action to the at least one message and inputting the recipient response into the message selection engine.

36. The computer-executable program of claim 30 including forwarding an action response to the recipient according to an action selection engine after receiving a recipient action to the at least one message.

37. The computer-executable program of claim 36 wherein the recipient action is a voice prompt or a dual-tone multi-frequency signal.

38. The computer-executable program of claim 36 wherein the action response is pre-assigned.

39. The computer-executable program of claim 36 wherein the action response is selected from a group comprising at least one of Short Message Service (SMS), Multimedia Messaging Service (MMS), audio message, and a wireless access page.

40. The computer-executable program of claim 30 wherein forwarding the at least one message includes forwarding a plurality of pre-assigned subsequent messages to the recipient.

41. The computer-executable program of claim 40 wherein the sequence of the pre-assigned messages are dependent on recipient actions.

42. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
  receiving a communication from a potential recipient with a recipient identifier via the communication device;
  if the recipient identifier is found, determining if the potential recipient is flagged in a recipient database;
  determining a plurality of messages associated with the recipient;
  determining one message with a message identifier from the plurality of messages according to an optimization selection engine;
  retrieving the message; and
  forwarding the message to the recipient via the communication device, wherein the message has an assigned action with an action identifier.

43. The computer-executable program of claim 42 including receiving a recipient action to the message.

44. The computer-executable program of claim 43 including inputting the recipient action within the at least one optimization selection module.

45. The computer-executable program of claim 43 including forwarding an action response to the recipient after receiving the recipient action to the message.

46. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
  receiving an action with an action identifier from the recipient with a recipient identifier via the communication device;
  if the action identifier is found, associating a message identifier;
  determining a plurality of action responses associated with the recipient identifier;
  determining an at least one action response according to at least one optimization selection engine from the plurality of action responses;
  retrieving the action response; and
  forwarding the action response to the recipient via the communication device.

47. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
  receiving a communication from a potential recipient with a recipient identifier via the communication device;
  if the recipient identifier is found, associating a message identifier;
  determining if the potential recipient is flagged in a recipient database;
  determining a plurality of actions associated with the recipient or the associated message identifier;
  determining an action with an action identifier according to at least one optimization selection engine;
  retrieving the action; and
  forwarding the action to the recipient via the communication device.

48. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
  receiving a communication from a potential recipient with a recipient identifier via the communication device;
  if the recipient identifier is found, determining if the potential recipient is flagged in a recipient database;
  determining at least one message with a message identifier from a message pool according to a message server;
  retrieving the at least one message with the message identifier and one or more associated action identifiers; and
  forwarding the at least one message to the recipient via the communication device.

49. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
  receiving a communication from a potential recipient with a recipient identifier via the communication device;
  if the recipient identifier is found, determining if the potential recipient is flagged in a recipient database;
  determining at least one message with a message identifier according to a predetermined recipient engine;
  retrieving the at least one message with the message identifier and one or more associated action identifiers; and
  forwarding the at least one message to the recipient via the communication device.

50. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
  receiving a communication from a potential recipient with a recipient identifier via the communication device;

if the recipient identifier is found, determining if the potential recipient is flagged in a recipient database;
determining at least one message with a message identifier according to a message selection engine;
retrieving the at least one message;
determining at least one action with an action identifier according to an action selection engine;
retrieving the at least one action; and
forwarding the at least one message and the at least one action to the recipient via the communication device.

51. A computer-executable program stored on a non-transitory computer-readable storage medium for providing messages to a flagged recipient, carrying one or more sequences of instructions, wherein execution of the one or more sequences of instructions by one or more processors embodied therein causes the one or more processors to perform a method for providing a message to a recipient using a communication device, comprising:
receiving a communication from a potential recipient with a recipient identifier via the communication device;
if the recipient identifier is found, determining if the potential recipient is flagged in a recipient database;
determining at least one message with a message identifier according to a timing engine, a sequencing engine, a segmenting engine, or a billing budgeting and bidding engine;
retrieving the at least one message with the message identifier and one or more associated action identifiers; and
forwarding the at least one message to the recipient via the communication device.

52. A network communication system for providing a message to a recipient using a communication device, comprising:
at least one communication device;
a communication system operatively connected to the at least one communication device; and
an exchange platform, the exchange platform having a signal media server operatively connected to one of at least one message server, an at least one message selection engine, an optimization selection engine, or an action selection engine, the exchange platform receiving a communication from a potential recipient with a recipient identifier though the communication device, the communication system determining if the potential recipient is flagged in a recipient database, the message server determining the message with a message identifier, the message server retrieving the message with the message identifier and one or more associated action identifiers, wherein the signal media server forwards the message to the recipient via the communication device.

53. The system of claim 52 including at least one account operatively connected to an input module, the account providing account input to the exchange platform.

54. The system of claim 53 wherein the at least one account input includes the at least one message associated with a recipient purchased account product.

55. The system of claim 52 including at least one account operatively connected to an input module, the account providing account input to the exchange platform.

56. A network communication system for providing a message to a recipient using a communication device, comprising:
at least one communication device;
a communication system operatively connected to the at least one communication device; and
an exchange platform, the exchange platform having a message selection engine operatively connected to one of at least one timing engine, at least one segmentation engine, or both a signal media server and at least one sequencing engine, the exchange platform receiving a communication from a potential recipient with a recipient identifier though the communication device, the communication system determining if the potential recipient is flagged in a recipient database, the message selection engine determining the message with a message identifier according to at least one sequencing engine, message selection engine retrieving the message with the message identifier and one or more associated action identifiers, wherein the signal media server forwards the message to the recipient via the communication device.

57. The system of claim 56 including at least one account operatively connected to an input module, the account providing account input to the exchange platform.

58. A method for processing a call, the method comprising the steps of:
receiving a call from a calling party;
determining if the calling party is a flagged recipient in a flagged recipient database;
routing the call to an exchange platform and checking a recipient identifier in a predetermined recipient engine for rules and any associated message identifier;
if the recipient identifier is found, returning a selected message identifier and one or more associated action identifiers;
playing the selected message to the recipient identified by the recipient identifier and waiting for a valid recipient action;
if a valid recipient action is received, performing one or more asynchronous follow up actions; and
routing the call to originating switch or Mobile Switching Center.

59. The method of claim 58 further comprising the steps of:
if a recipient identifier is not found, determining a message identifier selection and one or more associated action identifiers;
if a message identifier is determined, returning a selected message identifier and, if known, one or more associated action identifiers; and
if no message identifier is determined, routing the call to originating switch or Mobile Switching Center.

60. The method of claim 58, wherein the recipient action is a dual-tone multi-frequency signal, a voice prompt, a Short Message Service (SMS), a Multimedia Messaging Service (MMS), a designated button in the environment, a designated motion, and/or an external communication.

61. The method of claim 58 wherein the asynchronous follow-up action is pre-assigned.

62. The method of claim 58 wherein the asynchronous follow up action is selected from a group comprising at least one of a Short Message Service (SMS), a Multimedia Messaging Service (MMS), an audio message, a wireless access page, a Web URL, an interactive voice response, an external communication, an email, an offer, a direct mail, and/or an outbound call.

63. The method of claim 58 wherein playing the selected message includes playing a plurality of pre-assigned subsequent messages to the recipient, wherein the subsequent message is played during subsequent calls made by the same recipient.

64. The method of claim 63 wherein the sequence of the pre-assigned messages are dependent on recipient actions.

65. The method of claim 59 wherein determining the message identifier comprises employing a timing engine to determine the message identifier selection in accordance with timing rules, including the frequency occurrence for a particular recipient and/or for a particular campaign, and additional timing parameters and rules including specific day, event, time of day, day of the week, contract history, and/or billing cycle, for a particular campaign and/or campaign element.

66. The method of claim 59 wherein determining the message identifier comprises employing a sequencing engine to determine in what order the messages are played.

67. The method of claim 59 wherein determining the message identifier comprises employing a segmentation engine to determine the message identifier selection in accordance with segmentation elements including geography, demographics, psychographics, behavioral, motion, velocity, direction, altitude, mode of transit, contextual, mood of the recipient, or which preferably include segmentation elements being relative to time, preferably including the time of day, day of week, or which preferably include segmentation elements being to a budget, preferably including a monetary constraint per message played to a recipient, or which preferably include an action taken by a recipient, or which preferably include a result of an action, preferably including a click, conversion or page view, and/or some combination of these segmentation elements.

68. A computer-executable program stored on a non-transitory computer-readable storage medium for processing a call, carrying one or more sequences of instructions, wherein execution thereof by a processor causes the processor to perform a method for processing a call, comprising:
 receiving a call from a calling party;
 determining if the calling party is a flagged recipient in a flagged recipient database;
 routing the call to an exchange platform, and checking a recipient identifier in a predetermined recipient engine for rules and any associated message identifier;
 if the recipient identifier is found, returning a selected message identifier and one or more associated action identifiers;
 playing the selected message to the recipient identified by the recipient identifier and waiting for a valid recipient action;
 if the valid recipient action is received, performing one or more asynchronous follow up actions; and
 routing the call to originating switch or Mobile Switching Center.

69. The computer-executable program of claim 68 wherein the recipient action is a dual-tone multi-frequency signal, a voice prompt, a Short Message Service (SMS), a Multimedia Messaging Service (MMS), a designated button in the environment, a designated motion, and/or an external communication.

70. The computer-executable program of claim 68 wherein the action response is pre-assigned.

71. The computer-executable program of claim 68 wherein the action response is selected from a group comprising at least one of a Short Message Service (SMS), a Multimedia Messaging Service (MMS), an audio message, a wireless access page, a Web URL, an interactive voice response, an external communication, an email, an offer, a direct mail, and/or an outbound call.

72. A network communication system for processing a call, comprising:
 at least one communication device;
 a communication system operatively connected to the at least one communication device; and
 an exchange platform, the exchange platform having a signal/media server operatively connected to at least one message server, the exchange platform receiving a communication from a potential recipient though the communication device, the communication system being configured to carry out a method for processing a call, comprising the steps of:
 receiving a call from the communication device;
 determining if the communication device is a flagged recipient in a flagged recipient database;
 routing the call to an exchange platform and checking a recipient identifier in a predetermined recipient engine for rules and any associated message identifier;
 if a recipient identifier is found returning a selected message identifier and one or more associated action identifiers;
 playing the selected message to the recipient identified by the recipient identifier and waiting for a valid recipient action;
 if a valid recipient action is received, performing one or more asynchronous follow up actions; and
 routing the call to the communication system.

73. The network communication system of claim 72 including at least one account operatively connected to an input module, the account providing account input to the exchange platform.

74. The network communication system of claim 72 including receiving at least one input prior to forwarding the at least one message to the communication device.

75. The network communication system of claim 74 including extracting the recipient identifier, the message identifier, or the one or more action identifiers, per the at least one input.

76. The network communication system of claim 74 including forwarding an action response to the communication device after receiving a recipient action or the at least one input.

\* \* \* \* \*